US012634033B2

(12) United States Patent
Matsuda et al.

(10) Patent No.: US 12,634,033 B2
(45) Date of Patent: May 19, 2026

(54) COMMUNICATION METHOD, COMMUNICATION DEVICE, AND PROGRAM

(71) Applicant: Sony Group Corporation, Tokyo (JP)

(72) Inventors: Hiroki Matsuda, Tokyo (JP); Mitsuki Takahashi, Tokyo (JP); Ryota Kimura, Tokyo (JP); Yukitoshi Sanada, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 274 days.

(21) Appl. No.: 18/554,997

(22) PCT Filed: Mar. 14, 2022

(86) PCT No.: PCT/JP2022/011185
§ 371 (c)(1),
(2) Date: Oct. 12, 2023

(87) PCT Pub. No.: WO2022/224625
PCT Pub. Date: Oct. 27, 2022

(65) Prior Publication Data
US 2024/0204906 A1 Jun. 20, 2024

(30) Foreign Application Priority Data
Apr. 23, 2021 (JP) ................................. 2021-073224

(51) Int. Cl.
*H04L 1/00* (2006.01)
*H04L 5/00* (2006.01)

(52) U.S. Cl.
CPC .......... *H04L 1/0003* (2013.01); *H04L 5/0098* (2013.01)

(58) Field of Classification Search
CPC ... H04L 1/0003; H04L 5/0098; H04L 5/0053; H04L 27/26; H04W 72/04; Y02D 30/70
See application file for complete search history.

(56) References Cited

U.S. PATENT DOCUMENTS

2011/0103430 A1* 5/2011 Witrisal .............. H04L 27/2649
375/142
2020/0287759 A1* 9/2020 Van Nee ............. H04L 27/2613

FOREIGN PATENT DOCUMENTS

JP 2011-520367 A 7/2011

OTHER PUBLICATIONS

International Search Report and Written Opinion mailed on Jun. 14, 2022, received for PCT Application PCT/JP2022/011185, filed on Mar. 14, 2022, 8 pages including English Translation.

(Continued)

*Primary Examiner* — Jeffrey M Shin
(74) *Attorney, Agent, or Firm* — XSENSUS LLP

(57) ABSTRACT
A communication method includes performing wireless communication using a predetermined resource. The communication method includes allocating a signal modulated by a first modulation scheme to a first resource included in a predetermined resource, and allocating a signal modulated by a second modulation scheme different from the first modulation scheme to a second resource included in the predetermined resource. The first modulation scheme is a modulation scheme of modulating a signal by a combination of active resources and inactive resources.

21 Claims, 32 Drawing Sheets

(56) References Cited

OTHER PUBLICATIONS

He et al., "A Better Decision Rule for OFDM with Subcarrier Index Modulation", WSA 2017; 21th International ITG Workshop on Smart Antennas, Mar. 15-17, 2017, pp. 90-93.

Li et al., "Index Modulated OFDM Spread Spectrum", IEEE Transactions on Wireless Communications, vol. 17, No. 4, Apr. 2018, pp. 2360-2374.

Wang et al., "Novel MC-CDMA System Using Fourier Duals of Sparse Perfect Gaussian Integer Sequences", IEEE ICC 2016—Signal Processing for Communications Symposium, 6 pages.

* cited by examiner

FIG.8

(RECEPTION SIGNAL)=

CHANNEL RESPONSE

| SUBCARRIER# | #1 | | #2 | | #3 | | #4 | |
|---|---|---|---|---|---|---|---|---|
| SPREADING SEQUENCE | $C_0$ | $C_1$ | $C_2$ | $C_3$ | $C_4$ | $C_5$ | $C_6$ | $C_7$ |
| BIT ALLOCATION | 0 | 1 | 0 | 1 | 0 | 1 | 0 | 1 |

FIG.31

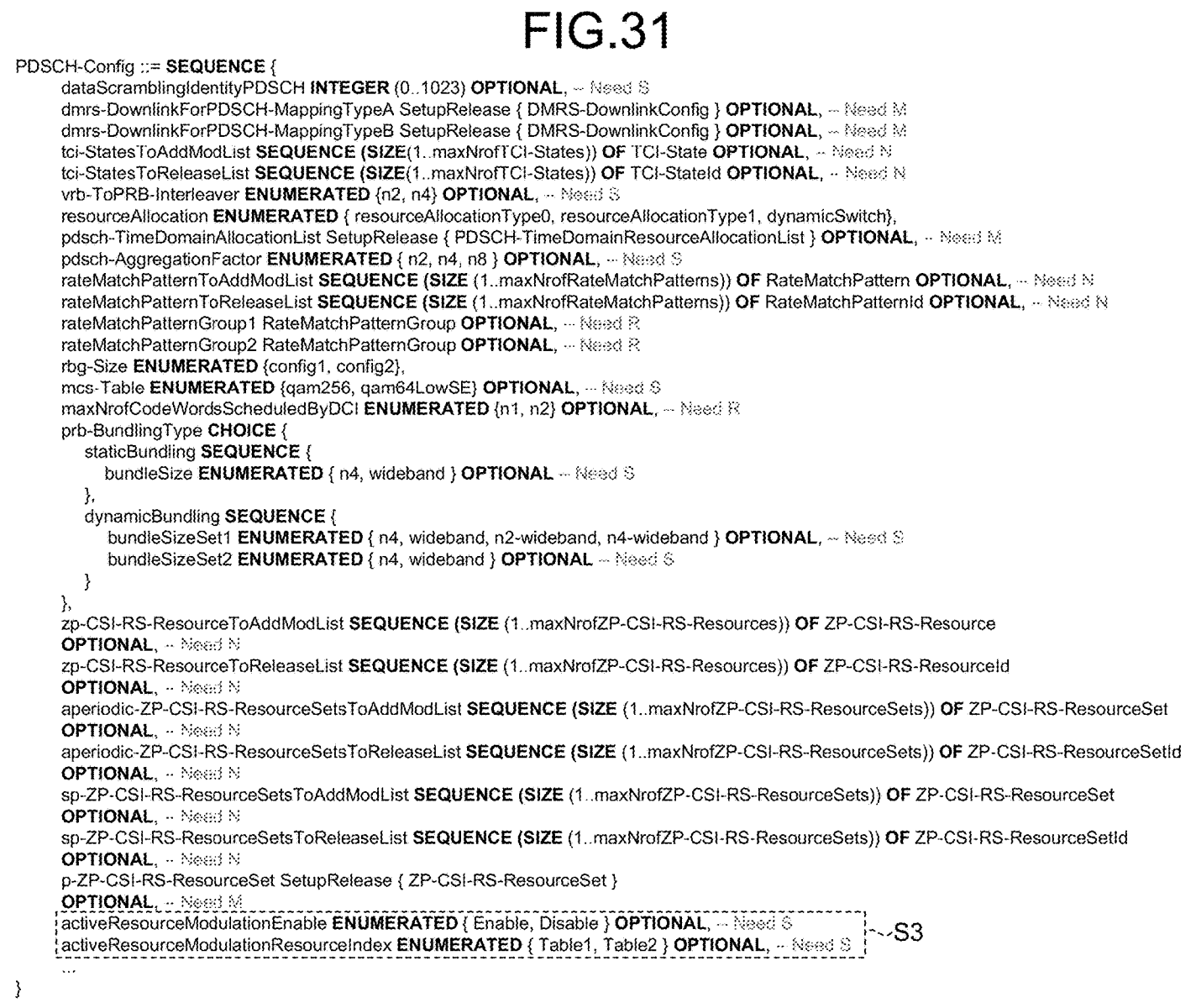

```
PDSCH-Config ::= SEQUENCE {
    dataScramblingIdentityPDSCH INTEGER (0..1023) OPTIONAL, -- Need S
    dmrs-DownlinkForPDSCH-MappingTypeA SetupRelease { DMRS-DownlinkConfig } OPTIONAL, -- Need M
    dmrs-DownlinkForPDSCH-MappingTypeB SetupRelease { DMRS-DownlinkConfig } OPTIONAL, -- Need M
    tci-StatesToAddModList SEQUENCE (SIZE(1..maxNrofTCI-States)) OF TCI-State OPTIONAL, -- Need N
    tci-StatesToReleaseList SEQUENCE (SIZE(1..maxNrofTCI-States)) OF TCI-StateId OPTIONAL, -- Need N
    vrb-ToPRB-Interleaver ENUMERATED {n2, n4} OPTIONAL, -- Need S
    resourceAllocation ENUMERATED { resourceAllocationType0, resourceAllocationType1, dynamicSwitch},
    pdsch-TimeDomainAllocationList SetupRelease { PDSCH-TimeDomainResourceAllocationList } OPTIONAL, -- Need M
    pdsch-AggregationFactor ENUMERATED { n2, n4, n8 } OPTIONAL, -- Need S
    rateMatchPatternToAddModList SEQUENCE (SIZE (1..maxNrofRateMatchPatterns)) OF RateMatchPattern OPTIONAL, -- Need N
    rateMatchPatternToReleaseList SEQUENCE (SIZE (1..maxNrofRateMatchPatterns)) OF RateMatchPatternId OPTIONAL, -- Need N
    rateMatchPatternGroup1 RateMatchPatternGroup OPTIONAL, -- Need R
    rateMatchPatternGroup2 RateMatchPatternGroup OPTIONAL, -- Need R
    rbg-Size ENUMERATED {config1, config2},
    mcs-Table ENUMERATED {qam256, qam64LowSE} OPTIONAL, -- Need S
    maxNrofCodeWordsScheduledByDCI ENUMERATED {n1, n2} OPTIONAL, -- Need R
    prb-BundlingType CHOICE {
        staticBundling SEQUENCE {
            bundleSize ENUMERATED { n4, wideband } OPTIONAL -- Need S
        },
        dynamicBundling SEQUENCE {
            bundleSizeSet1 ENUMERATED { n4, wideband, n2-wideband, n4-wideband } OPTIONAL, -- Need S
            bundleSizeSet2 ENUMERATED { n4, wideband } OPTIONAL -- Need S
        }
    },
    zp-CSI-RS-ResourceToAddModList SEQUENCE (SIZE (1..maxNrofZP-CSI-RS-Resources)) OF ZP-CSI-RS-Resource
        OPTIONAL, -- Need N
    zp-CSI-RS-ResourceToReleaseList SEQUENCE (SIZE (1..maxNrofZP-CSI-RS-Resources)) OF ZP-CSI-RS-ResourceId
        OPTIONAL, -- Need N
    aperiodic-ZP-CSI-RS-ResourceSetsToAddModList SEQUENCE (SIZE (1..maxNrofZP-CSI-RS-ResourceSets)) OF ZP-CSI-RS-ResourceSet
        OPTIONAL, -- Need N
    aperiodic-ZP-CSI-RS-ResourceSetsToReleaseList SEQUENCE (SIZE (1..maxNrofZP-CSI-RS-ResourceSets)) OF ZP-CSI-RS-ResourceSetId
        OPTIONAL, -- Need N
    sp-ZP-CSI-RS-ResourceSetsToAddModList SEQUENCE (SIZE (1..maxNrofZP-CSI-RS-ResourceSets)) OF ZP-CSI-RS-ResourceSet
        OPTIONAL, -- Need N
    sp-ZP-CSI-RS-ResourceSetsToReleaseList SEQUENCE (SIZE (1..maxNrofZP-CSI-RS-ResourceSets)) OF ZP-CSI-RS-ResourceSetId
        OPTIONAL, -- Need N
    p-ZP-CSI-RS-ResourceSet SetupRelease { ZP-CSI-RS-ResourceSet }
        OPTIONAL, -- Need M
    activeResourceModulationEnable ENUMERATED { Enable, Disable } OPTIONAL, -- Need S        ⌐--S3
    activeResourceModulationResourceIndex ENUMERATED { Table1, Table2 } OPTIONAL, -- Need S
    ...
```

COMMUNICATION METHOD, COMMUNICATION DEVICE, AND PROGRAM

CROSS-REFERENCE TO RELATED APPLICATIONS

The present application is based on PCT filing PCT/JP2022/011185, filed Mar. 14, 2022, which claims priority from Japanese Patent Application No. 2021-073224, filed Apr. 23, 2021, the entire contents of each are incorporated herein by reference.

FIELD

The present disclosure relates to a communication method, a communication device, and a program.

BACKGROUND

Index modulation (IM or parallel combinatory modulation, tone-phase-shift keying, or the like) is known as a modulation scheme of converting a bit sequence into a complex signal point sequence. The IM is a modulation scheme in which information is added to a combination of resource elements in which complex signal points are arranged by using a plurality of (for example, N (N is an integer of 1 or more)) resource elements (such as a frequency, time, a spatial layer, a precoding matrix, an antenna port, and an antenna) used for modulation.

In addition, in a multi-access environment in which a plurality of terminal devices performs communication, there is a problem that an error rate characteristic is deteriorated due to occurrence of multi-user interference. For example, in Non Patent Literature 1, in order to suppress such deterioration of the error rate characteristic, a guard for reducing interference is provided between signals of users (terminal devices). For example, in Non Patent Literature 2, the index modulation is applied to a spreading sequence, and a plurality of signals is multiplexed, so that error rate characteristics are improved.

CITATION LIST

Non Patent Literature

Non Patent Literature 1: Wang, Li, "Novel MC-CDMA System Using Fourier Duals of Sparse Perfect Gaussian Integer Sequences", IEEE ICC 2016

Non Patent Literature 2: Qiang Li, Miaowen Wen, Li, "Index Modulated OFDM Spread Spectrum", IEEE TRANSACTIONS ON WIRELESS COMMUNICATIONS, VOL. 17, NO. 4, APRIL 2018

SUMMARY

Technical Problem

However, in the method of providing the guard described above, while deterioration in the error rate characteristic can be suppressed, there is a problem that a resource (for example, a frequency resource) utilization efficiency is reduced. Therefore, in a multi-access environment in which a base station device and a plurality of terminal devices perform communication, it is desirable to suppress both deterioration in error rate characteristics and deterioration in frequency utilization efficiency and to further improve quality between radio links.

Therefore, the present disclosure proposes a mechanism capable of further improving quality between radio links.

Note that the above problem or object is merely one of a plurality of problems or objects that can be solved or achieved by the plurality of embodiments disclosed in the present specification.

Solution to Problem

A communication method of the present disclosure includes performing wireless communication using a predetermined resource. The communication method includes allocating a signal modulated by a first modulation scheme to a first resource included in a predetermined resource, and allocating a signal modulated by a second modulation scheme different from the first modulation scheme to a second resource included in the predetermined resource. The first modulation scheme is a modulation scheme of modulating a signal by a combination of active resources and inactive resources.

BRIEF DESCRIPTION OF DRAWINGS

FIG. 8 is a diagram illustrating an example of the modulation by the IM.

FIG. 31 is a diagram illustrating an example of signaling according to another embodiment of the present disclosure.

DESCRIPTION OF EMBODIMENTS

Figure 1:
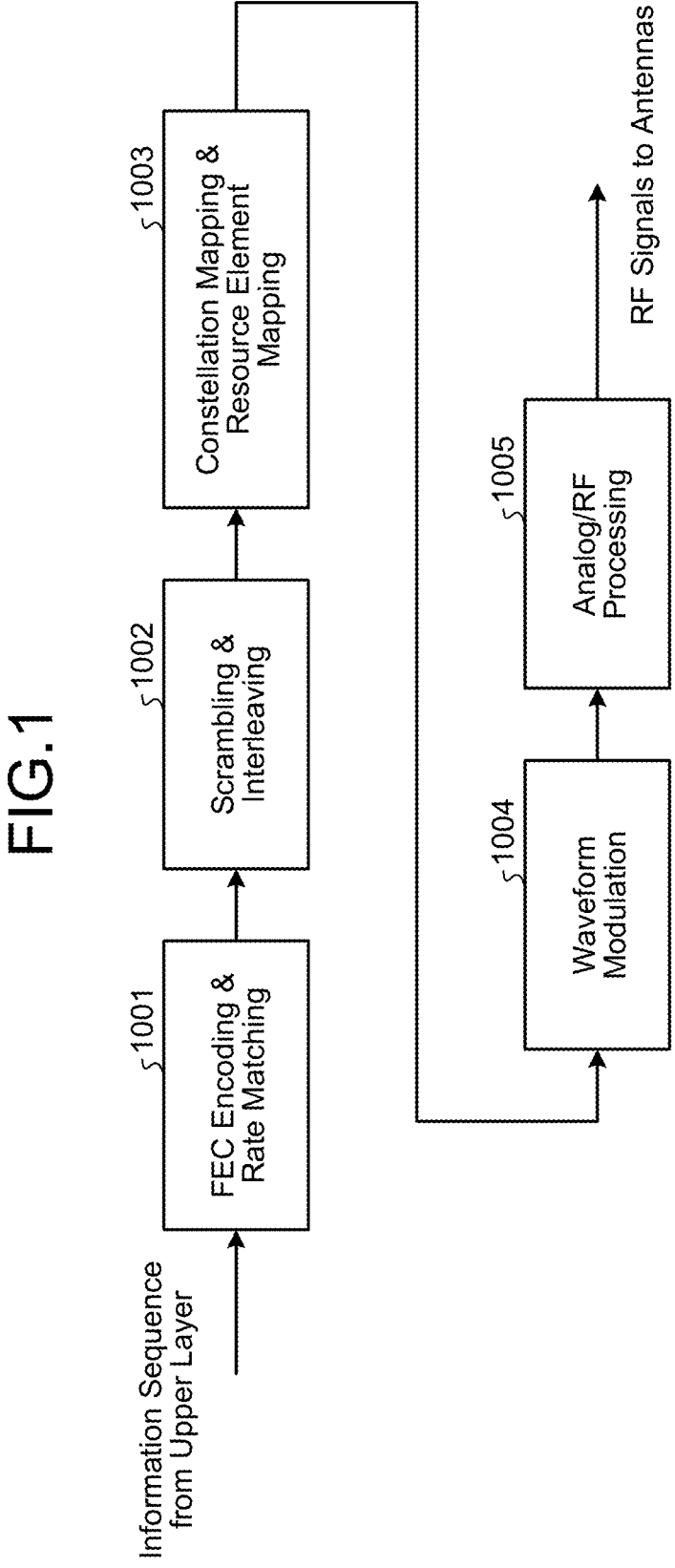
FIG. 1 is a block diagram schematically illustrating an example of signal processing related to data transmission according to an embodiment of the present disclosure.

Hereinafter, embodiments of the present disclosure are described in detail with reference to the accompanying drawings. Note that, in the present specification and the drawings, a component having substantially the same functional configuration is denoted by the same reference numeral, and overlapping description is omitted.

Furthermore, in the present specification and the drawings, similar components according to the embodiment may be distinguished by adding different alphabets after the same reference numerals. However, when it is not necessary to particularly distinguish respective similar components, only the same reference numeral is assigned.

One or a plurality of embodiments (including examples and modifications) described below can each be implemented independently. Meanwhile, at least some of the plurality of embodiments described below may be appropriately combined with at least some of other embodiments to be implemented. The plurality of embodiments may include novel features different from each other. Therefore, the plurality of embodiments may contribute to solving different objects or problems and can exhibit different effects.

1. Introduction

<1.1. Outline of Transmission Processing>

FIG. 1 is a block diagram schematically illustrating an example of signal processing related to data transmission according to an embodiment of the present disclosure. As illustrated in FIG. 1, a communication device that performs signal processing (transmission processing) of the present embodiment includes a forward error correction (FEC) coding and rate matching block 1001 and a scrambling and interleaving block 1002. Further, the communication device includes a constellation mapping and resource element mapping block 1003, a waveform modulation block 1004, and an analog/RF processing block 1005. With reference to FIG. 1, an input information sequence (for example, a bit sequence) from an upper layer is processed, and a radio frequency (RF) signal is output.

The FEC coding and rate matching block 1001 acquires an input information sequence. The FEC coding and rate matching block 1001 acquires a bit sequence (for example, a transport block, a packet, or a frame) transmitted from an upper layer (for example, a data link layer or Layer 2) as the input information sequence. The FEC coding and rate matching block 1001 performs error detection coding (such as cyclic redundancy check (CRC)), error correction coding (such as forward error correction (FEC), for example, turbo coding, convolutional coding, LDPC coding, polar coding, or reed-solomon coding), and coding rate adjustment (such as rate matching, for example, puncturing or repetition) on the input information sequence.

The scrambling and interleaving block 1002 scrambles and interleaves the coded bit sequence output from the FEC coding and rate matching block 1001 and further enhances the effect of error correction.

Thereafter, the constellation mapping and resource element mapping block 1003 converts the bit sequence output from the scrambling and interleaving block 1002 into a complex signal point sequence and arranges the complex signal point sequence in the resource element. Note that details of conversion into the complex signal point sequence and arrangement in a resource element according to the present embodiment are described below.

The waveform modulation block 1004 performs waveform modulation on each complex signal point arranged in the resource element by the constellation mapping and resource element mapping block 1003. For example, the waveform modulation block 1004 performs waveform modulation according to orthogonal frequency division multiple access (OFDMA), single-carrier frequency division multiple access (SC-FDMA), generalized frequency division multiple access (GFDMA), filtered OFDMA (FOFDMA), universal filtered multi-carrier (UFMC), or the like.

The analog/RF processing block 1005 performs digital-to-analog conversion (DAC), then performs analog processing and RE processing, and transmits a radio wave from an antenna.

In the present embodiment, the resource element is one unit of a resource (that is, a unit resource) specified by at least one of a frequency resource (such as a subcarrier, a subchannel, or a resource block), a time resource (such as a symbol, a slot, or a frame), a spatial resource (such as an antenna, an antenna port, a spatial layer, or a spatial stream), and a code pattern (such as a spreading code pattern, an interleave pattern, or a scramble pattern). Hereinafter, for ease of description, it is described that the resource element is a frequency resource, but the resource element is not limited to the frequency resource.

<1.2. Outline of Transmission Processing>

Figure 2:
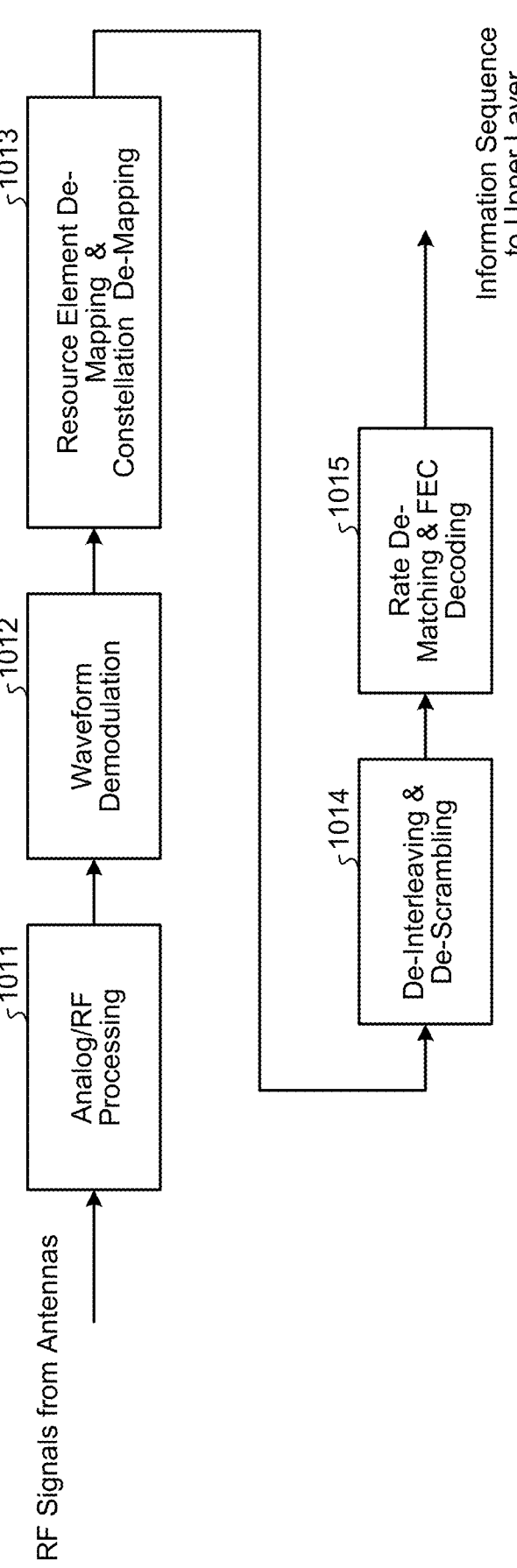
FIG. 2 is a block diagram schematically illustrating an example of signal processing related to data reception according to the embodiment of the present disclosure.

FIG. 2 is a block diagram schematically illustrating an example of signal processing related to data reception according to the embodiment of the present disclosure. As illustrated in FIG. 2, the communication device that performs signal processing (reception processing) of the present embodiment includes an analog/RF processing block 1011, a waveform demodulation block 1012, and a resource element demapping and constellation demapping block 1013. The communication device further includes a de-interleaving and de-scrambling block 1014 and a rate de-matching and FEC demodulation block 1015.

The analog/RF processing block 1011 performs analog processing, frequency conversion processing, analog-to-digital conversion processing, and the like on the signal received by the antenna. As a result, the signal received by the antenna is converted into a digital signal.

Thereafter, the waveform demodulation block 1012 executes demodulation processing according to the waveform being used. For example, the waveform demodulation block 1012 performs discrete Fourier transform (DFT), inverse discrete Fourier transform (IDFT), fast Fourier transform (FFT), inverse fast Fourier transform (IFFT), or the like as demodulation of orthogonal frequency division multiple access (OFDMA) and single carrier frequency division multiple access (SC-FDMA).

Thereafter, the resource element demapping and constellation demapping block 1013 executes resource element de-mapping. For example, the resource element demapping and constellation demapping block 1013 performs processing of extracting a resource element of a signal desired to be demodulated and decoded according to a physical channel configuration, a reference signal configuration, allocation of a resource element for each user, and the like.

Thereafter, the resource element demapping and constellation demapping block 1013 executes constellation demapping. For example, the resource element demapping and constellation demapping block 1013 performs reception, demodulation, and decoding corresponding to the transmission method according to the present embodiment. Here, the resource element demapping and constellation demapping block 1013 outputs a hard decision value or a soft decision value of an encoded bit sequence (or transmission bit sequence) as a target. The hard decision value is a sequence that takes binary discrete values of $\{0, 1\}$ (or $\{-1, 1\}$). The soft decision value is also referred to as soft decision, soft information, or log likelihood ratio information (LLR information) and is a sequence of continuous values or a sequence of discrete values at a plurality of levels. As a constellation demapping algorithm, linear filtering such as zero forcing (ZF) or minimum mean square error (MMSE), or a non-linear algorithm such as maximum likelihood detection (ML detection) or maximum likelihood estimation (ML estimation) can be used.

After the soft decision value and the LLR are generated, the de-interleaving and de-scrambling block 1014 performs deinterleaving and descrambling corresponding to the processing of interleaving and scrambling performed on the transmission side.

Further, the rate de-matching and FEC demodulation block 1015 performs rate de-matching and FEC decoding at a rate corresponding to processing on the transmission side and decodes an information bit sequence of the upper layer.

The communication device on the reception side may regenerate a transmission signal replica (for example, soft replica or soft interference replica) from the temporarily decoded information bit sequence of the upper layer, feed back the transmission signal replica to constellation demapping or soft decision value generation processing, and repeatedly perform decoding (iterative/turbo de-mapping, iterative/turbo equalization, iterative/turbo decoding, or iterative/turbo cancellation). The reception performance can be expected to be improved by such repeated processing.

<1.3. Setting Processing>

In order to execute the transmission processing or the reception processing of the present embodiment, it is necessary to share (set as common knowledge) the information related to the constellation mapping/demapping between the communication device on the transmission side and the communication device on the reception side using some method. The information is preferably shared among the communication devices via system information, RRC signaling, control information, or the like. Hereinafter, setting processing for information sharing is described.

(Uplink or Downlink)

Figure 3:
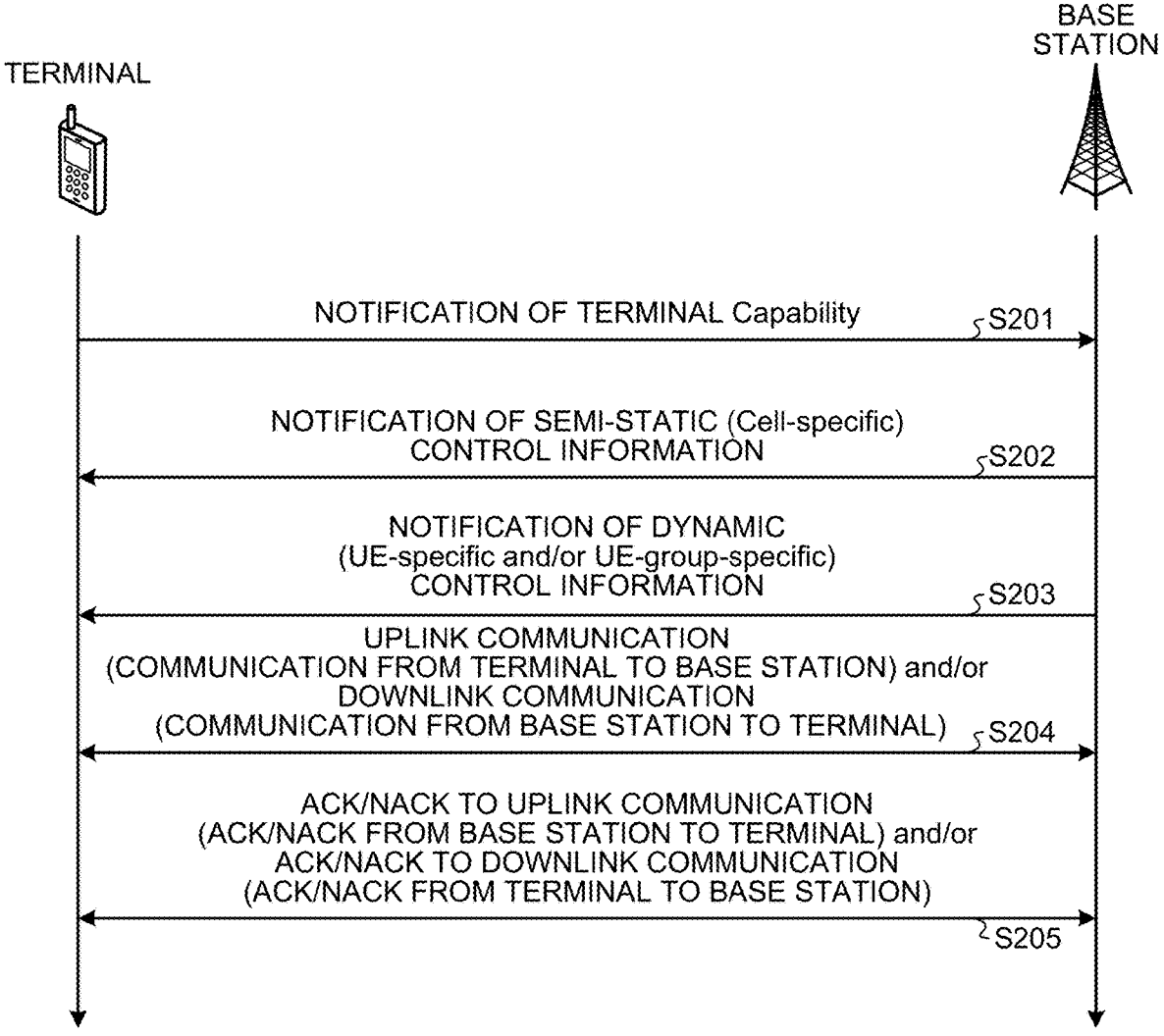
FIG. 3 is a sequence diagram illustrating setting processing in uplink or downlink communication.

First, setting processing for information sharing in uplink or downlink communication is described. FIG. 3 is a sequence diagram illustrating setting processing in the uplink or downlink communication.

First, a terminal device notifies a base station device to which the terminal device is connected of capability information (step S201). For example, the terminal device notifies the base station device whether the terminal device supports a communication scheme proposed in the present embodiment. Note that details of the communication scheme proposed in the present embodiment are described below.

When the terminal device does not support the communication scheme proposed in the present embodiment, the terminal device communicates with the base station device by using a normal communication scheme (for example, an OFDMA system or a DFT-Spread-OFDMA system). When the communication scheme proposed in the present embodiment is supported, specific values of parameters required for implementation of the communication scheme proposed in the present embodiment are shared among the communication devices (Steps S202 and/or step S203).

When communication is performed on a physical control channel (such as a physical downlink control channel (PDCCH) or a physical uplink control channel (PUCCH)), it is desirable that the base station device notifies the terminal device of the parameter used in the communication scheme of the present embodiment as semi-static information or cell-specific information. For example, the base station device may notify the terminal device of the system information and the RRC signaling by using a physical broadcast channel (PBCH) or a downlink common channel (physical downlink shared channel (PDSCH)).

When communication is performed on a physical common channel (such as a PDSCH or a physical uplink shared channel (PUSCH)), it is desirable that the base station device notifies the terminal device of the parameter used in the communication scheme of the present embodiment as semi-static information, dynamic information, or terminal-specific (UE-specific, UE-group-specific) information. For example, it is desirable that the base station device notifies the terminal device of downlink control information (DCI) using a physical control channel (PDCCH). At this time, a radio resource (such as a frequency (a resource block or a component carrier), time (a subframe, a slot, or a mini-slot), or a space (the number of MIMO layers (spatial layers or spatial streams))) to be used by the terminal device may be notified together with the parameter used for the communication scheme of the present embodiment.

The terminal device that receives the parameter from the base station device performs communication using the communication scheme of the present embodiment (step S204). For example, in the case of the uplink, the terminal device transmits a signal to the base station device using the communication scheme of the present embodiment by using the value of the parameter and the radio resource notified from the base station device. In case of the downlink, the terminal device performs the reception processing on the assumption that the base station device transmits a signal to the terminal device by using the parameter and the radio resource notified by the base station device.

The base station device or the terminal device transmits ACK or NACK in response to the transmission in step S204 (step S205).
(Sidelink)

Figure 4:
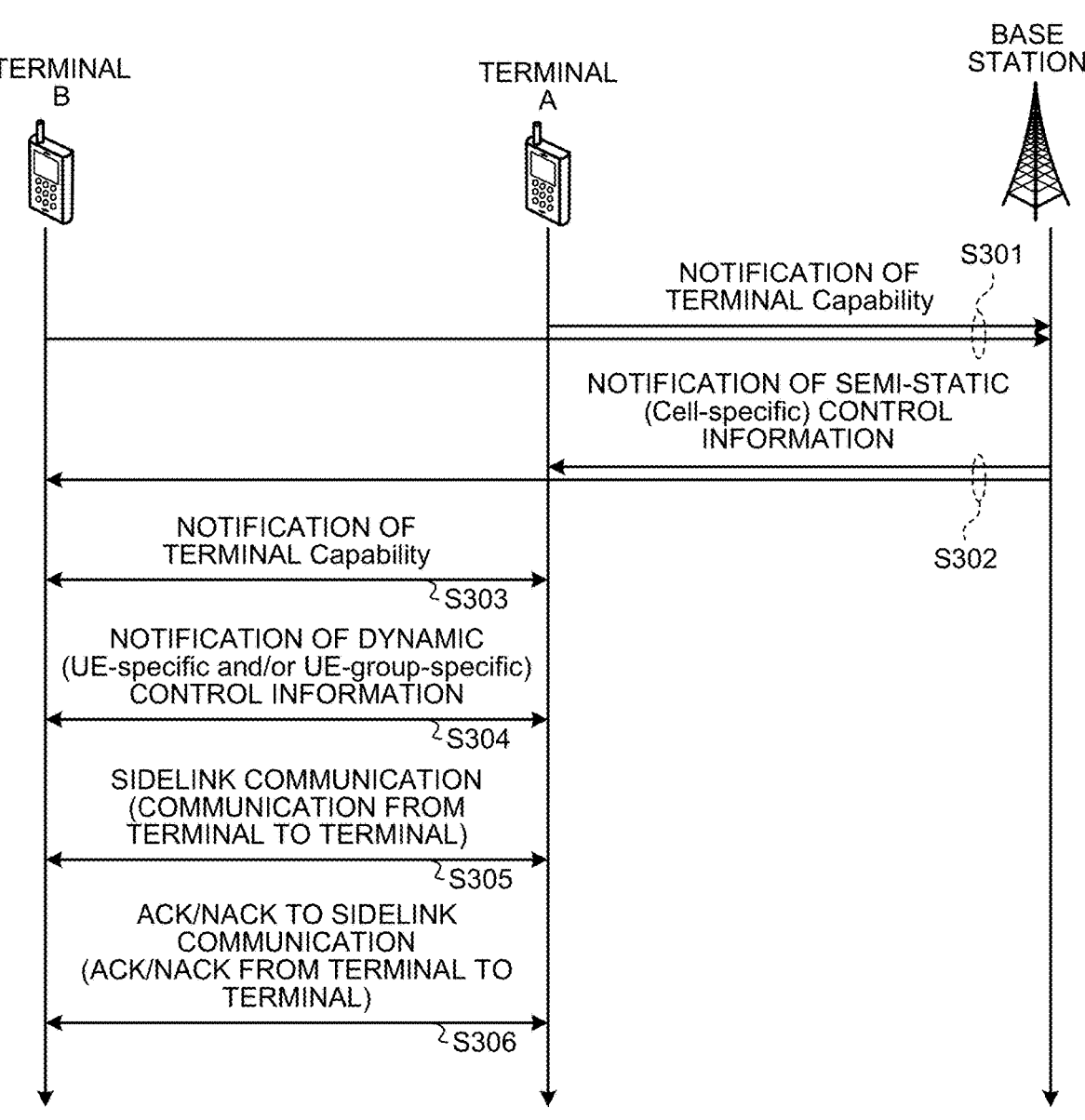
FIG. 4 is a sequence diagram illustrating setting processing in sidelink communication.

Next, setting processing in the sidelink is described. Also in the case of the sidelink, it is desirable that the terminal device notifies the base station device to which the terminal device is connected of the compatibility with the communication scheme proposed in the present embodiment. FIG. 4 is a sequence diagram illustrating the setting processing in sidelink communication. In the following description, one terminal device of the sidelink communication is referred to as a terminal A, and the other terminal device is referred to as a terminal B.

The terminals A and B notify the base station devices to which the terminals A and B are connected of capability information (step S301). For example, each of the terminals A and B notifies the base station device to which each of the terminals A and B is connected of the compatibility with the communication scheme proposed in the present embodiment.

The base station device notifies the terminals A and B of information on radio resources (for example, information of a radio resource pool designated by time and frequency) that may be used for sidelink communication. The information of the radio resources is desirably notified as semi-static information. At this time, the base station device may also notify the terminals A and B of the values of the parameters to be applied when the communication scheme proposed in the present embodiment is used as semi-static information (step S302).

The terminals A and B notify each other of the capability information of the terminals A and B by using the radio resource (radio resource pool) designated by the base station device (step S303). For example, each of the terminals A and B may notify the counterpart terminal device of the compatibility with the communication scheme proposed in the present embodiment.

When one or both of the terminals A and B do not support the communication scheme of the present embodiment, the terminals A and B perform sidelink communication by a normal communication scheme. When both the terminals A and B support the communication scheme of the present embodiment, the terminals A and B may perform communication using the communication scheme of the present embodiment by using the values of the parameters semi-statically notified from the base station device (step S305). For example, in communication using a sidelink control channel (physical sidelink control channel (PSCCH)), the terminals A and B may execute communication using the communication scheme of the present embodiment by using the parameter notified from the base station device.

In the communication using a sidelink common channel (such as a physical sidelink shared channel (PSSCH)), the terminals A and B may notify each other of the parameters used for IM of the present embodiment as sidelink control information (SCI) by using the PSCCH (step S304). Then, the terminals A and B may execute communication using the communication scheme of the present embodiment by using the parameters notified by each other (step S305).

The terminal A or the terminal B transmits ACK or NACK in response to the transmission in step S305 (step S306).

In this manner, the terminal device can also transmit or receive the sidelink signal by using the value of the parameter notified as described above.

In addition, the method of sharing the value of the parameter used in the communication scheme of the present embodiment between the terminal device and the base station device is not limited to the method by the setting processing described above. For example, by setting the value of the parameter used in the communication method of the present embodiment as a unique value in advance, the terminal device and the base station device may share the value of the corresponding parameter.

For example, when the communication scheme of the present embodiment is used in a broadcast channel (PBCH) used for notification of first system information, it is difficult for the base station device to notify the terminal device of the parameter before the PBCH. Therefore, in such a case, it is desirable that the base station device and the terminal device perform communication by the communication scheme of the present embodiment by using the parameter set as a unique value in advance.
<1.4. Overview of IM>

Next, the index modulation (IM) is described. In the IM according to the present embodiment, a part of the input information sequence is modulated into complex signal points, and the modulated complex signal points are arranged at positions corresponding to the part of the input information sequence among the available resource elements. That is, in the IM, information is represented by positions where the complex signal points are arranged in addition to the complex signal points. The arrangement of complex signal points may be regarded as ON/OFF (active resources/inactive resources) of resource elements.
(Complex Signal Point Sequence)

First, conversion of an input signal sequence into a complex signal sequence is described.

For conversion of an input signal sequence into a complex signal sequence, a complex signal point set (constellation) of M-PSK, M-QAM, or the like having an $M=2^m$ relationship such as 2PSK (BPSK), QPSK (4PSK), 16 QAM, 64 QAM, or 256 QAM may be used. Alternatively, for conversion into a complex signal sequence, an M-PSK+origin and an M-QAM+origin in a relationship of $M=2^m+1$, obtained by adding a zero point (origin) to a complex signal point set of M-PSK, M-QAM, or the like having a relationship of $M=2^m$, such as 2PSK (BPSK), QPSK (4PSK), 16 QAM, 64 QAM, or 256 QAM, may be used. Here, the phase rotation shift may be applied to signal points such as 2PSK (BPSK), QPSK (4PSK), 16 QAM, 64 QAM, and 256 QAM.

(Resource Element)

Next, a resource element that maps a set of complex signal points is described.

First, it is assumed that the number of resource elements to be subjected to the IM is N, and K ($\leq$N) resource elements are selected from the N resource elements to arrange complex signal points. In addition, complex signal points included in a non-zero complex signal point set configured so that $M=2^m$ or $M\neq2^m$ are arranged in the K selected resource elements.

In this case, the number of bits $N_B$ of the bit sequence that can be transmitted by using the N resource elements is obtained based on Formulas (1) and (2).

$$N_B = \text{floor}\left[\log_2\left\{M^K C\right\}\right] \tag{1}$$

$$C = \binom{N}{K} \tag{2}$$

Here, Formula (2) means the number of combinations of selecting K resource elements without overlapping from N resource elements, and the right side of Formula (2) is also represented as $_NC_K$. In addition, floor (x) in Formula (1) means rounding down (the largest integer equal to or less than x).

In the IM of $M=2^m$, the $N_B$ can be rewritten as Formula (3).

$$N_B = mK + \text{floor}\{\log_2(C)\} \tag{3}$$

Formula (3) represents that, when the value of the number of combinations C satisfies $C\neq2n$ (n is a positive integer), a combination that does not contribute to an increase in the number of bits $N_B$ to be added is generated by logarithmic conversion and rounding down.

Arrangement Example 1

Figure 5A:
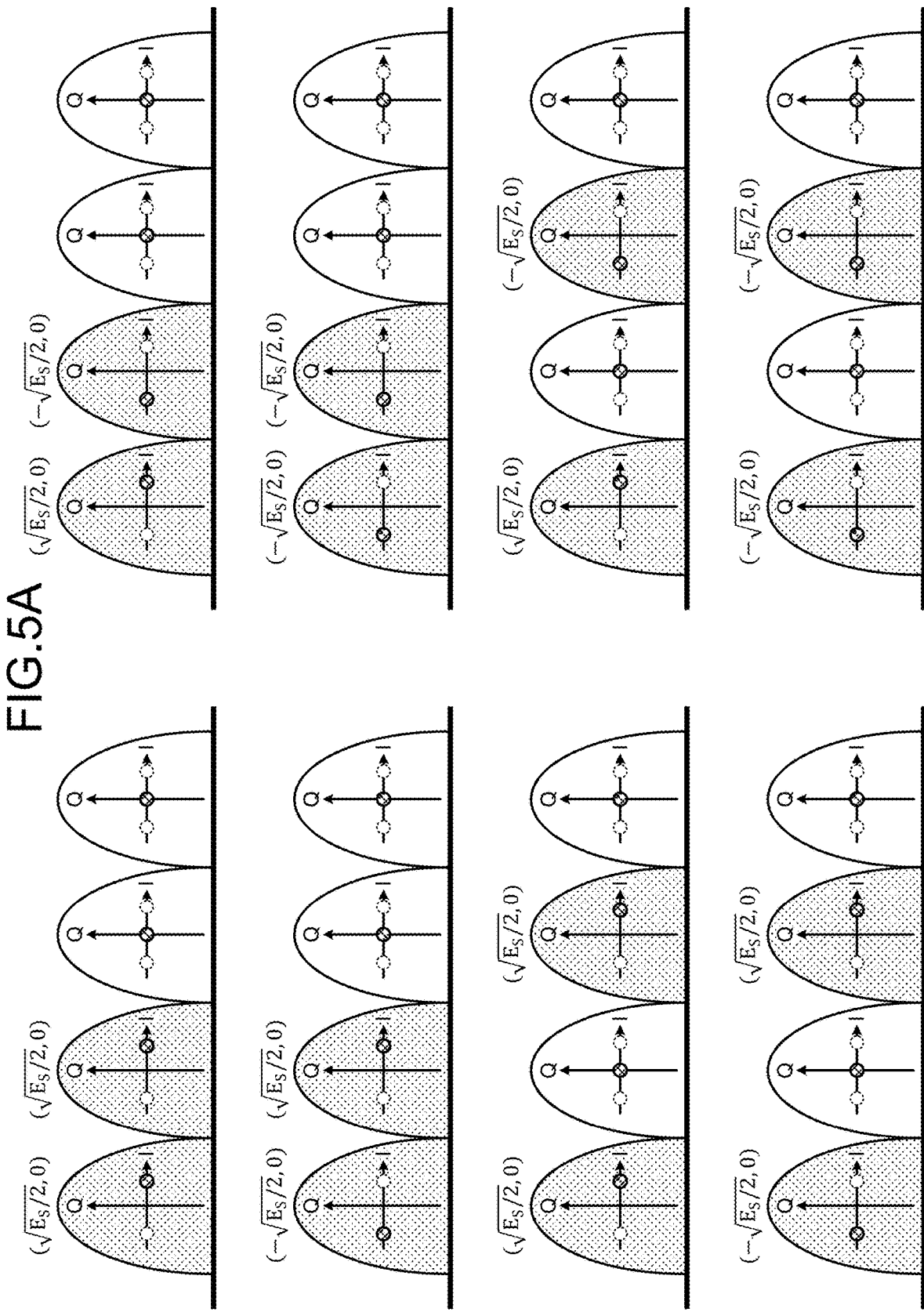
FIG. 5A is a diagram illustrating an example of modulation by IM.
Figure 5B:
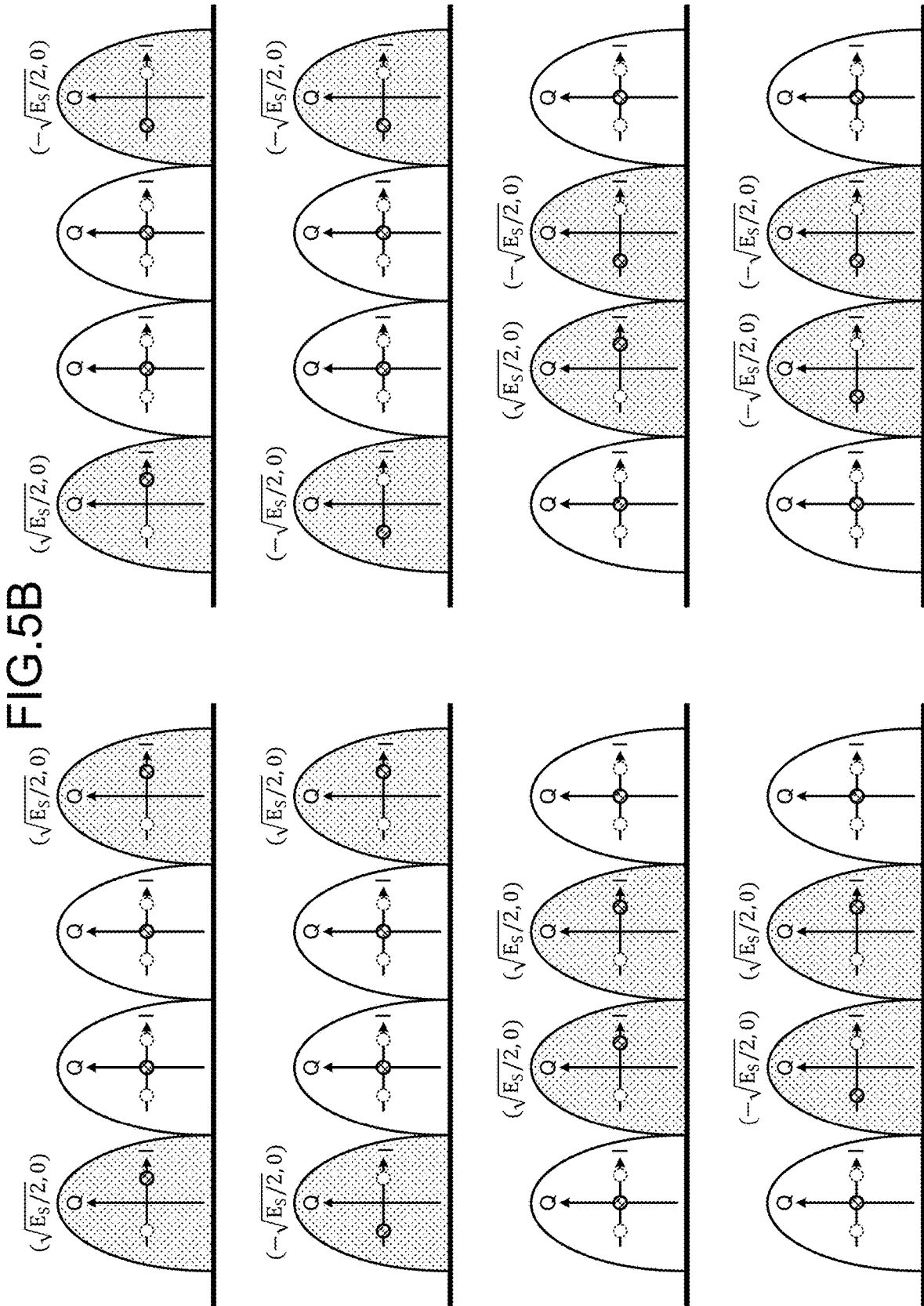
FIG. 5B is a diagram illustrating an example of the modulation by the IM.
Figure 5C:
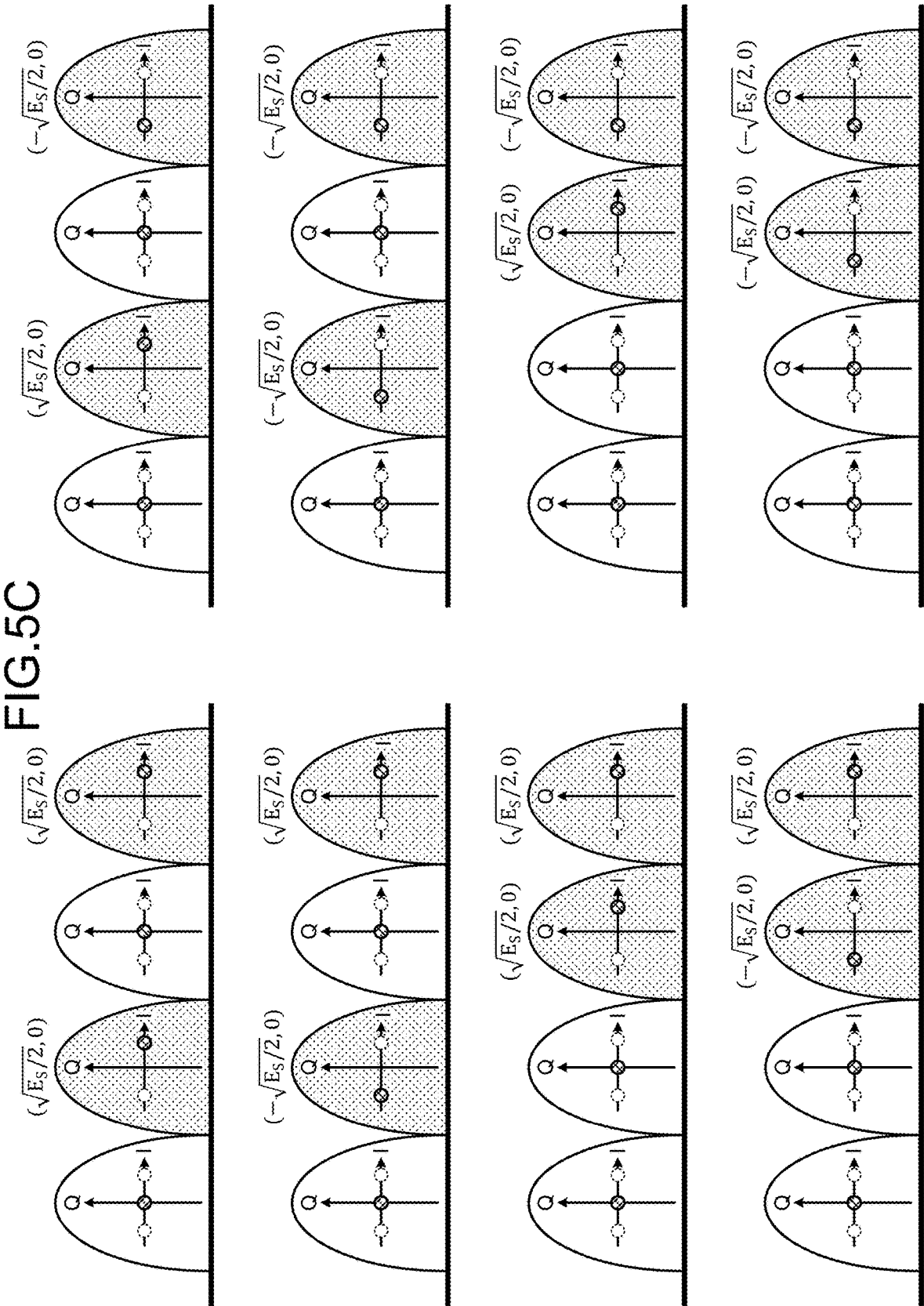
FIG. 5C is a diagram illustrating an example of the modulation by the IM.

FIGS. 5A to 5C are diagrams illustrating examples of the modulation by the IM. FIGS. 5A to 5C illustrate examples in which complex signal points (BPSK) are arranged on K=2 resource elements for N=4 resource elements. Hereinafter, this IM is also referred to as 2/4 subcarrier index modulation (SIM).

The upper right part of FIG. 5A illustrates an example in which two resource elements are selected from the four resource elements in ascending order of frequency, and complex signal points of $((Es/2)^{1/2}, 0)$ are respectively arranged in the selected two resource elements. Furthermore, in the upper left part of FIG. 5A, an example is illustrated in which complex signal points of $(-(Es/2)^{1/2}, 0)$ and $((Es/2)^{1/2}, 0)$ are arranged in ascending order of frequency with respect to two resource elements selected in ascending order of frequency.

As described above, when complex signal points (BPSK) are arranged on K=2 resource elements for N=4 resource elements, the total number of combinations of resource elements to which a bit sequence can be allocated is 24.

In addition, in the case of 2/4 SIM, the number of bits $N_B$ of the bit sequence that can be allocated to the selected resource element is obtained from Formulas (4) and (5) below, and $N_B=4$.

$$N_B = \text{floor}\left[\log_2\left\{M^K C\right\}\right] = \text{floor}\left[\log_2\left\{2^2 \times 6\right\}\right] = 4 \tag{4}$$

$$C = \binom{N}{K} = \binom{4}{2} = 6 \tag{5}$$

Arrangement Example 2

In the arrangement example described above, a case where K $(=K_1)$ resource elements are selected for N resource elements is described, but the number of resource elements to be selected is not limited to $K_1$. For example, the IM may be a modulation scheme in which $K_2$, $K_3$, . . . , and $K_L$ ($\leq$N) resource elements are selected in addition to $K_1$ resource elements, and complex signal points are arranged on the selected resource elements. Note that L is an integer of L$\geq$2.

In such a modulation scheme, complex signal points included in a non-zero complex signal point set configured with $M=2^m$ or $M\neq2^m$ resource elements are arranged as complex signal points arranged in the resource element. In this case, the number of bits $N_B$ of the bit sequence that can be transmitted by using the N resource elements is obtained based on Formulas (6) and (7).

$$N_B = \text{floor}\left[\log_2\left\{M^K + C_1 + M^{K_2}C_2 + \ldots + M^{K_L}C_L\right\}\right] \tag{6}$$

$$C_1 = \binom{N}{K_1}, C_2 = \binom{N}{K_2}, \ldots , C_L = \binom{N}{K_L} \tag{7}$$

Here, for example, an example of a case where $K_2=1$ resource element is selected in addition to $K_1=2$ resource elements for N=4 resource elements is described. Here, complex signal points (BPSK) are arranged in the selected $K_1=2$ or $K_2=1$ resource elements. Hereinafter, this IM is also referred to as (2/4+1/4) SIM.

Figure 6:
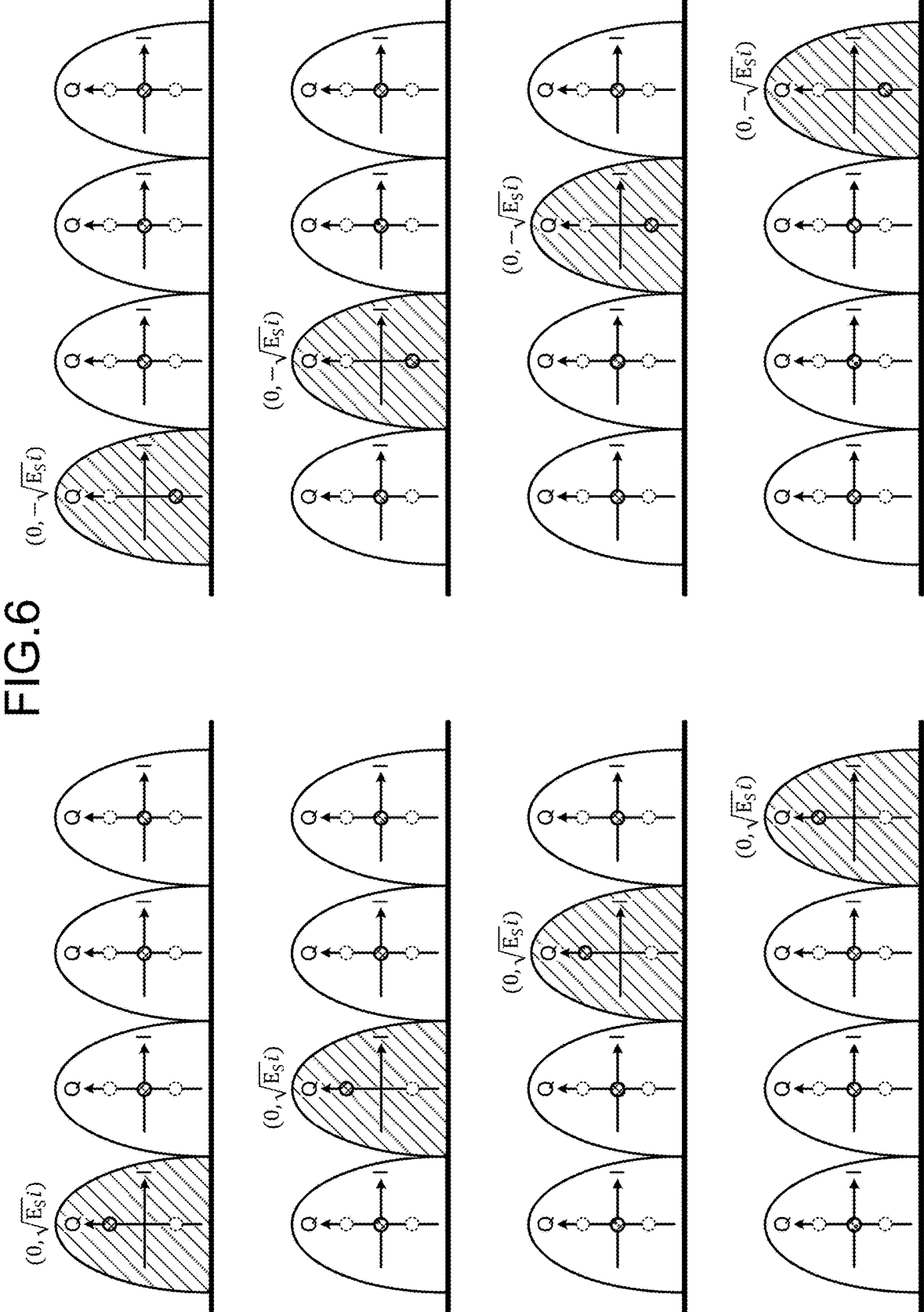
FIG. 6 is a diagram illustrating an example of the modulation by the IM.

In this case, complex signal points illustrated in FIG. 6 are arranged in addition to FIGS. 5A to 5C. FIG. 6 is a diagram illustrating an example of the modulation by the IM.

Specifically, as illustrated in FIGS. 5A to 5C, complex signal points of $((Es/2)^{1/2}, 0)$ or $(-(Es/2)^{1/2}, 0)$ are arranged in two resource elements. Furthermore, as illustrated in FIG. 6, complex signal points of $(0, Es^{1/2}i)$ or $(0, -Es^{1/2}i)$ are arranged in one resource element. The upper right part of FIG. 6 illustrates an example in which one resource element is selected from four resource elements in ascending order of frequency, and a complex signal point of $(0, Es^{1/2}i)$ is arranged in the selected one resource element.

As described above, when complex signal points (BPSK) are arranged on $K_1=2$ or $K_2=1$ resource elements for N=4 resource elements, the total number of combinations of resource elements to which a bit sequence can be allocated is 24+8=32.

In addition, in the case of (2/4+1/4) SIM, the number of bits $N_B$ of the bit sequence that can be allocated to the selected resource element is obtained from Formulas (8) to (9) below, and $N_B=5$.

$$N_B = \text{floor}\left[\log_2\{M^{K_1}C_1 + M^{K_2}C_2\}\right] \quad (8)$$

$$= \text{floor}\left[\log_2\{2^2 \times 6 + 2^1 \times 4\}\right]$$

$$= \text{floor}[\log_2\{24 + 8\}]$$

$$= 5$$

$$C_1 = \binom{N}{K_1} = \binom{4}{2} = 6 \quad (9)$$

$$C_1 = \binom{N}{K_1} = \binom{4}{1} = 4 \quad (10)$$

In this manner, by setting the number K of resource elements to be selected to plural $(K_1, K_2, \ldots,$ and $K_L)$ even when the total number N of resource elements is the same, the number of bits of the bit sequence that can be transmitted can be increased.

Arrangement Example 3

In Arrangement Examples 1 and 2 described above, a case where K $(=K_1)$ resource elements are selected for N=4 resource elements is described, but the total number of resource elements is not limited to N=4. For example, the IM may be a modulation scheme in which K resource elements are selected for N=2 resource elements.

For example, the IM may be a modulation scheme in which K=2 resource elements are selected for N=2 resource elements (hereinafter, also referred to as 1/2 SIM). Alternatively, the IM may be a modulation scheme in which K=2 resource elements are selected for N=2 resource elements (hereinafter, also referred to as 2/2 SIM). In addition, the IM may be a modulation scheme in which $K_1=1$ or $K_2=2$ resource elements are selected for N=2 resource elements (hereinafter, also referred to as 1/2+2/2 SIM).

Figure 7A:
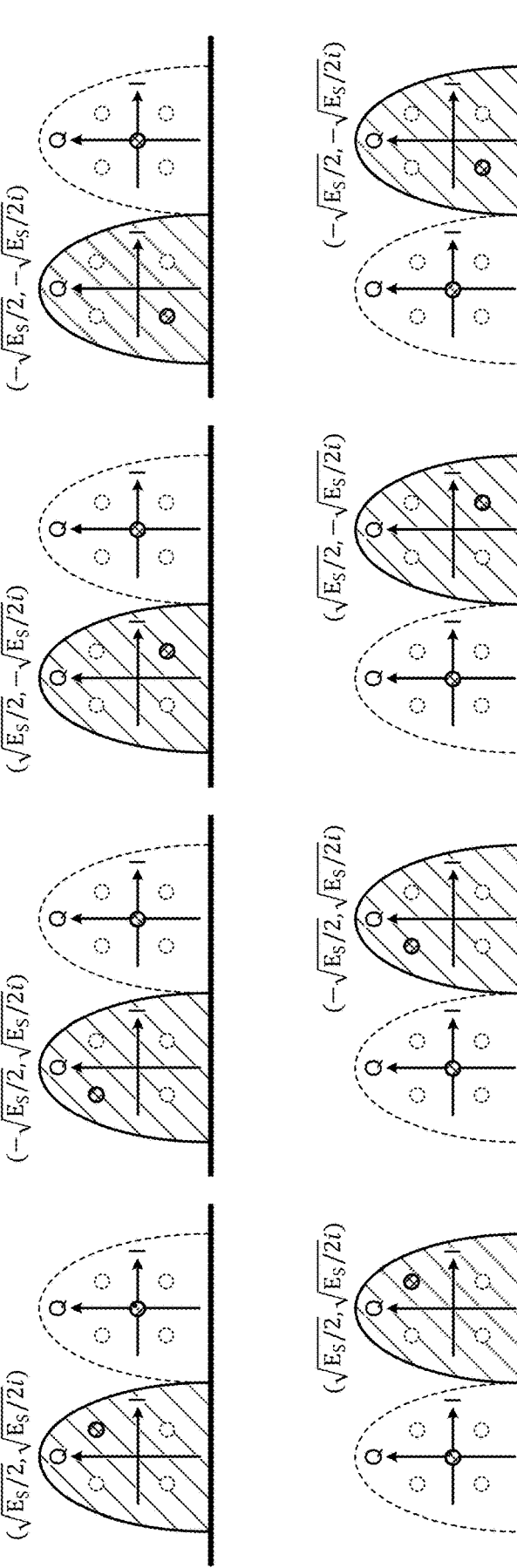
FIG. 7A is a diagram illustrating an example of the modulation by the IM.
Figure 7B:
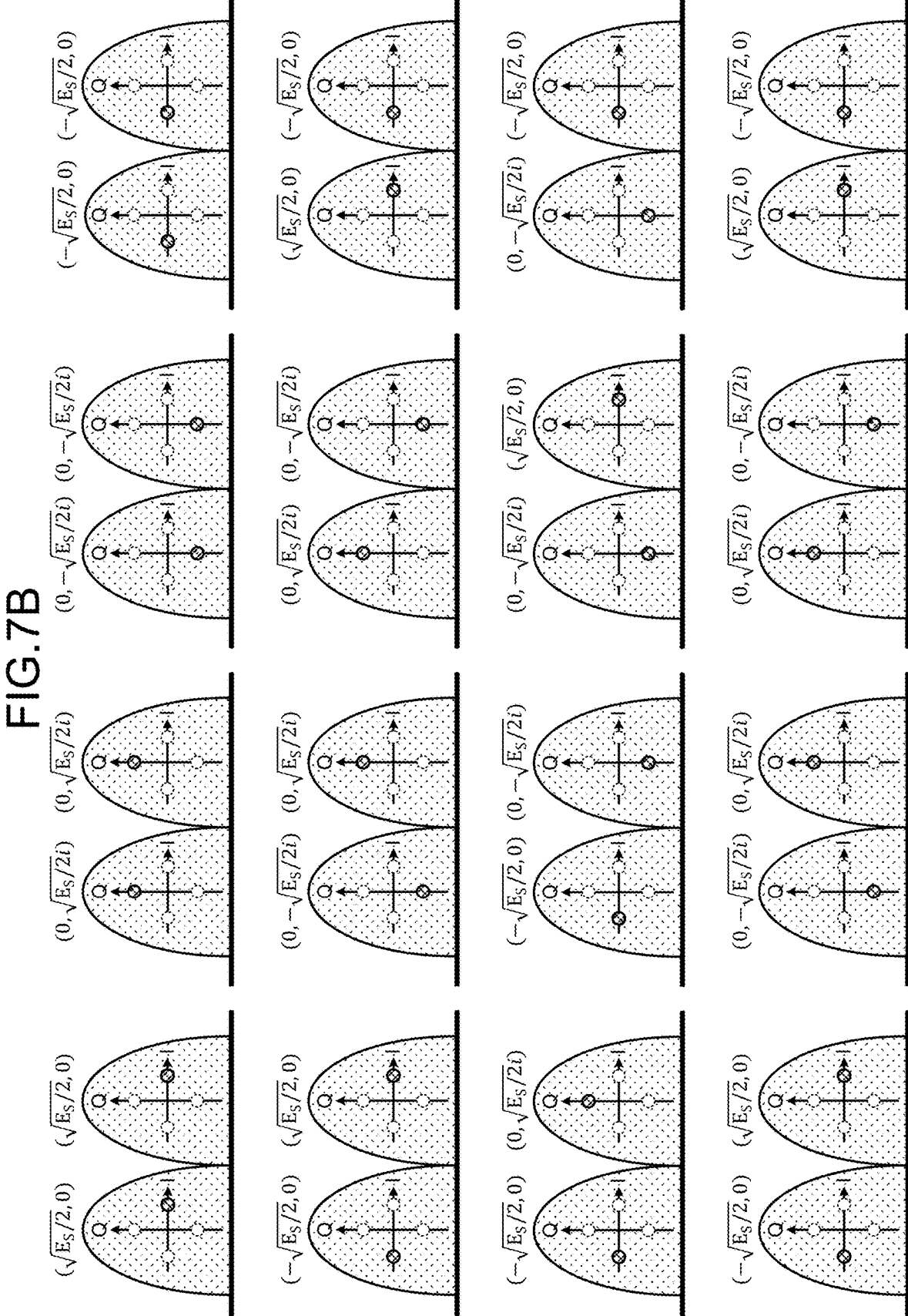
FIG. 7B is a diagram illustrating an example of the modulation by the IM.

FIGS. 7A and 7B are diagrams illustrating examples of the modulation by the IM. FIGS. 7A and 7B illustrate examples in which QPSK signal points are arranged as complex signal points in (1/2+2/2) SIM.

In this case, as illustrated in FIG. 7A, any one of complex signal points $((Es/2)^{1/2}, (Es/2)^{1/2}i), ((Es/2)^{1/2}, (Es/2)^{1/2}i), (-(Es/2)^{1/2}, (Es/2)^{1/2}i)$, and $(-(Es/2)^{1/2}, -(Es/2)^{1/2}i)$ is arranged in one resource element selected from the two resource elements. Furthermore, as illustrated in FIG. 7B, any one of complex signal points of $((Es/2)^{1/2}, 0), (-(Es/2)^{1/2}, 0), (0, (Es/2)^{1/2}i)$, and $(0, -(Es/2)^{1/2}i)$ is arranged in two resource elements selected from the two resource elements.

The upper right part of FIG. 7A illustrates an example in which one resource element is selected from the two resource elements in ascending order of frequency, and complex signal points of $((Es/2)^{1/2}, (Es/2)^{1/2}i)$ are arranged in the selected one resource element.

Furthermore, an upper right part of FIG. 7B illustrates an example of a case where two resource elements are selected from two resource elements. Here, an example is illustrated in which complex signal points of $((Es/2)^{1/2}, 0)$ are arranged in each of the two selected resource elements.

As described above, when complex signal points (BPSK) are arranged on $K_1=1$ or $K_2=2$ resource elements for N=2 resource elements, the total number of combinations of resource elements to which a bit sequence can be allocated is 8+16=24.

Arrangement Example 4

Figure 8:
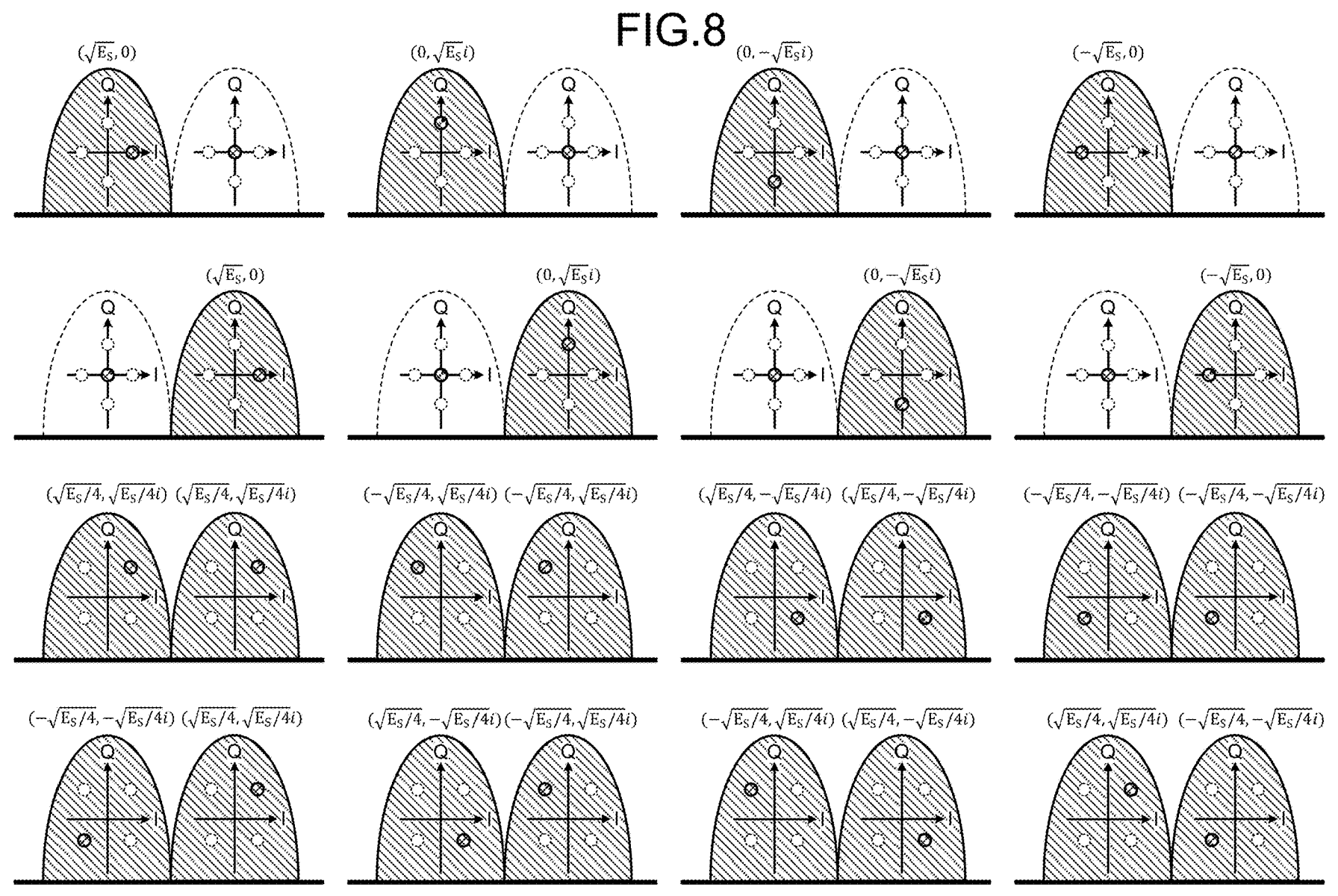

An amplitude change and a phase rotation may be added to the (1/2+2/2) SIM shown in the above arrangement example 3. Such a case is described as Arrangement Example 4 with reference to FIG. 8. FIG. 8 is a diagram illustrating an example of the modulation by the IM. For distinguishment from the (1/2+2/2) SIM illustrated in FIGS. 7A and 7B, the (1/2+2/2) SIM illustrated in FIG. 8 may be referred to as a block SIM.

As illustrated in FIG. 8, when one resource element is selected from two resource elements (that is, 1/2 SIM), any one of complex signal points of $(Es^{1/2}, 0), (-Es^{1/2}, 0), (0, Es^{1/2}i)$, and $(0, -Es^{1/2}i)$ is arranged in the selected one resource element.

In addition, when two resource elements are selected from the two resource elements (that is, 2/2 SIM), any one of complex signal points of $((Es/4)^{-2}, (Es/4)^{1/2}i), ((Es/4)^{1/2}, -(Es/4)^{1/2}i), (-(Es/4)^{1/2}, (Es/4)^{1/2}i)$, and $(-(Es/4)^{1/2}, -(Es/4)^{1/2}i)$ is arranged in the selected two resource elements. Note that the signal point arrangement example in FIG. 8 is a schematic diagram and is different from the actual signal point arrangement.

As illustrated in FIG. 8, in the block SIM, the signal point arrangement of 2/2 SIM is rotated by $\theta=\pi/4$ phase, and the amplitude is also changed as compared with the signal point arrangement of 1/2 SIM.

In this manner, by arranging the complex signal points by shifting the phase rotation, the minimum distance between code words can be expanded, and the error at the time of decoding can be further reduced.

Also in Arrangement Examples 2 and 3 described above, the amplitude change and/or the phase rotation can be added to the complex signal points arranged for the same reason. For example, in Arrangement Example 2, as illustrated in FIGS. 5A to 5C and FIG. 6, the signal point arrangement of 1/4 SIM is rotated by $\theta=\pi/2$ phase, and the amplitude is also changed as compared with the signal point arrangement of 2/4 SIM.

As described above, when the number K to be selected is plural $(K_1, K_2, \ldots,$ and, $K_L)$, the phase rotation is performed by a different amount according to the number to be selected, so that the minimum distance between code words can be expanded, and the error at the time of decoding can be further reduced.

Here, the relationship between the number of resource elements and the number of bits $N_B$ of the bit sequence to be mapped is expressed by Formulas (11) and (12) below.

$$2^{N_B} \le M^K C \quad (11)$$

$$2^{N_B} \le M^{K_1}C_1 + M^{K_2}C_2 + \ldots + M^{K_L}C_L \quad (12)$$

In Formulas (11) and (12), when the left side and the right side are equal, in other words, when the number of resource elements and the number of bit sequences to be mapped are equal, different bit sequences are mapped to all resource elements.

Meanwhile, in Formulas (11) and (12), when the right side may be larger than the left side, in other words, the number of resource elements may be larger than the number of bit sequences to be mapped. For example, in the case of the (1/2+2/2) SIM of QPSK in Arrangement Example 3 described above, the number of resource elements is 24, while the number of mappable bit sequences is 16. In this case, the resource element to be used for mapping is selected from the resource elements, and the bit sequence is mapped.

<1.5. Outline of Present Embodiment>

Here, in a multi-access environment in which a plurality of communication devices perform communication, there is a problem that an error rate characteristic is deteriorated due to occurrence of interference between the communication devices (multi-user interference). On the other hand, a technique of reducing multi-user interference by providing a guard at a boundary of resources used by a communication device is known (see, for example, the Non Patent Literature described above).

However, when the guard is provided, a problem that utilization efficiency of resources is reduced occurs.

Therefore, the communication device according to the present embodiment performs communication by allocating a signal modulated by a first modulation scheme to a first resource and allocating a signal modulated by a second modulation scheme to a second resource among predetermined resources used for communication. The first modulation scheme is, for example, the IM described above and is a method of performing signal modulation by a combination of active resources and inactive resources. The second modulation scheme is a modulation scheme different from the first modulation scheme and is, for example, a modulation scheme used in normal communication such as QPSK.

The first modulation scheme is less likely to cause multi-user interference than the second modulation scheme. Therefore, multi-user interference can be reduced by allocating a signal modulated by the first modulation scheme to the first resource (for example, a resource adjacent to a resource used by another terminal device 40). In addition, unlike the guard period, by allocating a signal to the first resource, a decrease in resource utilization efficiency can be suppressed.

As described above, in the communication scheme according to the present embodiment, the signal modulated by the first modulation scheme is allocated to the first resource, and the signal modulated by the second modulation scheme is allocated to the second resource. As a result, it is possible to suppress a decrease in resource utilization efficiency while reducing the multi-user interference, and it is possible to further improve quality between radio links.

Although the outline of the present embodiment is described above, a communication system 1 according to the present embodiment is described in detail below.

2. Configuration of Communication System

The communication system 1 includes a base station device and is wirelessly connectable to a terminal device.

Note that the communication system 1 may support a radio access technology (RAT) such as long term evolution (LTE) or new radio (NR). LTE and NR are a type of cellular communication technology and enable mobile communication of a terminal device by arranging a plurality of areas covered by a base station in a cell shape.

Note that, in the following description, "LTE" includes LTE-Advanced (LTE-A), LTE-Advanced Pro (LTE-A Pro), and evolved universal terrestrial radio access (EUTRA). In addition, the NR includes new radio access technology (NRAT) and Further EUTRA (FEUTRA). Note that a single base station may manage a plurality of cells. In the following description, a cell corresponding to LTE is referred to as an LTE cell, and a cell corresponding to NR is referred to as an NR cell.

The NR is a radio access technology (RAT) of a next generation (fifth generation) of LTE (fourth generation communication including LTE-Advanced and LTE-Advanced Pro). The NR is a radio access technology that can support various use cases including enhanced mobile broadband (eMBB), massive machine type communications (mMTC), and ultra-reliable and low latency communications (URLLC). The NR has been studied aiming at a technical framework corresponding to usage scenarios, requirement conditions, arrangement scenarios, and the like in these use cases.

Hereinafter, a configuration of the communication system 1 is specifically described.

<2.1. Overall Configuration of Communication System>

Figure 9:
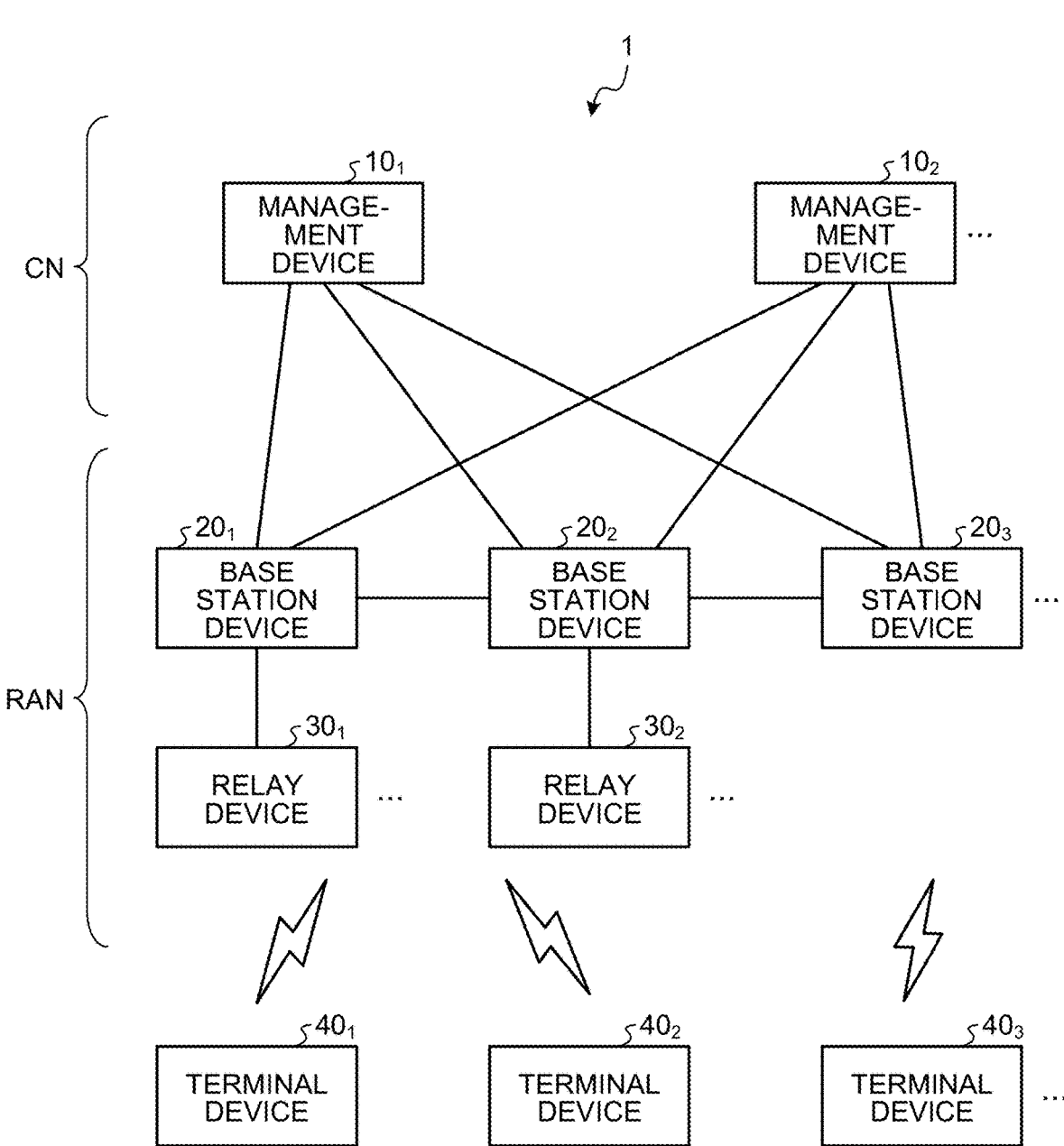
FIG. 9 is a diagram illustrating a configuration example of a communication system according to the embodiment of the present disclosure.

FIG. 9 is a diagram illustrating a configuration example of the communication system 1 according to the embodiment of the present disclosure. The communication system 1 is a wireless communication system that provides a terminal device with a radio access network. For example, the communication system 1 is a cellular communication system using a radio access technology such as LTE or NR. Here, the radio access network may be an evolved universal terrestrial radio access network (E-UTRAN) or a next generation radio access network (NG-RAN).

As illustrated in FIG. 9, the communication system 1 includes a management device 10, a base station device 20, a relay device 30, and a terminal device 40. The communication system 1 provides the user with a wireless network capable of mobile communication by the communication devices that configure the communication system 1 operating in cooperation. The wireless network of the present embodiment includes a radio access network RAN and a core network CN. Note that the communication device is a device having a wireless communication function and corresponds to the base station device 20, the relay device 30, and the terminal device 40 in the example of FIG. 9.

The communication system 1 may include the plurality of management devices 10, the plurality of base station devices 20, the plurality of relay devices 30, and the plurality of terminal devices 40. In the example of FIG. 9, the communication system 1 includes management devices $10_1$, $10_2$, and the like as the management device 10. Furthermore, the communication system 1 includes base station devices $20_1$, $20_2$, $20_3$, and the like as the base station device 20, and includes relay devices $30_1$, $30_2$, and the like as the relay device 30. Furthermore, the communication system 1 includes terminal devices $40_1$, $40_2$, $40_3$, and the like as the terminal device 40.

Note that devices in the drawing may be considered as devices in a logical sense. That is, a part of the devices in the same drawing may be implemented by a virtual machine (VM), a container, a docker, and the like, and the virtual machine (VM), the container, the docker, and the like may be implemented on physically the same hardware.

Note that a base station in LTE may be referred to as an evolved node B (eNodeB) or an eNB. Further, a base station in NR may be referred to as a next generation RAN node (NGRAN node), a gNodeB, or a gNB. In the LTE and the NR, a terminal device (also referred to as a mobile station, a mobile station device, or a terminal) may be referred to as user equipment (UE). Note that the terminal device is a type of communication device and is also referred to as a mobile station, a mobile station device, or a terminal.

In the present embodiment, the concept of the communication device includes not only a portable mobile device (terminal device) such as a mobile terminal but also a device installed in a structure or a moving body. The structure or the moving body itself may be regarded as a communication device. In addition, the concept of the communication device includes not only a terminal device but also a base station device and a relay device. The communication device is a type of a processing device and an information processing device. Furthermore, the communication device can be rephrased as a transmission device or a reception device.

[Management Device]

The management device 10 is a device that manages a wireless network. For example, the management device 10 is a device that manages communication of the base station device 20. For example, the management device 10 is a device that functions as a mobility management entity (MME), an access and mobility management function (AMF), or a session management function (SMF). Note that the MME is connected to the EUTRAN via an S1 interface and controls non-access stratum (NAS) signaling with the UE or manages mobility of the UE. The AMF is connected to the NGRAN via an NG interface and controls non-access stratum (NAS) signaling with the UE or manages mobility of the UE.

The management device 10 may be included in the core network CN together with a gateway device and the like. The core network CN is, for example, a network of a predetermined entity such as a mobile communication carrier. For example, the core network CN is an evolved packet core (EPC) or a 5G core network (5GC). Note that the predetermined entity may be the same as or may be different from the entity that uses, operates, and/or manages the base station device 20.

Note that the core network transfers user data between a packet data network (OPDN) or a data network (DN) and the RAN in addition to a control plane (C-plane) node such as the management device 10. User plane (U-Plane) nodes may be included. The U-plane node in the EPC may include a serving gateway (S-GW) or a PDN-Gateway (P-GW). The U-plane node in the 5GC may include a U-plane function (UPF). For example, the management device 10 manages a position of the terminal device 40 (UE) in the communication system 1 for each terminal device 40 in an area unit (for example, a tracking area and a RAN notification area) including a plurality of cells. Note that the management device 10 may grasp and manage which base station (or which cell) the terminal device 40 is connected to, which base station (or which cell) the terminal device 40 exists in a communication area of, and the like, for each terminal device 40 in units of cells.

Note that the management device 10 may have a function of a gateway. For example, when the core network is an EPC, the management device 10 may have a function as an S-GW or a P-GW. Further, when the core network is 5GC, the management device 10 may have a function as a user plane function (UPF). In addition, the management device 10 may be an SMF, a PCF, a UDM, or the like. The core network CN may include an SMF, a PCF, a UDM, and the like.

Note that the management device 10 may not be a device that configures the core network CN. For example, it is assumed that the core network CN is a core network of wideband code division multiple access (W-CDMA) or code division multiple access 2000 (cdma 2000). At this time, the management device 10 may be a device that functions as a radio network controller (RNC).

The management device 10 is connected to each of the plurality of base station devices 20. For example, in the case of 5GS, an N2 reference point exists between the AMF and the NG-RAN, and the AMF and the NG-RAN are logically connected to each other via the NG interface.

The management device 10 manages communication of the base station device 20. For example, the management device 10 manages a position of the terminal device 40 for each terminal device 40 in an area unit (for example, a tracking area and a RAN notification area) including a plurality of cells. Note that the management device 10 may grasp and manage which base station device (or which cell) the terminal device 40 is connected to, which base station device (or which cell) the terminal device 40 exists in a communication area of, and the like, for each terminal device 40.

(Base Station Device)

The base station device 20 is a wireless communication device that performs wireless communication with the terminal device 40. The base station device 20 is a type of communication device. In addition, the base station device 20 is a type of information processing device.

The base station device 20 may be, for example, a device corresponding to a radio base station (such as a base station, a node B, an eNB, or a gNB) or a radio access point. When the base station device 20 is an eNB, a gNB, or the like, the base station device 20 may be referred to as 3GPP access. When the base station device 20 is a radio access point, the base station device 20 may be referred to as non-3GPP access. Furthermore, the base station device 20 may be a radio relay node. Furthermore, the base station device 20 may be an optical extension device referred to as a remote radio head (RRH). Furthermore, the base station device 20 may be a receiving station device such as a field pickup unit (FPU). Furthermore, the base station device 20 may be an integrated access and backhaul (IAB) donor node or an IAB relay node that provides a radio access line and a radio backhaul line by time division multiplexing, frequency division multiplexing, or space division multiplexing.

Note that, when the base station device 20 is a gNB, the base station device may be referred to as a combination of a gNB central unit (CU) and a gNB distributed unit (DU) or any of these. In the present embodiment, a base station of a wireless communication system may be referred to as a base station device. The base station device 20 may be configured to be able to wirelessly communicate with another base station device 20. For example, when the plurality of base station devices 20 are a combination of eNBs or a combination of an eNB and a gNB, the corresponding devices may be connected to each other via an X2 interface. Furthermore, when the plurality of base station devices 20 are a combination of gNBs or a combination of an eNB and a gNB, the corresponding devices may be connected to each other via an Xn interface. Furthermore, when the plurality of base station devices 20 is a combination of a gNB CU and a gNB DU, the devices may be connected to each other via an F1 interface. Messages and information (information of RRC signaling or DCI) described below may be communicated between the plurality of base station devices 20 (for example, via X2, Xn, and F1 interfaces).

Note that the radio access technology used by the base station device 20 may be a cellular communication technology or a wireless LAN technology. Of course, the radio access technology used by the base station device 20 is not limited thereto and may be another radio access technology. The radio access technology used by the base station device 20 may be a low power wide area (LPWA) communication technology. Here, the LPWA communication is communication conforming to the LPWA standard. Examples of the LPWA standard include ELTRES, ZETA, SIGFOX, LoRaWAN, and NB-Iot. Of course, the LPWA standard is not limited thereto and may be other LPWA standards. In addition, the wireless communication used by the base station device 20 may be wireless communication using millimeter waves. Furthermore, the wireless communication used by the base station device 20 may be wireless communication using radio waves or may be wireless communication (optical radio) using infrared rays or visible light.

Note that the base station devices 20 may be able to communicate with each other via an interface between a base station device and a core network (for example, S1 Interface). This interface may be either wired or wireless. Furthermore, the base station devices may be able to communicate with each other via an interface between base station devices (for example, an X2 Interface or an S1 Interface). This interface may be either wired or wireless.

Note that the plurality of base station devices 20 may be able to communicate with each other via an interface between a base station device and a core network (for example, an NG Interface and an S1 Interface). This interface may be either wired or wireless. Furthermore, the base station devices may be able to communicate with each other via an interface between base station devices (for example, an Xn Interface or an X2 Interface). This interface may be either wired or wireless.

Furthermore, the base station device 20 may be configured with a set of a plurality of physical or logical devices. For example, according to the present embodiment, the base station may be distinguished into a plurality of devices of a baseband unit (BBU) and a radio unit (RU) and may be interpreted as an assembly of the plurality of devices. Additionally or alternatively, according to the embodiments of the present disclosure, the base station may be either or both of the BBU and the RU. The BBU and the RU may be connected to each other via a predetermined interface (for example, eCPRI). Additionally or alternatively, the RU may be referred to as a remote radio unit (RRU) or a radio DoT (RD). Additionally or alternatively, the RU may correspond to a gNB-DU described below. Additionally or alternatively, the BBU may correspond to a gNB-CU described below. Additionally or alternatively, the RU may be a device integrally formed with an antenna. The antenna (for example, the antenna integrally formed with the RU) included in the base station may employ an advanced antenna system and support MIMO (for example, FD-MIMO) or beamforming. In the advanced antenna system, the antenna (e.g., the antenna integrally formed with the RU) included in the base station may include, for example, 64 transmission antenna ports and 64 reception antenna ports.

Note that the plurality of base station devices 20 may be connected to each other. One or the plurality of base station devices 20 may be included in a radio access network (RAN). That is, the base station may be simply referred to as a RAN, a RAN node, an access network (AN), or an AN node. The RAN in LTE is referred to as an enhanced universal terrestrial RAN (EUTRAN). The RAN in NR is referred to as NGRAN. The RAN in W-CDMA (UMTS) is referred to as UTRAN.

Note that a base station in LTE may be referred to as an evolved node B (eNodeB) or an eNB. That is, the EUTRAN includes one or the plurality of eNodeBs (eNBs). Furthermore, the base station in NR may be referred to as a gNodeB or a gNB. That is, the NGRAN includes one or the plurality of gNBs. Further, the EUTRAN may include a gNB (en-gNB) connected to a core network (EPC) in an LTE communication system (EPS). Similarly, the NGRAN may include an ng-eNB connected to a core network 5GC in a 5G communications system (5GS).

Further, when the base station is an eNB, a gNB, or the like, the base station may be referred to as 3GPP Access. Further, when the base station is a radio access point, the base station may be referred to as a non-3GPP access. Furthermore, the base station may be an optical extension device referred to as a remote radio head (RRH). Additionally or alternatively, when the base station is a gNB, the base station may be referred to as a combination or any one of the gNB central unit (CU) and gNB distributed unit (DU) described above.

The gNB central unit (CU) hosts a plurality of upper layers (for example, RRC, SDAP, or PDCP) in the access stratum for communication with the UE. Meanwhile, the gNB-DU hosts a plurality of lower layers (for example, RLC, MAC, or PHY) of the access stratum. That is, among messages and information described below, RRC signalling (semi-static notification) may be generated by the gNB CU, and DCI (dynamic notification) may be generated by the gNB-DU. Alternatively, in the RRC configuration (semi-static notification), for example, a part of configurations such as a cellGroupConfig information element (IE) may be generated by the gNB-DU, and the remaining configurations may be generated by the gNB-CU. These configurations may be transmitted and received through the F1 interface.

The base station device 20 may be configured to be able to communicate with another base station device 20. For example, when the plurality of base station devices 20 are a combination of eNBs or a combination of an eNB and an en-gNB, the corresponding base station devices 20 may be connected to each other by the X2 interface. Furthermore, when the plurality of base station devices 20 are a combination of gNBs or a combination of a gn-eNB and a gNB, the corresponding devices may be connected to each other via an Xn interface. Further, when the plurality of base station devices 20 are a combination of a gNB central unit (CU) and a gNB distributed unit (DU), the devices may be connected by the F1 interface described above. A message and information (RRC signalling or DCI information) may be communicated between a plurality of base stations (for example, via X2, Xn, and F1 interfaces).

The base station device 20 can be used, operated, and/or managed by various entities. For example, a mobile network operator (MNO), a mobile virtual network operator (MVNO), a mobile virtual network enabler (MVNE), a neutral host network (NHN) operator, administrators of an enterprise, an educational institution (such as an educational institution or a municipal board of education), or a real estate (such as a building or an apartment), or an individual can be assumed as the entity.

Of course, the entity that uses, operates, and/or manages the base station device 20 is not limited thereto. The base station device 20 may be installed and/or operated by one operator or may be installed and/or operated by one individual. Of course, the entity of the installation and operation of the base station device 20 is not limited thereto. For example, the base station device 20 may be installed and operated by a plurality of operators or a plurality of individuals in cooperation. Furthermore, the base station device 20 may be a shared facility used by a plurality of operators or a plurality of individuals. In this case, the facility may be installed and/or operated by a third party different from the user.

Note that the concept of the base station device (also referred to as a base station) includes not only a donor base station but also a relay base station (also referred to as a relay node, a relay station, a relay base station, or a relay station device.). In addition, the concept of the base station includes not only a structure having a function of the base station but also a device installed in the structure.

The structure is, for example, a building such as a high-rise building, a house, a steel tower, a station establishment, an airport establishment, a harbor establishment, or a stadium. Note that the concept of a structure includes not only a building but also a construction (non-building structure) such as a tunnel, a bridge, a dam, a wall, or an iron pillar, and a facility such as a crane, a gate, or a windmill. In addition, the concept of the structure includes not only a structure on land (on the ground in a narrow sense) or under the ground but also a structure on water such as a pier or a megafloat and a structure under water such as a marine observation facility. The base station device can be rephrased as a processing device or an information processing device.

The base station device 20 may be a donor station or a relay node (relay station). Furthermore, the base station device 20 may be a fixed station or a mobile station. The mobile station is a wireless communication device (for example, the base station device) configured to be movable. At this time, the base station device 20 may be a device installed in a moving body or may be a moving body itself. For example, a relay node device having mobility can be regarded as the base station device 20 as a mobile station. In addition, a device which originally has a mobility and which has a function of a base station device (at least a part of the function of the base station device), such as a vehicle, a drone (aerial vehicle), or a smartphone, also corresponds to the base station device 20 as a mobile station.

Here, the moving body may be a mobile terminal such as a smartphone or a mobile phone. Furthermore, the moving body may be a moving body that moves on land (on the ground in a narrow sense) (for example, a vehicle such as an automobile, a bicycle, a bus, a truck, a motorcycle, a train, or a linear motor car) or may be a moving body that moves under the ground (for example, in a tunnel) (for example, a subway).

Furthermore, the moving body may be a moving body that moves on water (for example, a ship such as a passenger ship, a cargo ship, or a hovercraft) or may be a moving body that moves under water (for example, a submarine such as a submersible boat, a submersible vessel, and an unmanned submersible).

Furthermore, the moving body may be a moving body that moves inside the atmosphere (for example, an aircraft such as an airplane, an airship, and a drone (aerial vehicle)) or a moving body that moves outside the atmosphere (for example, an artificial celestial body such as an artificial satellite, a spacecraft, a space station, and a probe). The moving body that moves outside the atmosphere can be rephrased as a space moving body.

Furthermore, the base station device 20 may be a ground base station device (ground station device) installed on the ground. For example, the base station device 20 may be a base station device arranged in a structure on the ground or may be a base station device installed in a moving body that moves on the ground. More specifically, the base station device 20 may be an antenna installed in a structure such as a building and a signal processing device connected to the antenna. Of course, the base station device 20 may be a structure or a moving body itself. The expression "on the ground" refers to "on the ground" in a broad sense including not only "on land" (on the ground in a narrow sense) but also "in the ground", "on water", and "under water". Note that the base station device 20 is not limited to the ground base station device. The base station device 20 may be a non-ground base station device (non-ground station device) capable of floating in the air or space. For example, the base station device 20 may be an aircraft station device or a satellite station device.

The aircraft station device is a wireless communication device capable of floating in the atmosphere (including the stratosphere), such as an aircraft. The aircraft station device may be a device mounted on an aircraft or the like or may be an aircraft itself. Note that the concept of an aircraft includes not only a heavy aircraft such as an airplane and a glider but also a light aircraft such as a balloon and an airship. In addition, the concept of an aircraft includes not only a heavy aircraft and a light aircraft but also a rotorcraft such as a helicopter and an autogyro. Note that the aircraft station device (alternatively, an aircraft on which an aircraft station device is mounted) may be an unmanned aircraft such as a drone (aerial vehicle). Note that, when the aircraft station device functions as user equipment (UE), the corresponding aircraft station device may be an aerial UE.

Note that the concept of the unmanned aircraft also includes an unmanned aircraft system (UAS) and a tethered UAS. The concept of the unmanned aircraft also includes lighter than air UAS (LTA) and heavier than air UAS (HTA). Other concepts of the unmanned aircraft also include high altitude UAS platforms (HAPs).

The satellite station device is a wireless communication device capable of floating outside the atmosphere. The satellite station device may be a device mounted on a space moving body such as an artificial satellite or may be a space moving body itself. A satellite serving as the satellite station device may be any of a low earth orbiting (LEO) satellite, a medium earth orbiting (MEO) satellite, a geostationary earth orbiting (GEO) satellite, and a highly elliptical orbiting (HEO) satellite. Of course, the satellite station device may be a device mounted on the low earth orbiting satellite, the middle earth orbiting satellite, the geostationary earth orbiting satellite, or the highly elliptical orbiting satellite.

The size of the coverage of the base station device 20 may be as large as a macro cell or as small as a pico cell. Of course, the size of the coverage of the base station device 20 may be as extremely small as a femto cell. Further, the base station device 20 may have a beamforming capability. In this case, the base station device 20 may form a cell or a service area for each beam.

A cell provided by the base station device 20 is referred to as a serving cell. The serving cell may include a primary cell (pCell) and a secondary cell (sCell). When the dual connectivity is provided to the UE (for example, the terminal device 40), the pCell and the sCell (s) provided by a master node (MN) are referred to as a master cell group. Examples of the dual connectivity include EUTRA-EUTRA dual connectivity, EUTRA-NR dual connectivity (ENDC), EUTRA-NR dual connectivity with 5GC, NR-EUTRA dual connectivity (NEDC), and NR-NR dual connectivity.

Further, the serving cell may include a PSCell (a primary secondary cell or a primary SCG cell). That is, when the dual connectivity is provided to the UE, the PSCell and sCell (s) provided by a secondary node (SN) are referred to as a secondary cell group (SCG).

One downlink component carrier and one uplink component carrier may be associated with one cell. In addition, the system bandwidth corresponding to one cell may be divided into a plurality of bandwidth parts (BWPs). In this case, one or more BWPs may be set for the UE, and one BWP may be used for the UE as an active BWP. Furthermore, wireless resources (for example, a frequency band, a numerology (subcarrier spacing), a slot format (slot configuration)) that can be used by the terminal device 40 may be different for each cell, each component carrier, or each BWP. Further, one base station device may provide a plurality of cells.

In the example of FIG. 9, the base station device 20₁ is connected to the relay device 30₁, and the base station device 20₂ is connected to the relay device 30₂. The base station device 20₁ can indirectly perform wireless communication with the terminal device 40 via the relay device 30₁. Similarly, the base station device 20₂ can indirectly perform wireless communication with the terminal device 40 via the relay device 30₂.

(Relay Device)

The relay device 30 is a device serving as a relay station of a base station. The relay device 30 is a type of base station device. Furthermore, the relay device 30 is a type of information processing device. The relay device can be rephrased as a relay base station device (or a relay base station).

The relay device 30 can perform wireless communication with the terminal device 40. The relay device 30 relays communication between the base station device 20 and the terminal device 40. Note that the relay device 30 may be configured to be able to wirelessly communicate with another relay device 30 and the base station device 20. The relay device 30 may be a ground station device or may be a non-ground station device. The relay device 30 configures the radio access network RAN together with the base station device 20.

Note that the relay device of the present embodiment may be a fixed device, may be a movable device, or may be a floating device. In addition, the size of the coverage of the relay device of the present embodiment is not limited to a specific size. For example, the cell covered by the relay device may be a macro cell, a micro cell, or a small cell.

In addition, a device on which the relay device of the present embodiment is mounted is not limited as long as the function of relay is satisfied. For example, the corresponding relay machine may be mounted on a terminal device such as a smartphone, may be mounted on an automobile or a human-powered vehicle, may be mounted on a balloon, an airplane, or a drone, or may be mounted on a home appliance such as a television, a game machine, an air conditioner, a refrigerator, or a lighting fixture.

In addition, the configuration of the relay device 30 may be similar to the configuration of the base station device 20 described above. For example, similarly to the base station device 20 described above, the relay device 30 may be a device installed in a moving body or may be a moving body itself. As described above, the moving body may be a mobile terminal such as a smartphone or a mobile phone. In addition, the moving body may be a moving body that moves on land (on the ground in a narrow sense) or may be a moving body that moves in the ground. Of course, the moving body may be a moving body that moves on water or may be a moving body that moves under water. In addition, the moving body may be a moving body that moves in the atmosphere or may be a moving body that moves outside the atmosphere. Furthermore, the base station device 20 may be a ground station device or a non-ground station device. At this time, the relay device 30 may be an aircraft station device or a satellite station device.

Furthermore, the size of the coverage of the relay device 30 may be as large as a macro cell or as small as a pico cell, similarly to the base station device 20. Of course, the size of the coverage of the relay device 30 may be as extremely small as a femto cell. Further, the relay device 30 may have a beamforming capability. In this case, the relay device 30 may form a cell or a service area for each beam.

In addition, the configuration of the relay device 30 may be similar to the configuration of the base station device 20 described above.

(Terminal Device)

The terminal device 40 is a wireless communication device that performs wireless communication with the base station device 20 or the relay device 30. The terminal device 40 is, for example, a mobile phone, a smart device (a smartphone or a tablet), a personal digital assistant (PDA), or a personal computer. Furthermore, the terminal device 40 may be a device such as a business camera provided with a communication function or may be a motorcycle, a moving relay vehicle, or the like on which a communication equipment such as a field pickup unit (FPU) is mounted. Furthermore, the terminal device 40 may be a machine to machine (M2M) device or an internet of things (IOT) device. The terminal device 40 may be referred to as, for example, MTC UE, NB-IOT UE, or Cat·M UE. Further, the terminal device may be referred to as a mobile station (MS) or a wireless transmission reception unit (WTRU).

Furthermore, the terminal device 40 may be capable of sidelink communication with another terminal device 40. The terminal device 40 may be able to use an automatic retransmission technology such as HARQ when performing sidelink communication. Furthermore, the terminal device 40 may be able to perform LPWA communication with another communication device (for example, the base station device 20, the relay device 30, and another terminal device 40). In addition, the wireless communication used by the terminal device 40 may be wireless communication using millimeter waves. Note that the wireless communication (including the sidelink communication) used by the terminal device 40 may be wireless communication using radio waves or wireless communication (optical wireless) using infrared rays or visible light.

Furthermore, the terminal device 40 may be a moving body device. Here, the moving body device is a movable wireless communication device. At this time, the terminal device 40 may be a wireless communication device installed in a moving body or may be a moving body itself. For example, the terminal device 40 may be a vehicle that moves on a road such as an automobile, a bus, a truck, or a motorcycle, or a wireless communication device mounted on the vehicle. Note that the moving body may be a mobile terminal or may be a moving body that moves on land (on the ground in a narrow sense), in the ground, on water, or under water. Furthermore, the moving body may be a moving body that moves in the atmosphere, such as a drone (aerial UE) or a helicopter or may be a moving body that moves outside the atmosphere, such as an artificial satellite.

The terminal device 40 may be simultaneously connected to a plurality of base station devices or a plurality of cells to perform communication. For example, when one base station device can provide a plurality of cells, the terminal device 40 can perform carrier aggregation by using a certain cell as a pCell and using another cell as an sCell. Furthermore, when the plurality of base station devices 20 can respectively provide one or a plurality of cells, the terminal device 40 can implement dual connectivity (DC) by using the one or the plurality of cells managed by one base station device (MN (for example, MeNB or MgNB)) as a pCell, or a pCell and an sCell (s), and using the one or the plurality of cells managed by the other base station device (Sn (for example, SeNB or SgNB)) as a pCell, or a pCell and an sCell (s). The DC may be referred to as a multi connectivity (MC).

Note that, when a communication area is supported via cells of different base station devices 20 (a plurality of cells having different cell identifiers or the same cell identifier), it is possible to bundle the plurality of cells by a carrier aggregation (CA) technology, a dual connectivity (DC) technology, or a multi-connectivity (MC) technology to communicate between the base station device 20 and the terminal device 40. Alternatively, the terminal device 40 and the plurality of base station devices 20 can communicate with each other by a coordinated multi-point transmission and reception (CoMP) technology via cells of different base station devices 20.

Note that the terminal device 40 is not necessarily a device directly used by a person. The terminal device 40 may be a sensor installed in a machine or the like in a factory like so-called machine type communication (MTC). Furthermore, the terminal device 40 may be a machine to machine (M2M) device or an internet of things (IOT) device. Furthermore, the terminal device 40 may be a device having a relay communication function as represented by device to device (D2D) and vehicle to everything (V2X). Furthermore, the terminal device 40 may be a device called client premises equipment (CPE) used for wireless backhaul or the like.

Hereinafter, a configuration of each device that configures the communication system 1 according to the embodiment is specifically described. Note that the configuration of each device described below is merely an example. The configuration of each device may be different from the following configuration.

<2.2. Configuration of Management Device>

Figure 10:
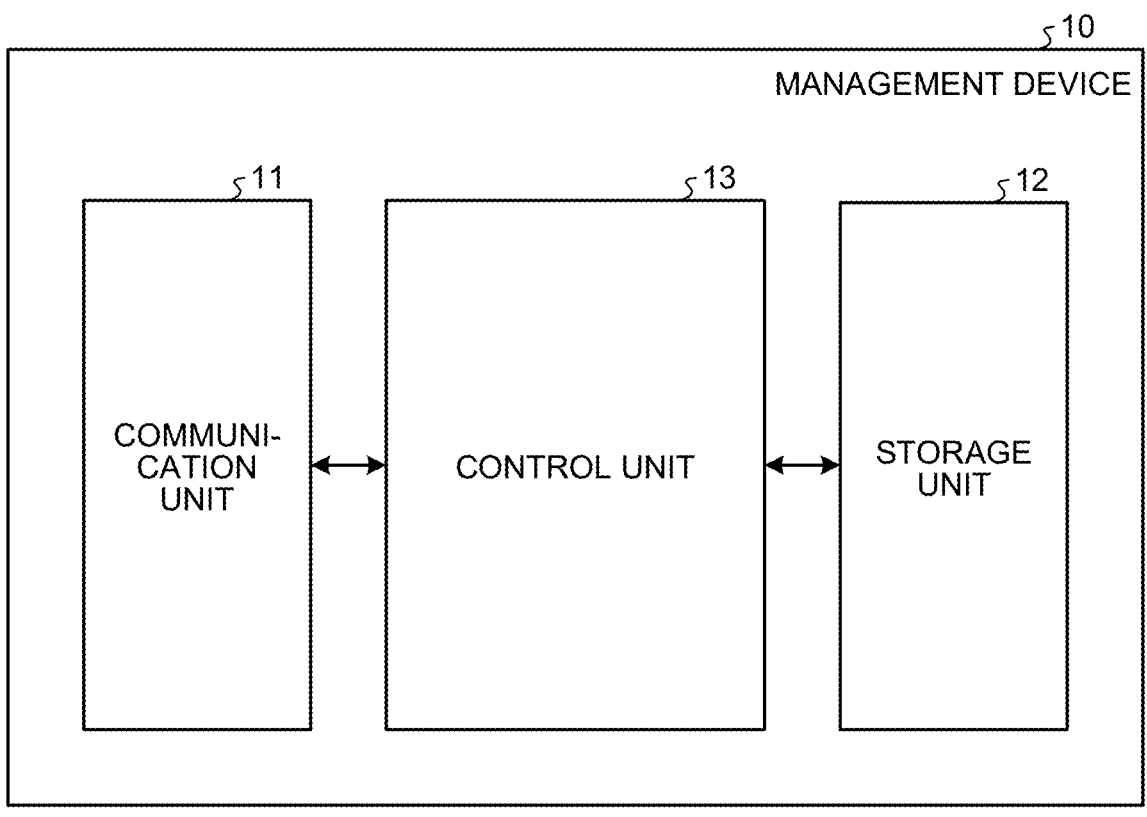
FIG. 10 is a diagram illustrating a configuration example of a management device according to the embodiment of the present disclosure.

FIG. 10 is a diagram illustrating a configuration example of the management device 10 according to the embodiment of the present disclosure. The management device 10 is a device that manages a wireless network. The management device 10 includes a communication unit 11, a storage unit 12, and a control unit 13. Note that the configuration illustrated in FIG. 10 is a functional configuration, and a hardware configuration may be different from the functional configuration. Furthermore, the functions of the management device 10 may be distributed in a plurality of physically separated configurations to be implemented. For example, the management device 10 may include a plurality of server devices.

The communication unit 11 is a communication interface for communicating with other devices. The communication unit 11 may be a network interface or may be a device connection interface. For example, the communication unit 11 may be a local area network (LAN) interface such as a network interface card (NIC) or may be a universal serial bus (USB) interface including a USB host controller, a USB port, and the like. Furthermore, the communication unit 11 may be a wired interface or a wireless interface. The communication unit 11 functions as communication means of the management device 10. The communication unit 11 communicates with the base station device 20 under the control of the control unit 13.

The storage unit 12 is a data readable/writable storage device such as a dynamic random access memory (DRAM), a static random access memory (SRAM), a flash memory, or a hard disk. The storage unit 12 functions as storage means of the management device 10. The storage unit 12 stores, for example, a connection state of the terminal device 40. For example, the storage unit 12 stores a radio resource control (RRC) state and an EPS connection management (ECM) state of the terminal device 40. The storage unit 12 may function as a home memory that stores the position information of the terminal device 40.

The control unit 13 is a controller that controls each unit of the management device 10. The control unit 13 is implemented by, for example, a processor such as a central processing unit (CPU) or a micro processing unit (MPU). For example, the control unit 13 is implemented by the processor executing various programs stored in a storage device inside the management device 10 using the random access memory (RAM) or the like as a work area. Note that the control unit 13 may be implemented by an integrated circuit such as an application specific integrated circuit (ASIC) or a field programmable gate array (FPGA). Any of the CPU, the MPU, the ASIC, and the FPGA can be regarded as a controller.

<2.3. Configuration of Base Station Device>

Figure 11:
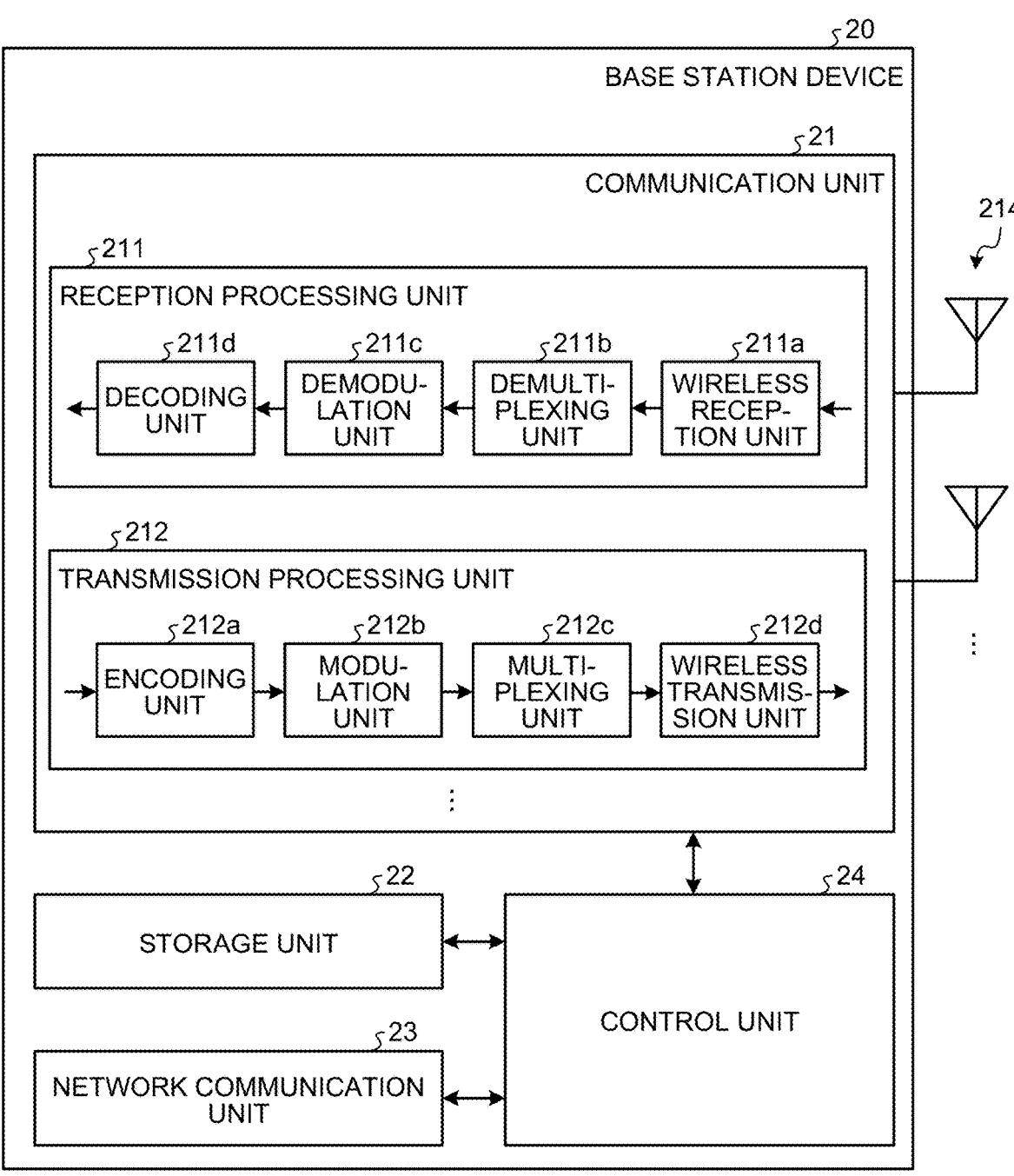
FIG. 11 is a diagram illustrating a configuration example of a base station device according to the embodiment of the present disclosure.

Next, the configuration of the base station device 20 is described. FIG. 11 is a diagram illustrating a configuration example of the base station device 20 according to the embodiment of the present disclosure.

The base station device 20 includes a communication unit 21, a storage unit 22, a network communication unit 23, and a control unit 24. Note that the configuration illustrated in FIG. 11 is a functional configuration, and a hardware configuration may be different from the functional configuration. Furthermore, the functions of the base station device 20 may be distributed in a plurality of physically separated configurations to be implemented.

The communication unit 21 is a signal processing unit for wirelessly communicating with another wireless communication device (for example, the terminal device 40, the relay device 30, and another base station device 20). The communication unit 21 operates under the control of the control unit 24. The communication unit 21 supports one or a plurality of wireless access methods. For example, the communication unit 21 supports both NR and LTE. The communication unit 21 may support W-CDMA or cdma 2000 in addition to NR or LTE.

The communication unit 21 includes a reception processing unit 211, a transmission processing unit 212, and an antenna 214. The communication unit 21 may include the plurality of reception processing units 211, the plurality of transmission processing units 212, and the plurality of antennas 214. Note that, when the communication unit 21 supports the plurality of wireless access methods, each unit of the communication unit 21 may be individually configured for each wireless access method. For example, the reception processing unit 211 and the transmission processing unit 212 may be individually configured for LTE and NR.

The reception processing unit 211 processes an uplink signal received via the antenna 214. The reception processing unit 211 includes a wireless reception unit 211*a*, a demultiplexing unit 211*b*, a demodulation unit 211*c*, and a decoding unit 211*d*.

The wireless reception unit 211*a* performs down-conversion, cancellation of an unnecessary frequency component, control of an amplification level, quadrature demodulation, conversion to a digital signal, removal of a guard interval (cyclic prefix), extraction of a frequency domain signal by fast Fourier transform, and the like on the uplink signal. The demultiplexing unit 211*b* demultiplexes an uplink channel such as a physical uplink shared channel (PUSCH) or a physical uplink control channel (PUCCH) and an uplink reference signal from the signal output from the wireless reception unit 211*a*.

The demodulation unit 211*c* demodulates the reception signal using a modulation scheme such as binary phase shift keying (BPSK) or quadrature phase shift keying (QPSK)

with respect to the modulation symbol of the uplink channel. The modulation scheme used by the demodulation unit 211c may be 16 quadrature amplitude modulation (QAM), 64 QAM, or 256 QAM. In this case, the signal points on the constellation do not necessarily have to be equidistant. The constellation may be a non uniform constellation (NUC).

The demodulation unit 211c demodulates modulation symbols according to the communication scheme proposed in the present embodiment. In this case, the demodulation unit 211c demodulates the modulation symbol corresponding to the first resource by using a normal modulation scheme (first modulation scheme) and demodulates the modulation symbol corresponding to the second resource by using an IM (second modulation scheme). Details of the communication scheme proposed in the present embodiment are described below.

The decoding unit 211d performs decoding processing on the demodulated encoded bits of the uplink channel. The decoded uplink data and uplink control information are output to the control unit 24.

The transmission processing unit 212 performs a transmission processing of the downlink control information and the downlink data. As described above, the transmission processing unit 212 is an acquisition unit that acquires, for example, a bit sequence of the downlink control information, the downlink data, or the like from the control unit 24. The transmission processing unit 212 performs the transmission processing described above, for example, with reference to FIG. 1. The transmission processing unit 212 includes an encoding unit 212a, a modulation unit 212b, a multiplexing unit 212c, and a wireless transmission unit 212d.

The encoding unit 212a encodes the downlink control information and the downlink data input from the control unit 24 using an encoding method such as block encoding, convolutional encoding, or turbo encoding. Note that the encoding unit 212a may perform encoding with a polar code and encoding with a low density parity check code (LDPC code).

The modulation unit 212b modulates the encoded bits output from the encoding unit 212a by a predetermined modulation scheme such as BPSK, QPSK, 16 QAM, 64 QAM, or 256 QAM. In this case, the signal points on the constellation do not necessarily have to be equidistant. The constellation may be a non uniform constellation.

Furthermore, the modulation unit 212b modulates the coded bit according to the communication scheme proposed in the present embodiment. In this case, the modulation unit 212b modulates the coded bits corresponding to the first resource by a normal modulation scheme (first modulation scheme) and modulates coded bits corresponding to a second resource by the IM (second modulation scheme). It can also be said that the modulation unit 212b is a mapping unit that maps the encoded bit sequence corresponding to the second resource to the resource element according to the IM. Details of the communication scheme proposed in the present embodiment are described below.

The multiplexing unit 212c multiplexes the modulation symbols of each channel and the downlink reference signal and arranges the multiplexed symbols and signals in a predetermined resource element. The wireless transmission unit 212d performs various types of signal processing on the signal from the multiplexing unit 212c. For example, the wireless transmission unit 212d performs processing such as conversion into a time domain by fast Fourier transform, addition of a guard interval (cyclic prefix), generation of a baseband digital signal, conversion into an analog signal, quadrature modulation, up-conversion, cancellation of an excessive frequency component, and power amplification. The signal generated by the transmission processing unit 212 is transmitted from the antenna 214.

The storage unit 22 is a data readable/writable storage device such as a DRAM, an SRAM, a flash memory, or a hard disk. The storage unit 22 functions as storage means of the base station device 20.

The network communication unit 23 is a communication interface for communicating with a node positioned at a high level on the network (for example, the management device 10). For example, the network communication unit 23 is a LAN interface such as an NIC. The network communication unit 23 may be a wired interface or a wireless interface. The network communication unit 23 functions as network communication means of the base station device 20.

The control unit 24 is a controller that controls each unit of the base station device 20. The control unit 24 is implemented by, for example, a processor (hardware processor) such as a central processing unit (CPU) or a micro processing unit (MPU). For example, the control unit 24 is implemented by the processor executing various programs stored in the storage device inside the base station device 20 using a random access memory (RAM) or the like as a work area. Note that the control unit 24 may be implemented by an integrated circuit such as an application specific integrated circuit (ASIC) or a field programmable gate array (FPGA). Any of the CPU, the MPU, the ASIC, and the FPGA can be regarded as a controller.

<2.4. Configuration of Relay Device>

Figure 12:
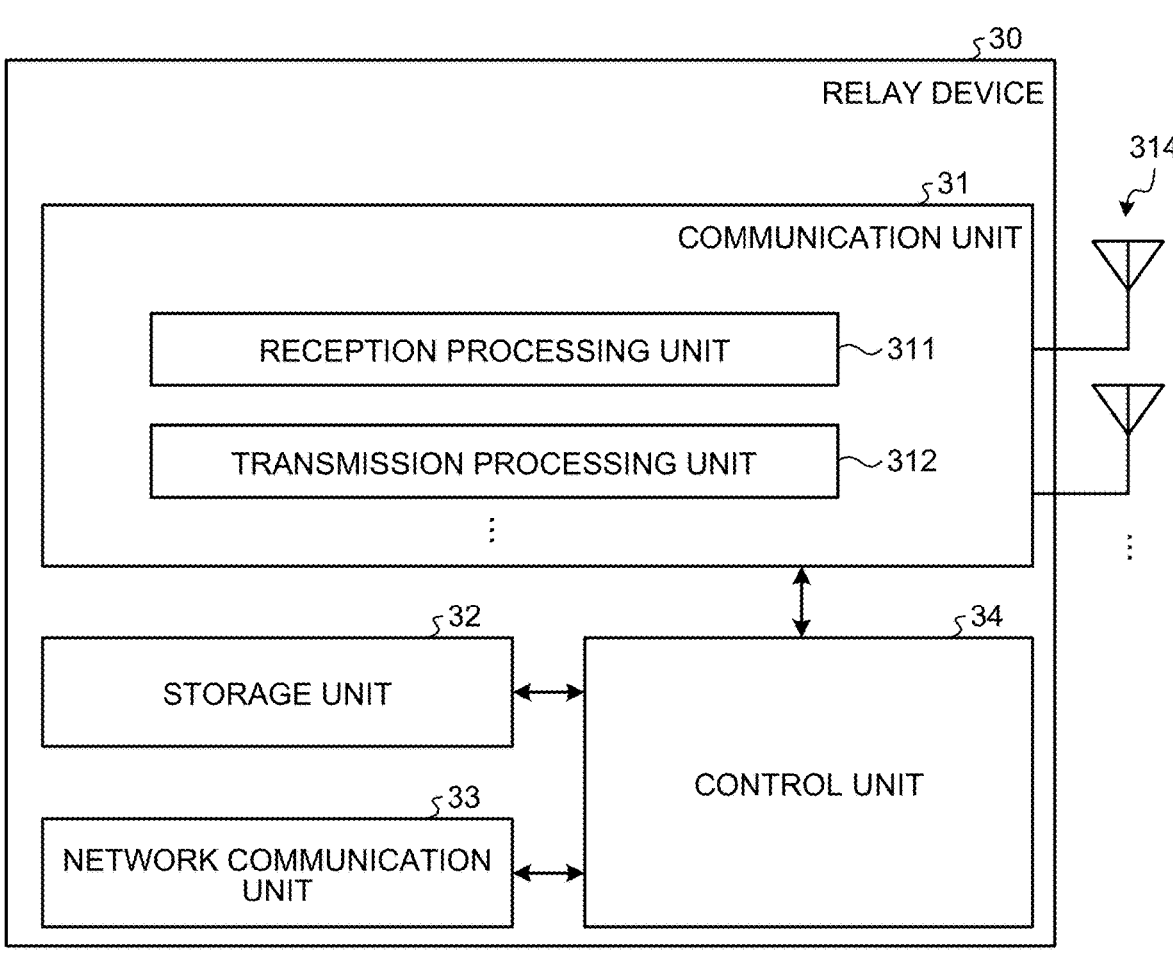
FIG. 12 is a diagram illustrating a configuration example of a relay device according to the embodiment of the present disclosure.

Next, the configuration of the relay device 30 is described. FIG. 12 is a diagram illustrating a configuration example of the relay device 30 according to the embodiment of the present disclosure.

The relay device 30 includes a communication unit 31, a storage unit 32, a network communication unit 33, and a control unit 34. Note that the configuration illustrated in FIG. 12 is a functional configuration, and a hardware configuration may be different from the functional configuration. Furthermore, the functions of the relay device 30 may be distributed in a plurality of physically separated configurations to be implemented.

The communication unit 31 is a signal processing unit for wirelessly communicating with another wireless communication device (for example, the base station device 20, the terminal device 40, and another relay device 30). The communication unit 31 operates under the control of the control unit 34. The communication unit 31 supports one or a plurality of wireless access methods. For example, a communication unit 41 supports both NR and LTE. The communication unit 31 may support W-CDMA or cdma 2000 in addition to NR or LTE.

The communication unit 31 includes a reception processing unit 311, a transmission processing unit 312, and an antenna 314. The communication unit 31 may include the plurality of reception processing units 311, the plurality of transmission processing units 312, and the plurality of antennas 314. The configurations of the communication unit 31, the reception processing unit 311, the transmission processing unit 312, and the antenna 314 are similar to those of the communication unit 21, the reception processing unit 211, the transmission processing unit 212, and the antenna 214 of the base station device 20.

The storage unit 32 is a data readable/writable storage device such as a DRAM, an SRAM, a flash memory, or a hard disk. The storage unit 32 functions as storage means of the relay device 30. The configuration of the storage unit 32 is similar to that of the storage unit 22 of the base station device 20.

The network communication unit 33 is a communication interface for communicating with a node positioned at a high level on the network. For example, the network communication unit 33 is a LAN interface such as an NIC. Furthermore, the network communication unit 33 may be a wired interface or may be a wireless interface. The network communication unit 33 functions as network communication means of the relay device 30. The network communication unit 33 communicates with the base station device 20 under the control of the control unit 34.

The control unit 34 is a controller that controls each unit of the relay device 30. The control unit 34 is implemented by, for example, a processor (hardware processor) such as a CPU or an MPU. For example, the control unit 34 is implemented by the processor executing various programs stored in the storage device inside the relay device 30 using a RAM or the like as a work area. Note that the control unit 34 may be implemented by an integrated circuit such as an ASIC or an FPGA. Any of the CPU, the MPU, the ASIC, and the FPGA can be regarded as a controller.

<2.5. Configuration of Terminal Device>

Figure 13:
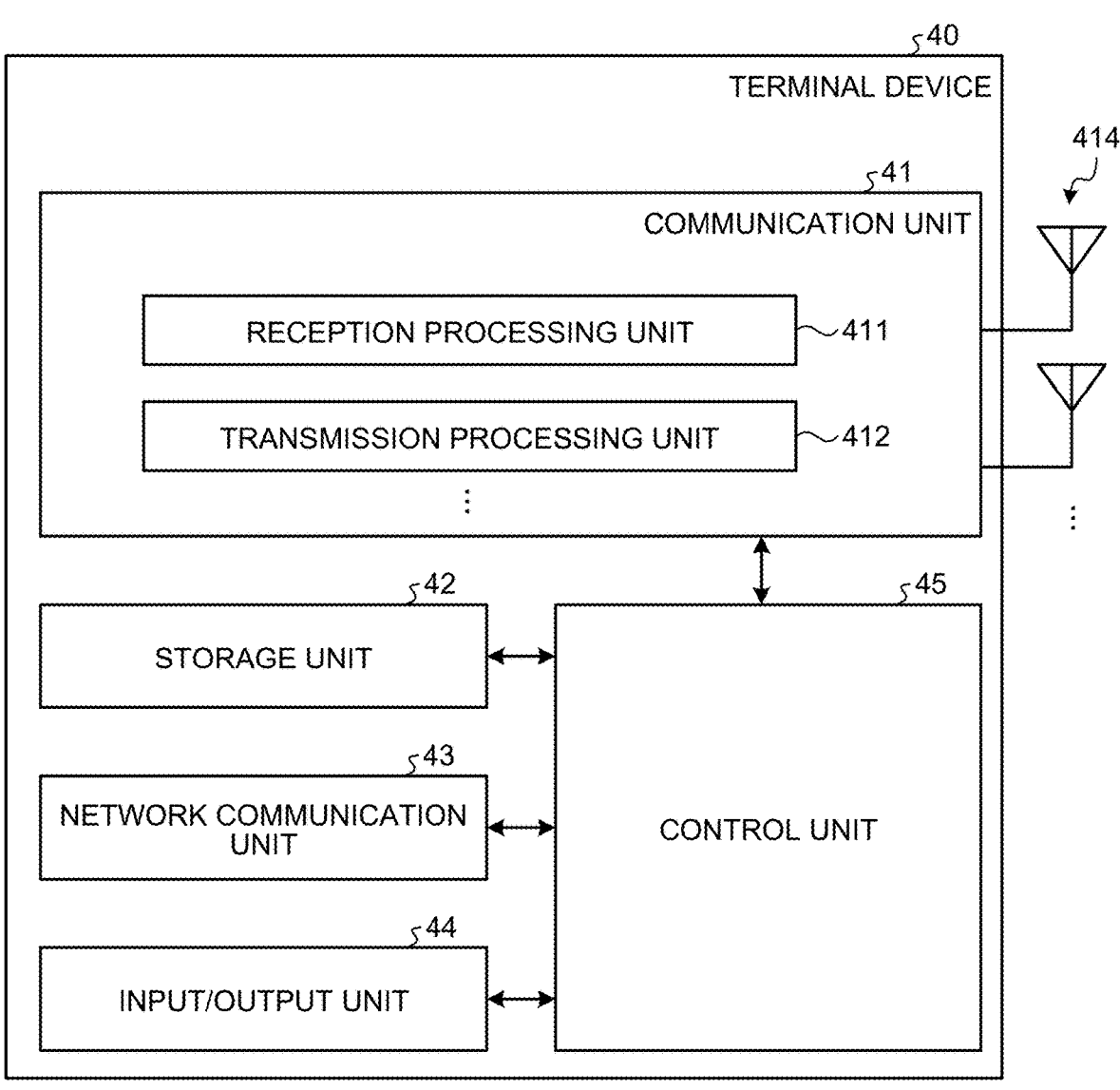
FIG. 13 is a diagram illustrating a configuration example of a terminal device according to the embodiment of the present disclosure.

Next, the configuration of the terminal device 40 is described. FIG. 13 is a diagram illustrating a configuration example of the terminal device 40 according to the embodiment of the present disclosure.

The terminal device 40 includes a communication unit 41, a storage unit 42, a network communication unit 43, an input/output unit 44, and a control unit 45. Note that the configuration illustrated in FIG. 13 is a functional configuration, and a hardware configuration may be different from the functional configuration. Furthermore, the functions of the terminal device 40 may be distributed in a plurality of physically separated configurations to be implemented. Note that, in the configuration of the terminal device 40, the network communication unit 43 and the input/output unit 44 may not be essential components.

The communication unit 41 is a signal processing unit for wirelessly communicating with another wireless communication device (for example, the base station device 20, the relay device 30, and another terminal device 40). The communication unit 41 operates under the control of the control unit 45. The communication unit 41 supports one or a plurality of wireless access methods. For example, the communication unit 41 supports both NR and LTE. The communication unit 41 may support W-CDMA or cdma 2000 in addition to NR or LTE.

The communication unit 41 includes a reception processing unit 411, a transmission processing unit 412, and an antenna 414. The communication unit 41 may include the plurality of reception processing units 411, the plurality of transmission processing units 412, and the plurality of antennas 414. The configurations of the communication unit 41, the reception processing unit 411, the transmission processing unit 412, and the antenna 414 are similar to those of the communication unit 21, the reception processing unit 211, the transmission processing unit 212, and the antenna 214 of the base station device 20.

The storage unit 42 is a data readable/writable storage device such as a DRAM, an SRAM, a flash memory, or a hard disk. The storage unit 42 functions as storage means of the terminal device 40.

The network communication unit 43 is a communication interface for communicating with a node positioned at a high level on the network. For example, the network communication unit 43 is a LAN interface such as an NIC. Furthermore, the network communication unit 43 may be a wired interface or may be a wireless interface. The network communication unit 43 functions as network communication means of the terminal device 40. The network communication unit 43 communicates with other devices under the control of the control unit 45.

The input/output unit 44 is a user interface for exchanging information with the user. For example, the input/output unit 44 is an operation device for the user to perform various operations, such as a keyboard, a mouse, an operation key, and a touch panel. Alternatively, the input/output unit 44 is a display device such as a liquid crystal display or an organic electroluminescence (EL) display. The input/output unit 44 may be an acoustic device such as a speaker or a buzzer. The input/output unit 44 may be a lighting device such as a light emitting diode (LED) lamp. The input/output unit 44 functions as input/output means (input means, output means, operation means, or notification means) of the terminal device 40.

The control unit 45 is a controller that controls each unit of the terminal device 40. The control unit 45 is implemented by, for example, a processor (hardware processor) such as a CPU or an MPU. For example, the control unit 45 is implemented by the processor executing various programs stored in the storage device inside the terminal device 40 using a RAM or the like as a work area. Note that the control unit 45 may be implemented by an integrated circuit such as an ASIC or an FPGA. Any of the CPU, the MPU, the ASIC, and the FPGA can be regarded as a controller.

3. Technical Features

<3.1. Operating Environment>

Here, an environment in which the communication system 1 operates is described. The environment in which the communication system 1 operates is an environment in which intersignal interference exists in at least one of the following resources.

Frequency axis resource

Time axis resource

Power axis resource

Spatial axis resource

Code axis resource (such as interleaving, scrambling, or spreading)

Examples of the communication in which the intersignal interference exists according to the present embodiment include communication using a non-orthogonal axis, communication in an asynchronous environment, communication in which intersymbol interference or intersubcarrier interference occurs, communication in which intercell interference exists, and communication in which interference occurs due to RF impairments.

Furthermore, examples of the intersignal interference according to the present embodiment include signal interference between a plurality of communication device (for example, the terminal device 40). Alternatively, examples of the intersignal interference according to the present embodiment include interference between a plurality of transmission layer signals or interference between a plurality of cells in one communication device. The intersignal interference according to the present embodiment includes at least one item of the intersignal interference described above.

As a specific example, when the different terminal devices 40 perform communication by using adjacent resources, interterminal interference may occur. As an environment in which such intersignal interference exists, for example, a communication environment using a non-orthogonal axis is considered.

Alternatively, for example, when one terminal device 40 transmits signals in a plurality of transmission layers, interference may occur between the layers.

In addition, when the plurality of base station devices 20 performs communication by using the same frequency band and time resources in different cells, intercell interference may occur.

As described above, the communication system 1 according to the present embodiment operates in an environment where intersignal interference exists.

<3.2. Modulation Scheme>

Therefore, in the communication system 1 according to the present embodiment, the communication device performs communication using the first modulation scheme in a part of resources (first resources). The first modulation scheme is a modulation scheme (for example, IM) configured by a set including active resources and inactive resources. In addition, in the communication system 1, the first modulation scheme is used for the purpose of suppressing intersignal interference.

Here, the communication means using the first modulation scheme indicates, for example, means for performing communication with information on whether the power of the resource is zero (inactive) or non-zero (active) or whether the resource is used (active) or is not used (inactive).

Note that the signal to which the first modulation scheme is applied may be one or a plurality of signals.

As described above, the first modulation scheme configured with the combination of the active resource and the inactive resource is index modulation (IM) using at least one of the following resources as an example.

Frequency (axis) resource

Time (axis) resource

Precoder

Transmission/reception beam

Interleaving

Scrambling

Transmission antenna

Propagation path (including a propagation path generated by a reflector of a radio wave or the like, such as a reconfigurable intelligent surface)

Note that the resource to be used in the first modulation scheme, that is, to be switched between ON and OFF is desirably the same as the resource of interference occurring in the operation environment of the communication system 1 described above. The first modulation scheme is used to suppress intersignal interference, as described above. Therefore, the communication device can further suppress the intersignal interference by applying the first modulation scheme to the resource on which the interference may occur.

Furthermore, in the communication system 1 according to the present embodiment, the communication device performs communication using the second modulation scheme on the second resource (for example, a resource other than the first resource). The second modulation scheme is binary phase shift keying (BPSK), quadrature phase shift keying (QPSK), 16 quadrature amplitude modulation (QAM), 64 QAM, 256 QAM, or the like and is a modulation scheme different from the first modulation scheme.

<3.3. Resource Arrangement>

In the communication system 1 according to the present embodiment, the communication device performs wireless communication by using a predetermined resource. The predetermined resources include the first resource to which a signal modulated by the first modulation scheme is allocated and the second resource to which a signal modulated by the second modulation scheme is allocated.

Here, the positions of the first resource and the second resource are determined based on, for example, at least one of semi-static notification or dynamic notification from the base station device 20.

As described above, the first modulation scheme is a modulation scheme in which the error rate characteristic is less likely to deteriorate even if the intersignal interference occurs. Therefore, it is desirable that the first resource corresponding to the first modulation scheme (to which the signal modulated by the first modulation scheme is allocated) is arranged on a resource on which intersignal interference is likely to occur.

Figure 14:
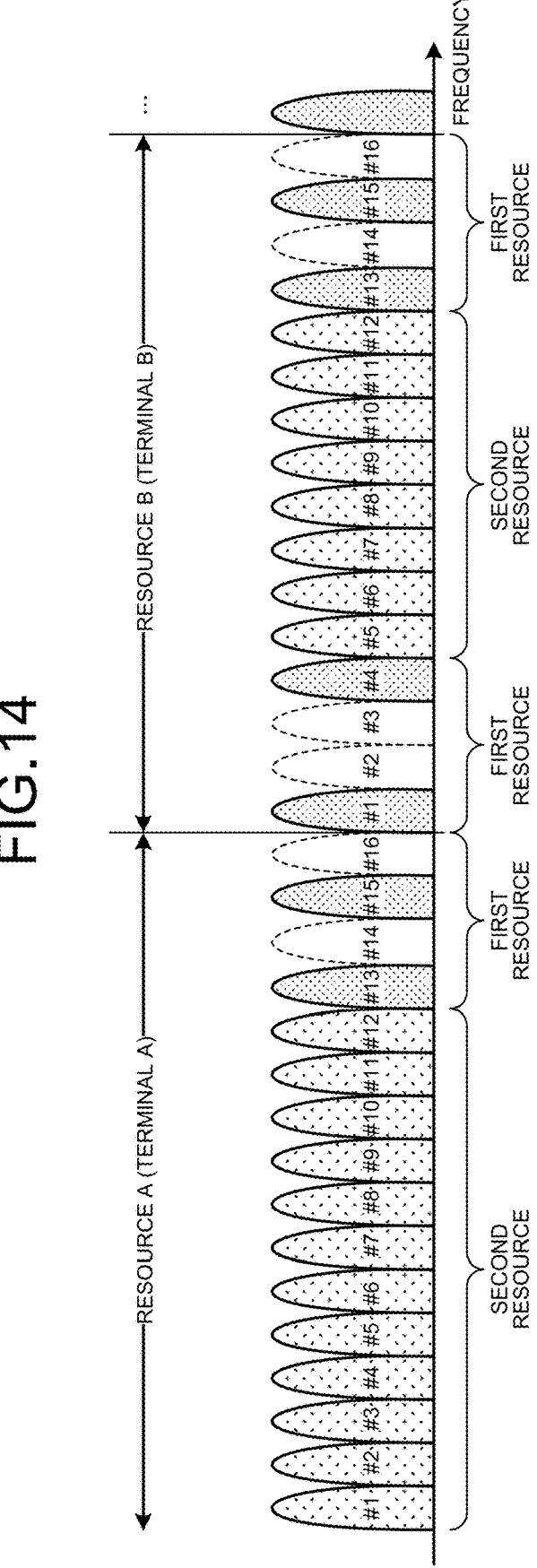
FIG. 14 is a diagram illustrating an arrangement example of first and second resources according to the embodiment of the present disclosure.

Here, an arrangement example of the first and second resources according to the embodiment of the present disclosure is described with reference to FIG. 14. FIG. 14 is a diagram illustrating an arrangement example of the first and second resources according to the embodiment of the present disclosure.

Here, it is assumed that the base station device 20 divides frequency resources into a plurality of divided resources (bands) and respectively allocates the divided resources to the terminal devices 40, to perform wireless communication simultaneously with the plurality of terminal devices 40. Here, the terminal devices 40 that perform wireless communication with the base station device 20 are referred to as the terminal A, the terminal B, . . . , respectively.

In the example illustrated in FIG. 14, the base station device 20 allocates a resource A to wireless communication with the terminal A and allocates a resource B to wireless communication with the terminal B. Although not illustrated in FIG. 14, for example, the base station device 20 may allocate a resource C used for wireless communication with the terminal C to a higher frequency side than the resource B. In addition, in FIG. 14, a description will be given on the assumption that the base station device 20 does not allocate a resource to be used for wireless communication with the terminal device 40 on the lower frequency side than the resource A.

At this time, for example, in wireless communication with the terminal A, the base station device 20 sets a part of resources of the resource A as a first resource and sets the remaining resources as a second resource. Similarly, for example, in wireless communication with the terminal B, the base station device 20 sets a part of resources of the resource B as a first resource and sets the remaining resources as a second resource.

As described above, a signal modulated by the first modulation scheme is allocated to the first resource in order to suppress intersignal interference. Therefore, it is desirable that the first resource is allocated to a resource on which intersignal interference is likely to occur.

In the example illustrated in FIG. 14, intersignal interference is likely to occur in a resource adjacent to a resource allocated to another terminal device 40. Therefore, the base station device 20 allocates the first resource to one or more resources adjacent to the resource allocated to another terminal device 40. For example, in the example of FIG. 14, the base station device 20 sets an end portion of the resource allocated to the terminal device 40 as the first resource and the remaining resource as the second resource.

For example, in FIG. 14, the base station device 20 allocates 16 subcarriers (#1 to #16) to one terminal device 40. Among the 16 subcarriers, the base station device 20 and the terminal device 40 perform wireless communication using four subcarriers from a boundary with a subcarrier allocated to another terminal device 40 as a first resource and perform wireless communication using the remaining subcarriers as second resources.

Specifically, the terminal A performs wireless communication using the subcarriers #1 to #12 of the resource A as the second resource and using the subcarriers #13 to #16 as the first resource. In addition, the terminal B performs wireless communication using the subcarriers #5 to #12 of the resource B as the second resource and using the subcarriers #1 to #4 and #13 to #16 as the first resource.

Note that the terminal A allocates one end of the resource A as the first resource, while the terminal B allocates both ends of the resource B as the first resource. This is because the resource A is adjacent to the resource B on the high frequency side, while the resource B is adjacent to the resource A on the low frequency side and the resource C (not illustrated) on the high frequency side.

As described above, even for an end portion of a resource used for wireless communication, when the end portion is not adjacent to a resource allocated to another terminal device 40, intersignal interference is not likely to occur at the corresponding end portion, and thus the first resource may not be allocated to the corresponding end portion.

For example, the first resource may not necessarily be arranged in the resource (the resource A in FIG. 14) at the end of the band of the component carrier. This is because, as described above, it is considered that no adjacent terminal that gives interference exists in the resource at the end of the band.

The second modulation scheme corresponding to the second resource has higher resource utilization efficiency than the first modulation scheme. Therefore, by arranging the second resource in the resource at the end of the band, the communication system 1 can further improve the resource utilization efficiency.

As described above, the first modulation scheme corresponding to the first resource is configured with a set including active resources and inactive resources. Therefore, in FIG. 14, the active resources (for example, the subcarriers #13 and #15 of the resources A) of the first resources are indicated by solid lines, and the inactive resources (for example, the subcarriers #14 and #16 of the resources B) are indicated by dotted lines.

In addition, in FIG. 14, four subcarriers from adjacent resource boundaries are set as the first resources, but the present disclosure is not limited thereto. The number of resources (subcarriers) arranged as the first resources may be one or more and may be three or less or five or more. For example, the base station device 20 may use all the subcarriers (resources) allocated to the terminal device 40 as the first resources. The number of resources arranged as the first resources can be appropriately changed depending on, for example, the magnitude of interference, the processing capability of the terminal device 40, and the like. Therefore, the base station device 20 can determine the size (the number of resources) of the first resource according to interference, processing capability of the terminal device 40, or the like.

<3.4. Notification of Control Information>

The control information including the information related to the first resource described above is notified from the base station device 20 to the terminal device 40 as semi-static notification and/or dynamic notification.

For example, the base station device 20 transmits the following information to the terminal device 40 as a semi-static notification.

Information related to execution of wireless communication using first modulation scheme and second modulation scheme Information related to first resource Information related to correspondence between information bit and active/inactive resource when implementing first modulation scheme The base station device 20 notifies the terminal device 40 of these pieces of information using, for example, MIB, SIB, RRC signaling, or the like.

Here, the information related to the correspondence between the information bits and the active/inactive resources when implementing the first modulation scheme is information indicating a correspondence between a set including active and inactive resources and the information bits. For example, the corresponding information is allocation information indicating which information bit is allocated to the set including active and inactive resources illustrated in FIGS. 5A to 5C described above. An example of the allocation information is described below.

In addition, the base station device 20 transmits the following information to the terminal device 40 as a dynamic notification.

Information related to resource mapping

Information related to execution of wireless communication using first modulation scheme and second modulation scheme The base station device 20 notifies the terminal device 40 of these pieces of information by using, for example, DCI, MAC CE, or the like.

<3.5. Determination of Transmission Signal Size>

When the communication system 1 performs wireless communication by using the first modulation scheme, the method of determining the transmission signal size (for example, transport block size) is changed as follows.

Here, the transmission signal size in the related art (intermediate number of information bits ($N_{info}$)) is determined according to Formula (13) below, as described in Section 5.1.3.2 of TS 38.214.

$$N_{inf\,o} = N_{RE} \cdot R \cdot Q_m \cdot \upsilon \qquad (13)$$

Here, $N_{RE}$ is the number of resource elements, R is a target code rate, $Q_m$ is a modulation order, and $\upsilon$ is the number of layers. Here, the modulation order $Q_m$ used in the following description is, for example, $Q_m=2$ for QPSK, $Q_m=4$ for 16 QAM, and $Q_m=6$ for 64 QAM. If the definition of the modulation order is the order $Q_m'$ of the QAM modulation (for example, QPSK is $Q_m'=4$, 16 QAM is $Q_m'=16$, and 64 QAM is $Q_m'=64$), the modulation order can be similarly calculated by setting $Q_m=\log_2 Q_m'$. Note that, hereinafter, the method for determining the transmission signal size determined according to Formula (13) is also referred to as a second determination method.

On the other hand, in the communication system 1 according to the present embodiment, wireless communication is performed by using the first modulation scheme. The transmission signal size (Intermediate number of information bits ($N_{info}$)) in this case is determined according to Formula (14) as follows. Here, it is assumed that the first modulation scheme is applied to all the resources, that is, all the resources used for communication with the terminal device 40 are the first resources.

$$N_{info} = (N_{RE}/N) \cdot N_B \cdot R \cdot \upsilon \qquad (14)$$

Here, $N_{RE}$ is the number of resource elements. In addition, N is the number of resource elements included in one set including active and inactive resource elements in the first modulation scheme. The $N_B$ is the number of transmission bits that can be transmitted by N resource elements. R is a target code rate, $Q_m$ is a modulation order, and v is the number of layers. Note that, hereinafter, the method for determining the transmission signal size determined according to Formula (14) is also referred to as a first determination method.

In addition, the transmission signal size when the first modulation scheme is applied to a portion of resources, that is, the resources used for communication with the terminal device 40 include the first resource and the second resource is determined as follows.

The transmission signal size $N_{info\_config1}$ transmitted on the first resource is determined according to Formula (15) below.

$$N_{info\_config\,1} = (N_{RE\_config\,1}/N) \cdot N_B \cdot R \cdot \upsilon \qquad (15)$$

Here, $N_{RE\_config1}$ is the number of resource elements (of the first resource) corresponding to the first modulation scheme. N is the number of resource elements included in one set including active and inactive resource elements in the first modulation scheme. The $N_B$ is the number of transmission bits that can be transmitted by N resource elements. R is a target code rate, $Q_m$ is a modulation order, and v is the number of layers.

In addition, the transmission signal size $N_{info\_config2}$ transmitted on the second resource is determined according to Formula (16) below.

$$N_{info\_config\,2} = N_{Re\_config\,2} \cdot R \cdot Q_m \cdot \upsilon \qquad (16)$$

$N_{RE\_config2}$ is the number of resource elements (of the second resource) corresponding to the second modulation scheme. R is a target code rate, $Q_m$ is a modulation order, and υ is the number of layers.

Therefore, the transmission signal size $N_{info}$ to be transmitted by the resource (predetermined resource) allocated to the terminal device 40 is determined according to Formula (17).

$$N_{info} = N_{info\_config\,1} + N_{info\_config\,2} \qquad (17)$$

As described above, in the communication system 1 according to the present embodiment, the transmission signal size transmitted on the first resource is determined according to the first determination method, and the transmission signal size transmitted on the second resource is determined according to the second determination method different from the first determination method. In addition, the transmission signal size transmitted by the predetermined resource including the first resource and the second resource is a size obtained by combining the transmission signal size transmitted by the first resource and the transmission signal size transmitted by the second resource.

4. Communication Processing

<4.1. Communication Processing>

Figure 15:
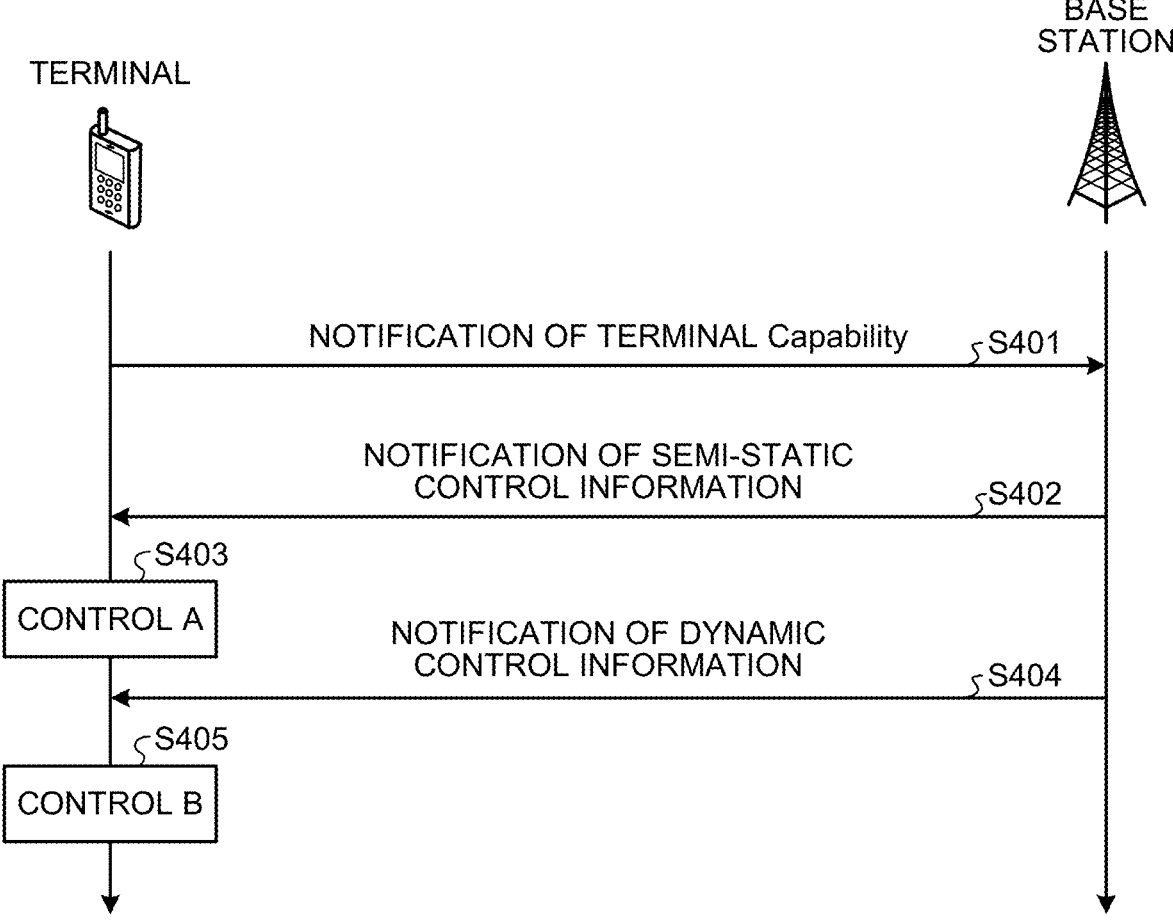
FIG. 15 is a sequence diagram illustrating an example of communication processing executed in the communication system according to the embodiment of the present disclosure.

In the above, an example of communication processing executed in the communication system 1 is described. FIG. 15 is a sequence diagram illustrating an example of the communication processing executed in the communication system 1 according to the embodiment of the present disclosure.

As illustrated in FIG. 15, the terminal device 40 notifies the base station device 20 of the capability information of the own device (step S401). Here, the capability information may include information indicating whether wireless communication using the first modulation scheme is supported.

The base station device 20 notifies the terminal device 40 of semi-static information (step S402). The semi-static information notified here can include information related to wireless communication using the first modulation scheme described above.

The terminal device 40 performs control (control A) of the wireless communication by the first modulation scheme based on the received semi-static information (step S403). Details of the control A are described below.

Subsequently, the base station device 20 notifies the terminal device 40 of dynamic information by using, for example, downlink control information (step S404). The dynamic information notified here can include information related to the wireless communication using the first modulation scheme described above.

The terminal device 40 performs control (control B) of the wireless communication by the first modulation scheme based on the received semi-static information (step S405). Details of the control B are described below.

(Control A)

Here, details of the control A performed by the terminal device 40 in step S403 of the communication processing described above are described.

For example, the terminal device 40 performs the control A when performing communication at the time of initial access (for example, 2-step RACH) or transmission from a state such as RRC idle or RRC inactive. In this case, the terminal device 40 performs the control A by using the information related to the communicable resource acquired from the base station device 20. Such information is notified by, for example, system information. Furthermore, the information related to the communicable resource notified here includes, for example, information related to a resource that can be used when performing communication at the time of initial access (for example, 2-step RACH) or transmission from a state such as RRC idle, or RRC inactive.

The terminal device 40 performs the control A by performing communication using the first modulation scheme or/and the second modulation scheme based on implementation information related to whether to perform communication using the first modulation scheme. The implementation information is notified from the base station device 20. The implementation information may be explicitly notified from the base station device 20. Alternatively, the implementation information may be implicitly notified by being associated with information such as a component carrier, a BWP, a resource block, a subcarrier, a slot, a symbol, and a non-orthogonal axis resource.

In addition, the terminal device 40 performs communication with the base station device 20 as the control A based on allocation information related to a resource (first resource) to which the first modulation scheme is applied among resources (hereinafter, also referred to as communication resources) allocated for communication. Such allocation information is information notified from the base station device 20 and includes, for example, information related to the arrangement and size of the first resources such as to what number of resources from the end of the communication resources to be the first resources. Specifically, when the resource is a frequency resource (subcarrier), the allocation information includes, for example, information indicating that m (m is an integer of 1 or more) subcarriers from both ends or one end of the communication resource are set as the first resource.

In addition, the terminal device 40 performs communication with the base station device 20 as the control A based on the modulation information related to the first modulation scheme. Such a modulation scheme is information indicating a correspondence between a combination pattern of active resources and inactive resources and information bits in the first modulation scheme and is, for example, a modulation table. The modulation information may include, for example, information for designating a modulation table to be used from a plurality of modulation tables determined in advance by specifications or the like. Alternatively, the modulation information may include the modulation table itself indicating how the information bits are mapped to the combination pattern.

The terminal device 40 performs communication to which the first modulation scheme and/or the second modulation scheme is applied as the control A by using the implementation information, the allocation information, the modulation information, and the like semi-statically notified from the base station device 20.

(Control B)

In the control A described above, the terminal device 40 performs communication based on the information acquired as the semi-static notification. Meanwhile, in the control B, communication is performed based on the information acquired as the dynamic notification in addition to the information acquired as the semi-static notification similarly to the control A.

For example, it is assumed that the terminal device 40 acquires implementation information indicating whether to apply the first modulation scheme to communication as dynamic notification. In this case, the terminal device 40 determines whether to apply the first modulation scheme based on the implementation information acquired as the dynamic notification regardless of the implementation information acquired as the semi-static notification. For example, when the communication in which the first modulation scheme is applied is performed based on the dynamic notification, the terminal device 40 performs the communication based on the allocation information and the modulation information acquired as the semi-static notification similarly to the control A. On the other hand, when communication to which the first modulation scheme is applied is not performed, the terminal device 40 performs communication, for example, to which the second modulation scheme is applied to all the communication resources.

<4.2. Transmission Signal Processing>

Figure 16:
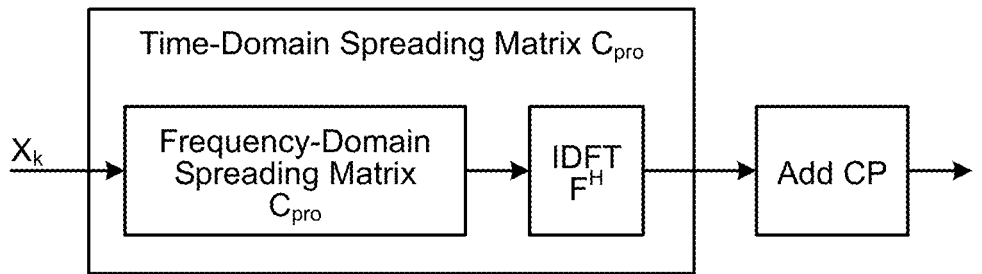
FIG. 16 is a diagram illustrating an example of transmission signal processing according to the embodiment of the present disclosure.

Here, an example of transmission signal processing according to the embodiment of the present disclosure is described with reference to FIG. 16. FIG. 16 is a diagram illustrating an example of the transmission signal processing according to the embodiment of the present disclosure. Here, a case where the communication device performs transmission signal processing by applying a subcarrier IM is described.

As illustrated in FIG. 16, frequency spreading using a spread matrix $C_{pro}$ in a frequency domain is performed on a transmission signal $X_k$ in the frequency domain, and IDFT is performed to calculate a transmission signal $x_k$ in the time domain. Such processing is expressed by Formula (18) below.

$$x_k = F^H C_{pro} X_k = c_{pro} X_k \qquad (18)$$

Note that $X_k$ is a transmission signal of a user k. $C_{pro}$ is a spread matrix in a frequency domain, and $C_{pro}$ is a spread matrix in a time domain. $F^H$ is an IDFT matrix.

The communication device generates a transmission signal to be transmitted to a communication partner by adding a CP to the transmission signal $x_k$ in the time domain generated based on Formula (18).

<4.3. Reception Signal Processing>

Figure 17:
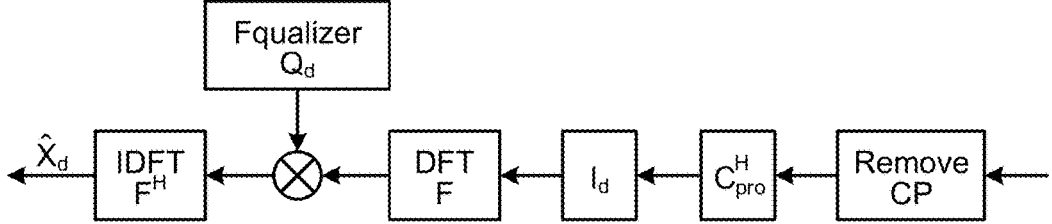
FIG. 17 is a diagram illustrating an example of reception signal processing according to the embodiment of the present disclosure.

Here, an example of reception signal processing according to the embodiment of the present disclosure is described with reference to FIG. 17. FIG. 17 is a diagram illustrating an example of the reception signal processing according to the embodiment of the present disclosure. Here, a case where the communication device performs reception signal processing on a reception signal to which the subcarrier IM is applied is described.

As illustrated in FIG. 17, the communication device cancels a CP added to a reception signal, performs despreading in a time domain, and extracts a signal addressed to the own device. The communication device performs DFT on the extracted signal to convert the signal into a frequency domain, performs frequency equivalence, and performs IDFT to generate reception data from the reception signal to the own device.

Such reception signal processing is expressed by Formula (19).

$$y = \sum_{k=0}^{K-1} \Lambda_k\, c_{pro} X_k + w \Rightarrow c_{pro}^H y = \sum_{k=0}^{K-1} \Lambda_k\, X_k + c_{pro}^H w \qquad (19)$$

$$c_{pro} = F^H C_{pro} \qquad (20)$$

Note that $C_{pro}$ is a spread matrix in a time domain and is expressed by Formula (20) described above. Further, $\Lambda k$ is a channel cyclic matrix.

5. Simulation

Simulation is performed to compare error rate characteristics between a case where the first modulation scheme is applied and a case where the first modulation scheme is not applied. Hereinafter, first, an environment in which simulation is performed is described.

<5.1. Interuser Interference>

First, a reception signal received by the communication device is expressed by Formula (21).

$$c_{pro}^{H} y = \sum_{k=0}^{K-1} \Lambda_k X_k + c_{pro}^{H} w \qquad (21)$$

Figure 18:
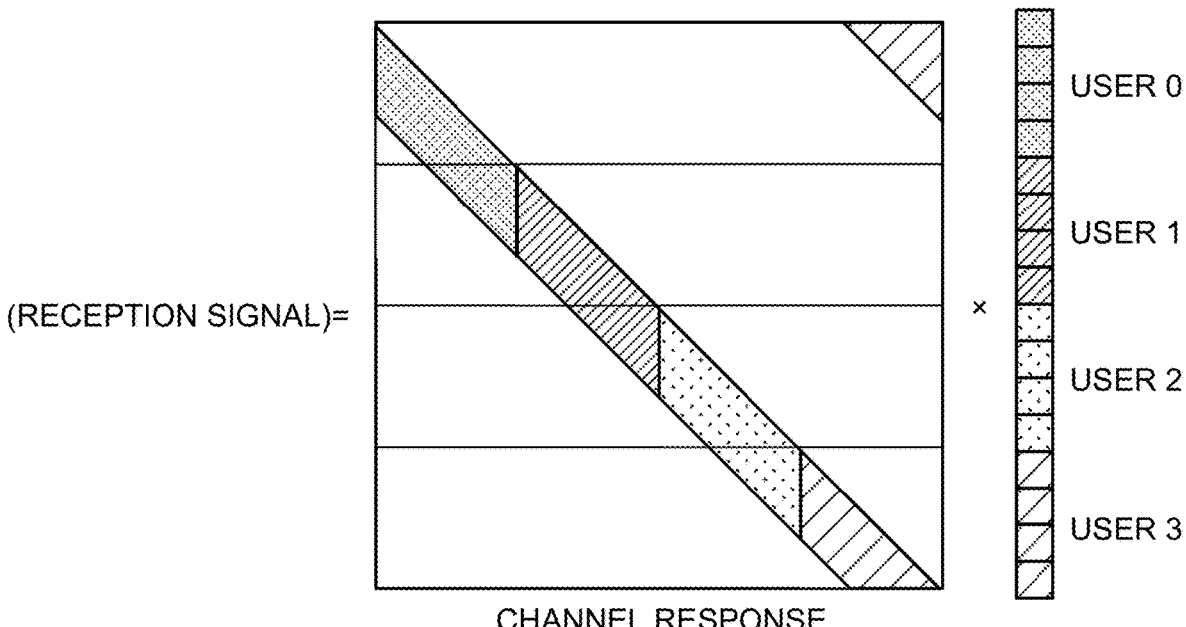
FIG. 18 is a diagram illustrating an example of interuser interference according to the embodiment of the present disclosure.

Further, it is assumed that channel responses of reception signals of a plurality of users are channel responses illustrated in FIG. 18. FIG. 18 is a diagram illustrating an example of the interuser interference according to the embodiment of the present disclosure.

FIG. 18 illustrates channel responses of reception signals of four users of a user 0 to a user 3. In the example of FIG. 18, the user 0, the user 1, the user 2, and the user 3 are allocated in order from the top of the resources, but when the reception signal reaches the user 0 through the propagation path, a part of the reception signal of the user 0 leaks into the resource of the user 1, and interference occurs. Similarly, a part of the reception signal of the user 1 interferes with the reception signal of the user 2, and a part of the reception signal of the user 2 interferes with the reception signal of the user 3. Note that it is assumed that a part of the reception signal of the user 3 rotationally interferes with the reception signal of the user 1.

Figure 19:
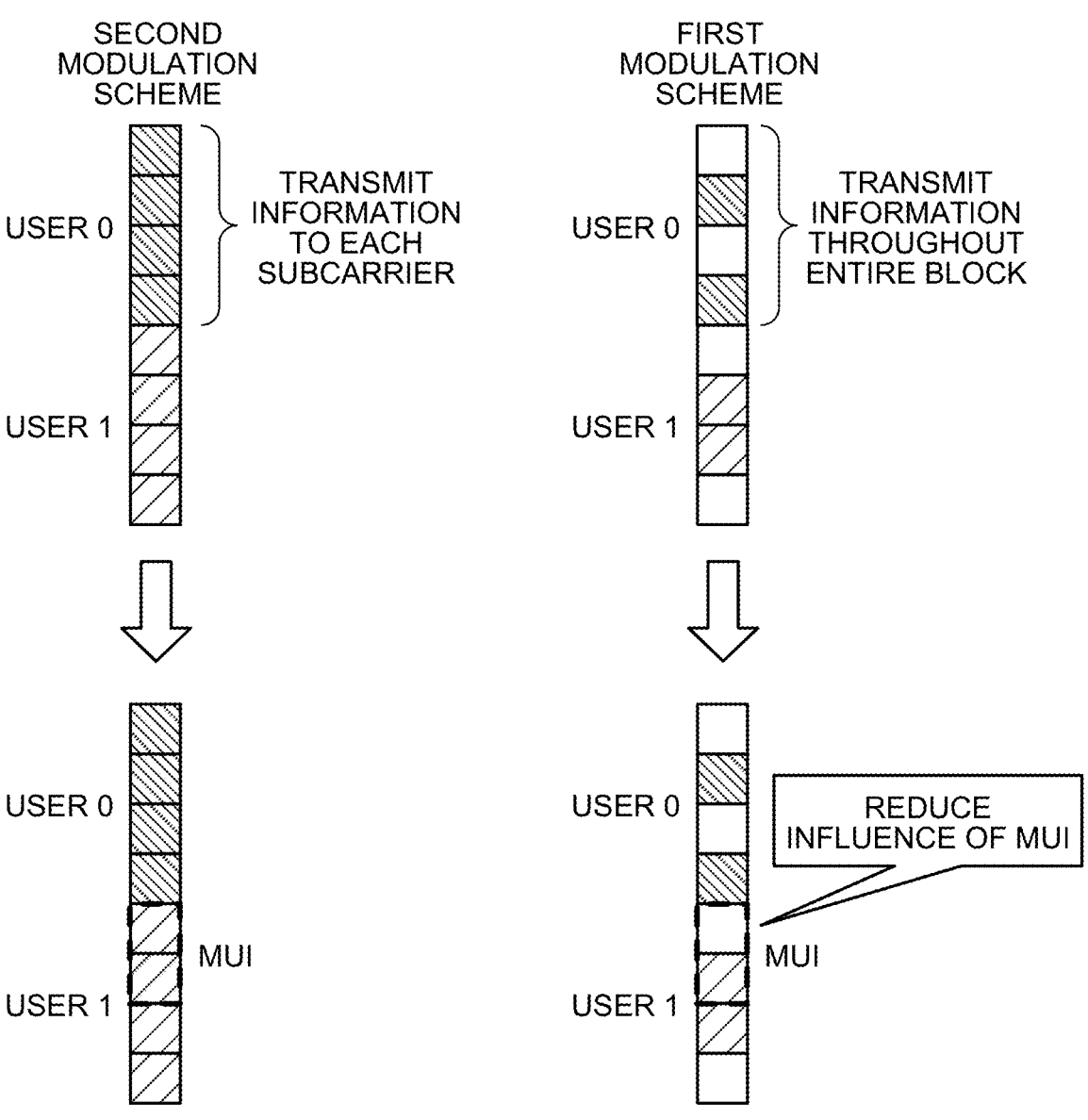
FIG. 19 is a diagram illustrating an example of signal interference according to the embodiment of the present disclosure.

In this manner, it is assumed that interuser interference occurs according to the number of paths of the channel. At this time, the reason why the interference can be reduced in the case where the first modulation scheme is applied to the signal of each user compared with the case where the first modulation scheme is not applied, but the second modulation scheme is applied without applying the first modulation scheme is described with reference to FIG. 19. FIG. 19 is a diagram illustrating an example of the signal interference according to the embodiment of the present disclosure. Note that, in FIG. 19, the interference given by the user 0 is described in order to simplify the description, but the users 1 to 3 similarly give interference to another user as described above.

As illustrated in the upper left diagram of FIG. 19, when the second modulation scheme is applied to the signal of each user, information is transmitted for each subcarrier. As described above, interuser interference occurs in which a part of the reception signal of the user 0 interferes with the reception signal of the user 1. Therefore, as illustrated in the lower left diagram of FIG. 19, multiple user interference (MUI) occurs in a part of the reception signal of user 1.

Meanwhile, when the first modulation scheme is applied to the signal of each user, information is transmitted throughout the entire signal block as illustrated in the upper right diagram of FIG. 19. More specifically, information is transmitted by a combination of active subcarriers (shaded squares) and inactive subcarriers (white squares).

Here, the inactive subcarrier has, for example, zero transmission signal power and is not likely to interfere with other reception signals. Therefore, by applying the first modulation scheme to the signal and transmitting the signal, the first modulation scheme using a part of subcarriers is less likely to interfere with the reception signals of other users than the second modulation scheme using all the subcarriers. As a result, multiple user interference (MUI) is reduced as illustrated in the lower right diagram of FIG. 19.

<5.2. Allocation Example of Information Bits>

Next, allocation (mapping) of information bits in the first modulation scheme used for simulation is described. In the simulation, it is assumed that the first modulation scheme is applied to all resources (subcarriers) used for communication. That is, it is assumed that all the utilization resources to be used for communication are the first resources.

Here, for example, the description is made in an assumption that the utilization resources to be used for communication (first resources) are eight subcarriers, two subcarriers out of the eight subcarriers are active subcarriers, and the remaining six subcarriers are inactive subcarriers. Note that the active subcarriers are subcarriers of which the transmission power is not zero, and the inactive subcarriers are subcarriers of which the transmission power is zero.

Furthermore, in the following description, in order to distinguish each of the eight subcarriers, there is a case where the eight subcarriers are described with indices of subcarriers #1 to #8 in ascending order of frequency.

In the present embodiment, for example, subcarriers adjacent to subcarriers allocated to another user (for example, the subcarriers #1 and #8) are used, that is, the priority for allocation to an active subcarrier is lowered. That is, the closer to the boundary with the resource allocated to another user, the lower the priority for selection as an active subcarrier. As a result, the interference given to other users can be further reduced.

Table 1 shows an allocation example in which two subcarriers out of the eight subcarriers are allocated to active subcarriers.

TABLE 1

| Allocation Example of Information Bits and Active Subcarrier Indexes | |
| --- | --- |
| Information bit | Active subcarrier index |
| 0000 | #2, #3 |
| 0001 | #2, #4 |
| 0010 | #2, #5 |
| 0011 | #2, #6 |
| 0100 | #2, #7 |
| 0101 | #3, #4 |
| 0110 | #3, #5 |
| 0111 | #3, #6 |
| 1000 | #3, #7 |
| 1001 | #4, #5 |
| 1010 | #4, #6 |
| 1011 | #4, #7 |
| 1100 | #5, #6 |
| 1101 | #5, #7 |
| 1110 | #6, #7 |
| 1111 | #1, #2 |

Note that, the case where all the utilization resources are the first resources is described here, but the same applies to a case where a part of the utilization resources is the first resources. That is, even when a part of the utilization resources is set as the first resources, a resource closer to a boundary with another resource is set to have a higher priority of selecting as the inactive resource and a lower priority of selecting as the active resource. As a result, the interference given to other users can be further reduced.

<5.3. Simulation Results>

In an environment where the interuser interference described above occurs, error rate characteristics when the first modulation scheme is applied to the transmission signal and when the first modulation scheme is not applied are calculated by simulation. Note that simulation conditions other than the environment described above and the like are shown in Table 2.

TABLE 2

| Simulation Conditions | |
| --- | --- |
| Channel model | 3 path Rayleigh fading |
| Number of subcarriers N | 64 |
| Number of symbols per user M | 8 |
| Number of active subcarriers $M_a$ | 2 |
| Number of users K = N/M | 16 |
| Modulation scheme (active subcarrier) | QPSK |

Figure 20:
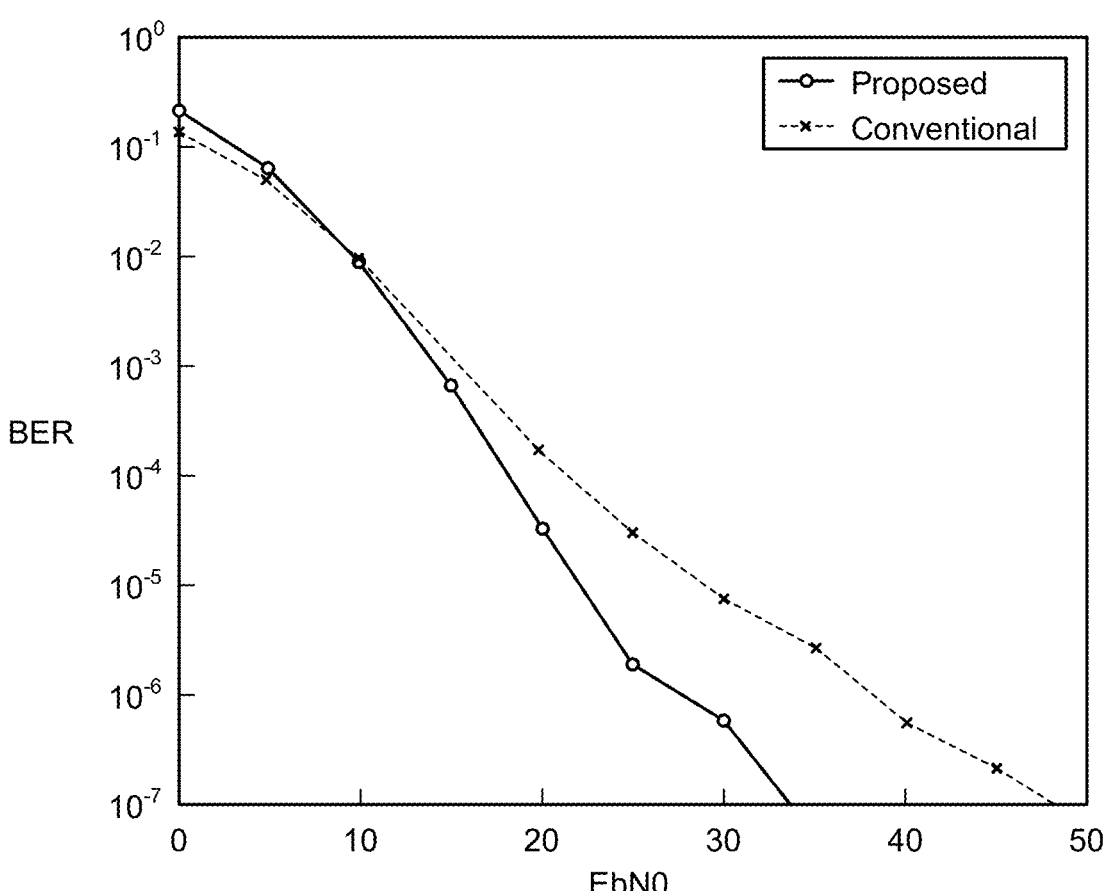
FIG. 20 is a diagram illustrating an example of a simulation result according to the embodiment of the present disclosure.

FIG. 20 is a diagram illustrating an example of the simulation result according to the embodiment of the present disclosure. In FIG. 20, the horizontal axis represents the ratio ($E_b/N_0$) of the signal power and the noise density per one bit, and the vertical axis represents a bit error rate (BER). Further, a solid line illustrated in FIG. 20 indicates a case where the first modulation scheme is applied (proposed), and a dotted line indicates a case where the second modulation scheme is applied without applying the first modulation scheme (conventional).

As illustrated in FIG. 20, for example, when comparison is performed with the required $E_b/N_0$ for achieving BER=$10^{-6}$, in a case where the first modulation scheme is applied, it is found that the required $E_b/N_0$ is reduced by approximately 10 dB compared with a case where the first modulation scheme is not applied.

In this manner, interuser interference can be reduced by communication using the first modulation scheme. Therefore, for example, by applying the first modulation scheme using a resource on which interuser interference is likely to occur, such as a boundary of resources, as the first resource, interuser interference can be further reduced. In addition, resource utilization efficiency can be improved by applying the first modulation scheme instead of setting the first resource as the guard period to perform signal transmission. This can further improve quality between radio links.

6. Other Embodiments

According to the embodiment described above, among predetermined resources, signals modulated by the first modulation scheme are allocated to the first resources, and signals modulated by the second modulation scheme are allocated to the second resources. At this time, at least a part of the first resources may be multiplexed with at least a part of the second resources. That is, at least a part of the first resources can be multiplexed with at least a part of the second resources on the transmission device or the channel.

For example, a part of the first resources can be multiplexed with a part or all of the second resources. Alternatively, a part of the second resources can be multiplexed with a part or all of the first resources.

Here, it is assumed that the first modulation scheme is, for example, a modulation scheme configured by whether to spread transmission signals by a predetermined spreading sequence. That is, the first modulation scheme is index modulation (IM) using a spreading code.

As described above, the signal modulated by the IM using the spreading code is allocated to the first resource, so that at least a part of the first resources and at least a part of the second resources are multiplexed. More specifically, transmission signals allocated to the third resources are spread to the first resources in the first modulation scheme using the spreading code. At least a part of the first resources overlaps with at least a part of the second resources. As a result, at least a part of the first resources and at least a part of the second resources are multiplexed.

As described above, the first modulation scheme is a modulation scheme configured by a set including active resources and inactive resources. The first modulation scheme is IM, for example, using a frequency, time, a resource element (including REG, CCE, and CORESET), a resource block, a bandwidth part, or a component carrier. The first modulation scheme is IM, for example, using a symbol, a sub-symbol, a slot, a mini-slot, a subslot, a subframe, or a frame. The first modulation scheme is IM using a spreading code, a multi-access physical resource, a multi-access signature, or the like.

The second modulation scheme is a modulation scheme, for example, configured with a set of complex signal points such as M-PSK and M-QAM.

The communication system 1 performs communication in which the first modulation scheme and the second modulation scheme are combined. For example, the communication system 1 performs communication by combining the first modulation scheme and the second modulation scheme within an allocated predetermined frequency band or within an allocated predetermined time resource.

Here, examples of the allocated predetermined frequency band include a component carrier, a band width part (BWP), and a scheduled frequency resource. Examples of the allocated predetermined time resource include a symbol, a sub-symbol, a slot, a mini-slot, a subslot, a subframe, and a frame.

Data to which the first modulation scheme is applied (hereinafter, also referred to as first transmission data) and data to which the second modulation scheme is applied (hereinafter, also referred to as second transmission data) can be determined, for example, according to quality of service (QOS).

For example, the second modulation scheme can be applied to data for which more throughput is required, as the second transmission data. The first modulation scheme can be applied to the data of the short packet for which the throughput is not required, as the first transmission data.

For example, a first channel to which the first modulation scheme is applied and a second channel to which the second modulation scheme is applied can be determined statically or semi-statically, respectively. Examples of the first channel and the second channel include data channels and control channels as below.

Logical channels: BCCH, PCCH, CCCH, DCCH, DTCH, and the like

Transport channels: BCH, DL-SCH, UL-SCH, PCH, and the like

Physical channels: PBCH, PDCCH, PUCCH, PSCCH, PDSCH, PUSCH, PSSCH, PRACH, and the like As described above, here, at least a part of the first resource to which the first modulation scheme is applied and at least a part of the second resource to which the second modulation scheme is applied are multiplexed on the transmission device or the propagation channel.

In this manner, at least a part of the first resources is multiplexed with at least a part of the second resources. For example, a ratio at which the first resource and the second resource are multiplexed can be determined in advance. Alternatively, the corresponding ratio may be determined dynamically or semi-statically.

When the ratio is determined in advance, for example, the first resource and the second resource are multiplexed at a uniquely determined ratio.

It is assumed that the corresponding ratio is determined semi-statically, for example, by notification by control information such as RRC signaling or system information. In this case, after receiving the notification, the transmission device multiplexes the first resource and the second resource by changing the ratio to the notified ratio after a predetermined time elapses.

It is assumed that the corresponding ratio is determined dynamically, for example, by control information such as DCI or MAC CE notified in a layer such as a physical layer or a MAC layer. In this case, after receiving the notification by the control information, the transmission device multiplexes the first resource and the second resource by changing the ratio to the notified ratio after a predetermined time elapses.

In this manner, at least a part of the first resources and at least a part of the second resources are multiplexed to increase the amount of the transmission resources. As a result, the frequency utilization efficiency is improved. In addition, since not all of the first resource and the second resource are multiplexed, a signal is transmitted without multiplexing a part of the first resource and/or the second resource. Since the signal is transmitted by using a resource that is not multiplexed, the corresponding signal is less likely to be affected by interference. As a result, the transmission device of the communication system 1 can flexibly multiplex the first and second resources according to the channel quality and the interference cancellation capability of the reception side and transmit a signal.

(Multiplexing Example of Resource)

Figure 21:
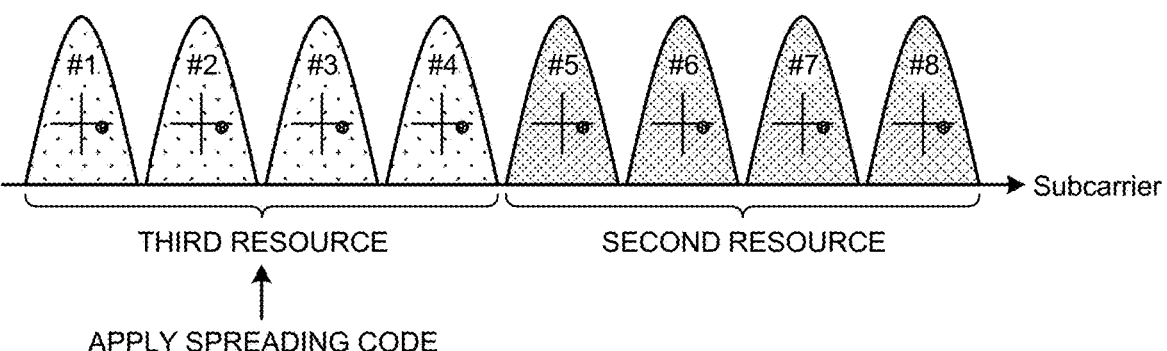
FIG. 21 is a diagram illustrating multiplexing of a first resource and a second resource according to another embodiment of the present disclosure.
Figure 22:
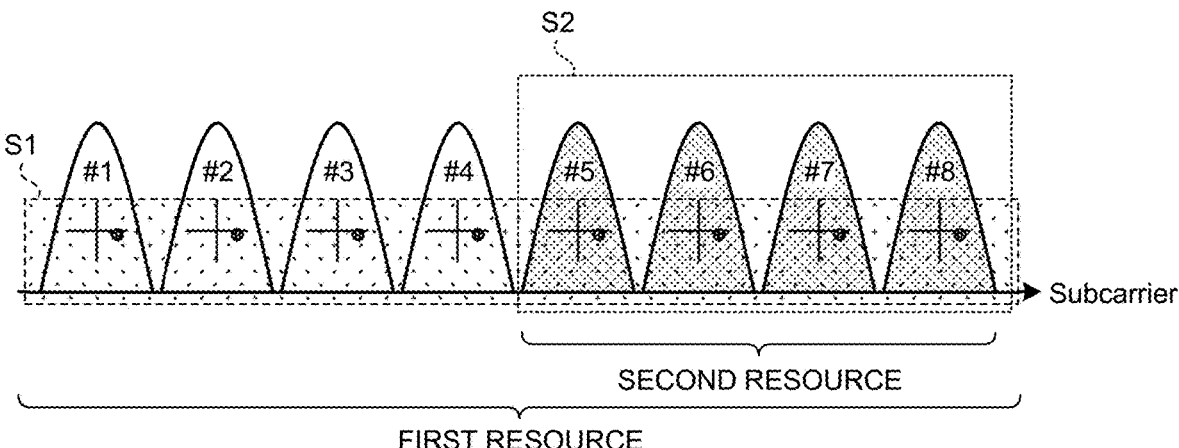
FIG. 22 is a diagram illustrating multiplexing of a first resource and a second resource according to another embodiment of the present disclosure.

FIGS. 21 and 22 are diagrams illustrating multiplexing of the first resource and the second resource according to another embodiment of the present disclosure. Here, a case where a spreading code is used as the first modulation scheme is described, but a modulation scheme other than the spreading code may be used as the first modulation scheme. In addition, here, it is assumed that the predetermined resources used for signal transmission are eight subcarriers.

FIG. 21 illustrates the predetermined resource before the first modulation scheme, that is, the spreading code is applied. The first transmission signals are allocated to the first to fourth subcarriers #1 to #4 illustrated in FIG. 21. The first transmission signal is a transmission bit string modulated by the first modulation scheme. That is, spreading codes are applied to the signals of the first to fourth subcarriers #1 to #4. Here, the first to fourth subcarriers #1 to #4 are also referred to as third resources.

In addition, the second transmission signals are allocated to the fifth to eighth subcarriers #5 to #8. The second transmission signals are a transmission bit string modulated by the second modulation scheme. That is, modulation such as M-PSK or M-QAM is applied to the signals of the fifth to eighth subcarriers #5 to #8.

FIG. 22 illustrates a signal S1 after the first modulation scheme is applied to the first transmission signal. The first transmission signal allocated to the third resource (the first to fourth subcarriers #1 to #4) is spread and allocated to the first resources (the first to eighth subcarriers #1 to #8).

The second transmission signal is not spread. Therefore, the second transmission signal (a signal S2 in FIG. 22) is allocated to the fifth to eighth subcarriers #5 to #8.

In the example of FIG. 22, a part of the first resources is multiplexed with all of the second resources by spreading the first transmission signal. Resources obtained by combining the first resource and the second resource are predetermined resources. The third resource to which the first transmission signal before spreading is allocated is orthogonal to the second resource. That is, the first transmission signals and the second transmission signals are allocated to resources orthogonal to each other (for example, the third resources and the second resources). Then, the first transmission signals are spread to the first resources. As a result, the signal S1 allocated to the first resources and the second transmission signal allocated to the second resources are multiplexed.

Figures 23, 24:
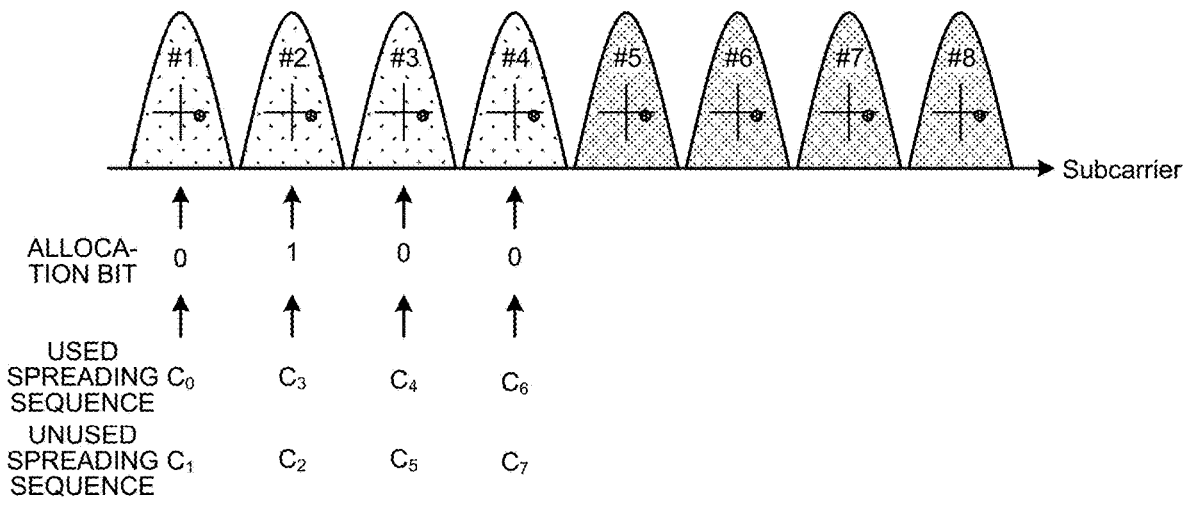
FIG. 23 is a table illustrating a correspondence between a first transmission signal and a spreading sequence.
FIG. 24 is a diagram illustrating an application example of a spreading sequence according to another embodiment of the present disclosure.

FIG. 23 is a table showing correspondences between the first transmission signal and spreading sequences. As shown in FIG. 23, each bit of the first transmission signal is allocated for each subcarrier. That is, one bit ("0" or "1") is allocated to one subcarrier. Different spreading sequences are allocated for each bit value ("0" or "1").

In the example of FIG. 23, a spreading sequence $C_0$ or a spreading sequence $C_1$ is applied to the first subcarrier #1. For example, when "0" is allocated to the first subcarrier #1, the spreading sequence $C_0$ is allocated to the first subcarrier #1. Similarly, a spreading sequence $C_2$ or the spreading sequence $C_3$ is applied to the second subcarrier #2. In this manner, the first transmission signal is spread in the spreading sequence according to the bit value allocated to each subcarrier.

FIG. 24 is a diagram illustrating an application example of the spreading sequence according to another embodiment of the present disclosure. As illustrated in FIG. 24, bits of "0" are allocated to the first subcarrier #1. Bits of "1" are allocated to the second subcarrier #2. Bits of "0" are allocated to the third subcarrier #3. Bits of "0" are allocated to the fourth subcarrier #4.

When bits of "0" are allocated to the first subcarrier #1, the spreading sequence $C_0$ is applied (see FIG. 23). Therefore, in the example of FIG. 24, the spreading sequence C0 is used for the bits allocated to the first subcarrier #1. Meanwhile, the spreading sequence C1 is not used.

In FIG. 24, a spreading sequence used for modulation in each subcarrier is referred to as a used spreading sequence. A spreading sequence that is not used for modulation in each subcarrier is referred to as an unused spreading sequence.

In the example of FIG. 24, the used spreading sequences of the first to fourth subcarriers #1 to #4 are the spreading sequences $C_0$, $C_3$, $C_4$, and $C_6$. The unused spreading sequences of the first to fourth subcarriers #1 to #4 are the spreading sequences $C_1$, $C_2$, $C_5$, and $C_7$.

The transmission device spreads the first transmission signal allocated to the first to fourth subcarriers #1 to #4 in a spreading sequence according to the bit value of each subcarrier to allocate the spread signal S1 to the first resource and perform transmission. The transmission device allocates the signal S2 (second transmission signal) modulated by the second modulation scheme to the second resource and perform transmission. As described above, the first resource and the second resource overlap in the fifth to eighth subcarriers #5 to #8. Therefore, the spread signal S1 is multiplexed with the signal S2 modulated by the second modulation scheme and transmitted.

Note that, here, one transmission device multiplexes and transmits the signal S1 and the signal S2, but the present disclosure is not limited thereto. For example, the first transmission device may transmit the signal S1, and the second transmission device different from the first transmission device may transmit the signal S2. In this case, the signal S1 and the signal S2 are multiplexed on a propagation channel.

Furthermore, the transmission destinations of the signal S1 and the signal S2 may be the same user (one reception device) or may be different users (different reception devices). That is, the signal S1 and the signal S2 can be transmitted to one reception device.

Alternatively, the signal S1 can be transmitted to the first reception device, and the signal S2 can be transmitted to the second reception device different from the first reception device.

(Interference Cancellation Processing)

The reception device performs de-spreading on the received signal and demodulates the signal. The corresponding signal is a multiplexed signal in which the signal S1 and the signal S2 are multiplexed. The reception device performs, for example, detection of a correlation value of the de-spread signal and determines a spreading sequence applied to the multiplexed signal. After determining the spreading sequence, the reception device applies a canceller to the multiplexed signal to cancel interference from the multiplexed signal and decode the multiplexed signal.

For example, the reception device performs successive interference cancellation (SIC) by using a successive canceller to remove interference from the multiplexed signal. For example, the reception device sequentially cancels interference starting from any one of the first resource and the second resource by the successive canceller.

Figure 25:
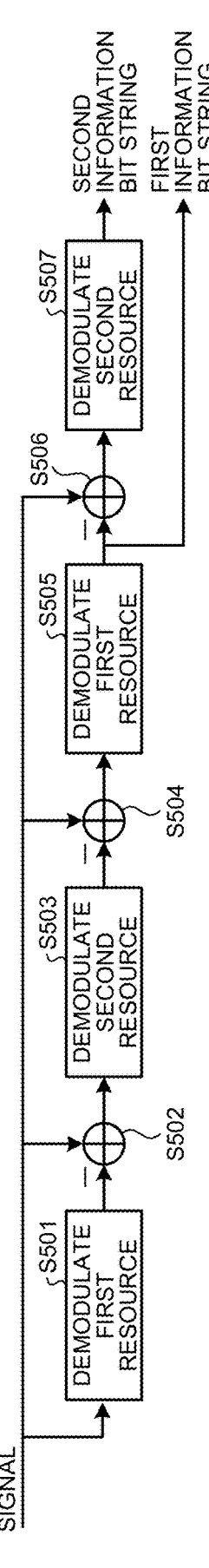
FIG. 25 is a diagram illustrating an example of successive interference cancellation processing according to another embodiment of the present disclosure.

FIG. 25 is a diagram illustrating an example of the successive interference cancellation processing according to another embodiment of the present disclosure. The successive interference cancellation processing illustrated in FIG. 25 is executed by the reception device. The reception device performs the successive interference cancellation processing to cancel interference from the multiplexed signal.

In the example of FIG. 25, the reception device first demodulates first resources of the reception signal (an example of the multiplexed signal) (step S501). Specifically, the reception device demodulates a signal allocated to the first resource among the reception signals to generate a first demodulation signal. The reception device generates a first soft symbol replica based on the first demodulation signal.

The reception device cancels a signal allocated to the first resource from the reception signal by using the first soft symbol replica and generates a first cancellation signal (step S502). The reception device demodulates the second resource of the first cancellation signal (step S503). Specifically, the reception device demodulates a signal allocated to the second resource among the first cancellation signals to generate a second demodulation signal. The reception device generates a second soft symbol replica based on the second demodulation signal.

The reception device cancels a signal allocated to the second resource from the reception signal by using the second soft symbol replica and generates a second cancellation signal (step S504). The reception device demodulates the first resource of the second cancellation signal (step S505). Specifically, the reception device demodulates a signal allocated to the first resource among the second cancellation signals to generate a third demodulation signal. The reception device generates a third soft symbol replica based on the third demodulation signal. The reception device outputs the third demodulation signal as a first information bit string that is a demodulation result of the signal S1.

The reception device cancels a signal allocated to the first resource from the reception signal by using the third soft symbol replica and generates a third cancellation signal (step S506). The reception device demodulates the second resource of the third cancellation signal (step S507). Specifically, the reception device demodulates a signal allocated to the second resource among the third cancellation signals to generate a fourth demodulation signal. The reception device outputs the fourth demodulation signal as a second information bit string that is a demodulation result of the signal S2.

Note that, here, the number of repetitions (the number of times of SIC) of interference cancellation by the reception device is two, but the number of times of SIC is not limited thereto. For example, the number of times of SIC may be three or more. That is, the reception device may repeat interference cancellation three or more times.

In addition, here, the reception device cancels interference by a successive interference cancellation method, but the interference cancellation method is not limited thereto. For example, the reception device may cancel interference by parallel interference cancellation (PIC).

Figure 26:
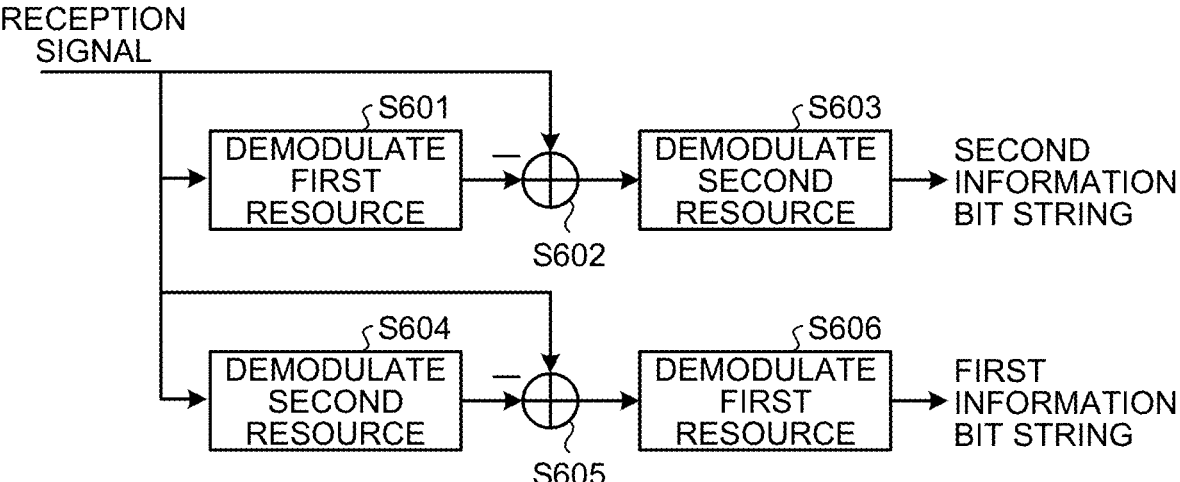
FIG. 26 is a diagram illustrating an example of parallel interference cancellation processing according to another embodiment of the present disclosure.

FIG. 26 is a diagram illustrating an example of the parallel interference cancellation processing according to another embodiment of the present disclosure. The parallel interference cancellation processing illustrated in FIG. 26 is executed by the reception device. The reception device performs the parallel interference cancellation processing to cancel interference from the multiplexed signal.

In the example of FIG. 26, the reception device first demodulates first resources of the reception signal (an example of the multiplexed signal) (step S601). Specifically, the reception device demodulates a signal allocated to the first resource among the reception signals to generate a first demodulation signal. The reception device generates a first soft symbol replica based on the first demodulation signal.

The reception device cancels a signal allocated to the first resource from the reception signal by using the first soft symbol replica and generates a first cancellation signal (step S602). The reception device demodulates the second resource of the first cancellation signal (step S603). Specifically, the reception device demodulates a signal allocated to the second resource among the first cancellation signals to generate a second demodulation signal. The reception device outputs the second demodulation signal as a second information bit string that is a demodulation result of the signal S2.

The reception device demodulates the second resource of the reception signal (step S604). Specifically, the reception device demodulates a signal allocated to the second resource among the reception signals to generate a fifth demodulation signal. The reception device generates a fourth soft symbol replica based on the fifth demodulation signal.

The reception device cancels a signal allocated to the second resource from the reception signal by using the fourth soft symbol replica and generates a fourth cancellation signal (step S605). The reception device demodulates the first resource of the fourth cancellation signal (step S606). Specifically, the reception device demodulates a signal allocated to the first resource among the fourth cancellation signals to generate a sixth demodulation signal. The reception device outputs the sixth demodulation signal as a first information bit string that is a demodulation result of the signal S1.

In the successive interference cancellation processing and the parallel interference cancellation processing described above, the reception device outputs both the first information bit string and the second information bit string, but the bit string output by the reception device is not limited thereto. For example, the reception device may output a demodulation result (for example, the first information bit string) of a signal addressed to the own device (for example, the signal S1) and may not output a demodulation result (for example, the second information bit string) of a signal not addressed to the own device (for example, the signal S2). In this case, the reception device may discard the second information bit string or may not generate the second information bit string in the first place.

In addition, the reception device can perform frequency equalization processing on the reception signal and perform processing of canceling interference (for example, the successive interference cancellation processing or the parallel interference cancellation processing described above) on the reception signal converted into the complex signal point. Alternatively, the reception device can perform error correction processing on the reception signal and perform processing of canceling interference on the reception signal converted into the bit sequence.

Figure 27:
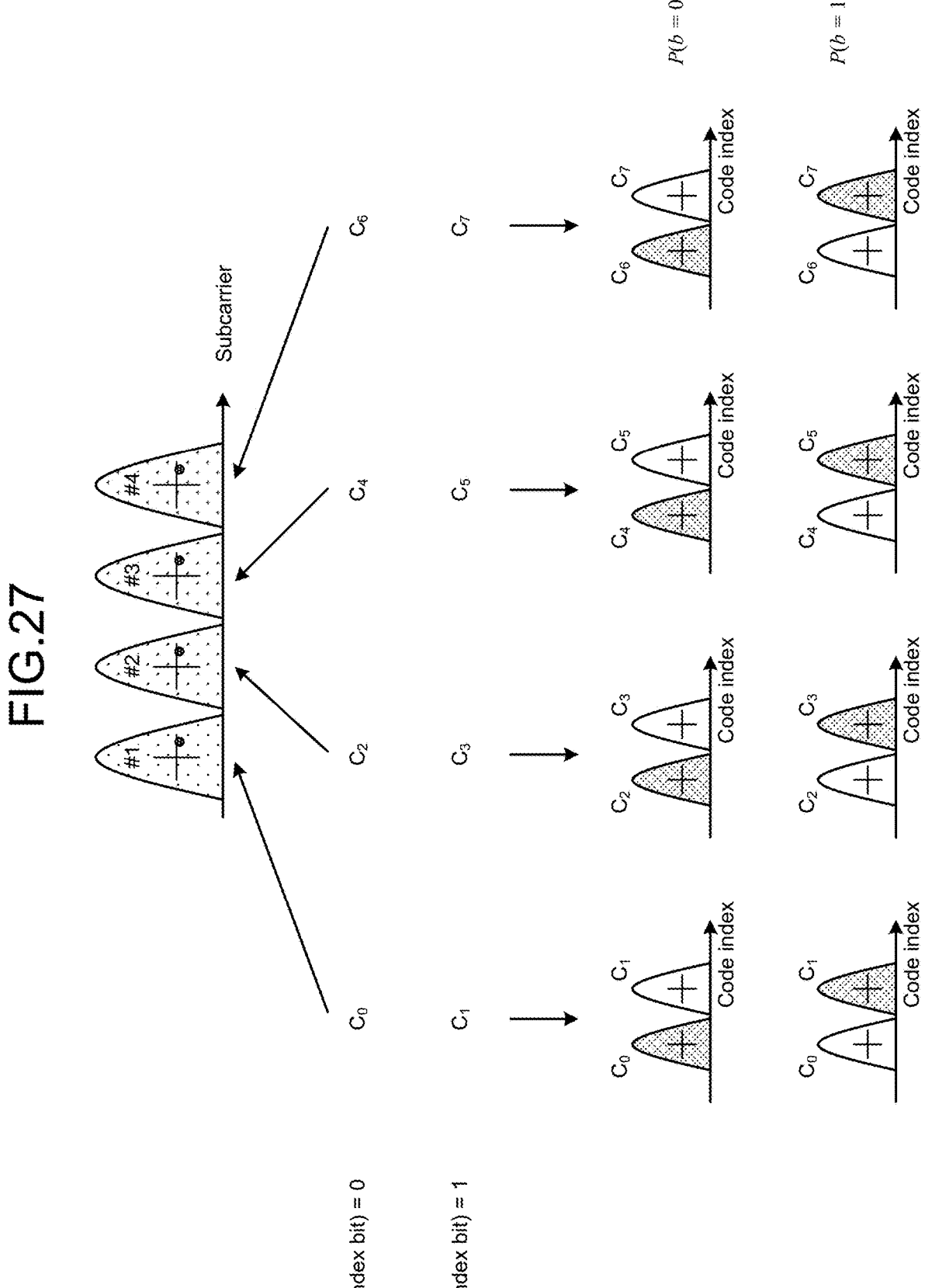
FIG. 27 is a diagram illustrating a method of generating a soft symbol replica according to another modification of the present disclosure.
Figure 28:
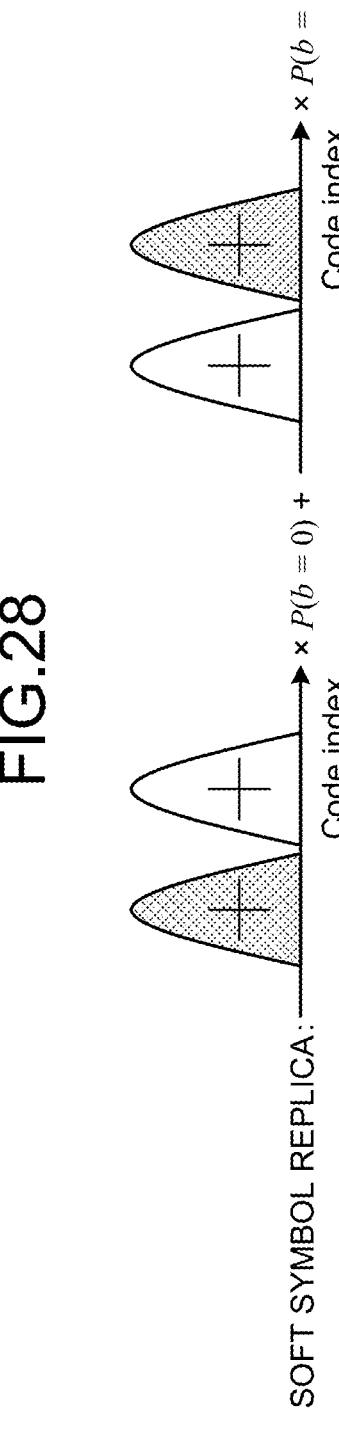
FIG. 28 is a diagram illustrating a method of generating a soft symbol replica according to another modification of the present disclosure.

FIGS. 27 and 28 are diagrams illustrating methods of generating the soft symbol replica according to another modification of the present disclosure. FIGS. 27 and 28 illustrate methods of generating a soft symbol replica of the first modulation scheme.

The reception device generates a soft symbol replica corresponding to each symbol bit from a log-likelihood ratio (LLR) of each symbol bit.

FIG. 27 illustrates the probability of the code index of each subcarrier. As illustrated in FIG. 27, the reception device calculates a probability P (b) of an index bit (b) (b=0 or 1) corresponding to each spreading sequence from the LLR.

As illustrated in FIG. 28, the reception device calculates the probabilities of all the bit patterns by using the product of P (b), weights all the bit patterns with the calculated probabilities, and adds the weighted probabilities to generate a soft symbol replica.

The reception device can use the generated soft symbol replica for the successive interference cancellation processing and the parallel interference cancellation processing described above to cancel interference from the reception signal.

(Superimposing Transmission Information on Set of Multiplexed Resources)

For example, the transmission device can transmit transmission information according to a combination of the first resource and the second resource, to the reception device.

Figure 29:
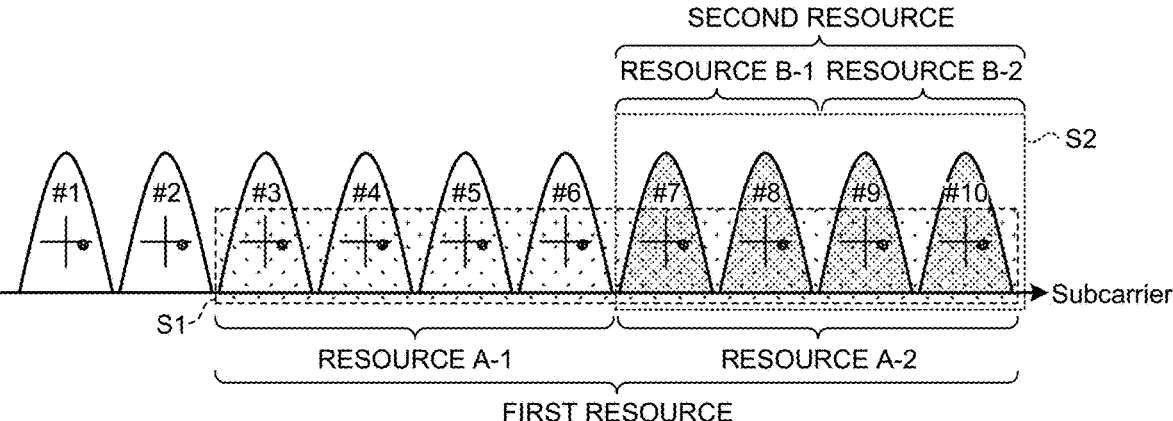
FIG. 29 is a diagram illustrating an example of a transmission information superimposing method according to another embodiment of the present disclosure.

FIG. 29 is a diagram illustrating an example of the transmission information superimposing method according to another embodiment of the present disclosure. Here, the first resource is divided into a plurality of resources (a resource A-1 and a resource A-2 in FIG. 29). The second resource is divided into a plurality of resources (a resource B-1 and a resource B-2 in FIG. 29).

In this case, the transmission device transmits the transmission information to the reception device according to which resource is multiplexed among the plurality of resources. For example, the transmission device determines resources to be multiplexed based on a correspondence between a combination of resources and transmission information (information bits) shown in Table 1. Table 3 is a table showing a set of resources and a first allocation example of information bits.

TABLE 3

Set of Resources and First Allocation Example of Information Bits

| Second resource | First resource | | |
| --- | --- | --- | --- |
| | Resource A-1 | Resource A-2 | Resource A-1 and resource A-2 |
| Resource B-1 | 000 | 001 | 100 |
| Resource B-2 | 010 | 011 | 101 |

TABLE 3-continued

Set of Resources and First Allocation Example of Information Bits

| Second resource | First resource | | |
| --- | --- | --- | --- |
| | Resource A-1 | Resource A-2 | Resource A-1 and resource A-2 |
| Resource B-1 and resource B-2 | 110 | 111 | Unallocated |

In the example of Table 3, when transmitting "000" as the transmission information (information bits), the transmission device multiplexes the resource A-1 and the resource B-1 to perform transmission. When transmitting "111" as the transmission information, the transmission device multiplexes the resource A-2 and all of the second resources (the resource B-1 and the resource B-2) to perform transmission.

In this case, as illustrated in FIG. 29, the transmission device transmits the signals S1 and S2 by using the third to tenth subcarriers #3 to #10 as the first resources and the seventh to tenth subcarriers #7 to #10 as the second resources.

Note that, in Table 3, it is assumed that the combination of multiplexing the resource A-1 and the resource A-2 with the resource B-1 and the resource B-2 is "unallocated" in which no information bit is allocated.

Figure 30:
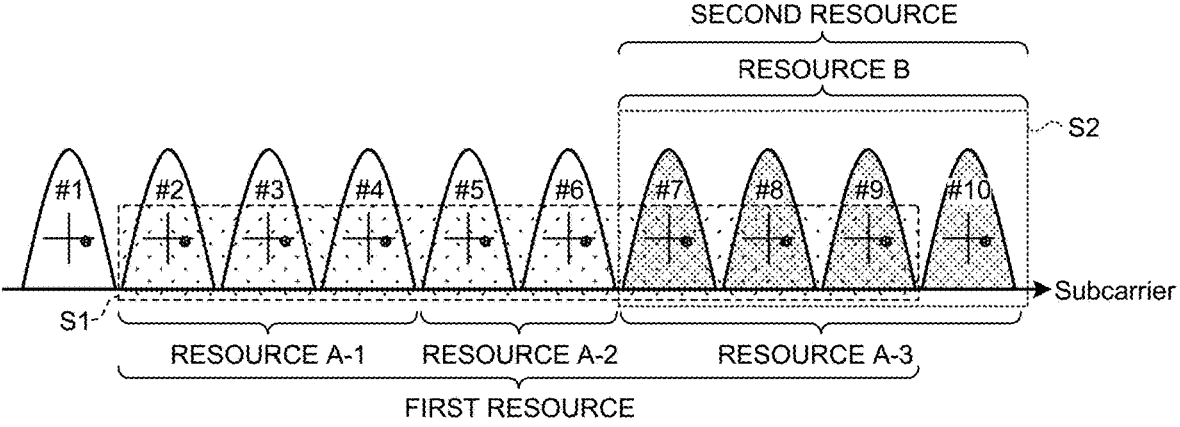
FIG. 30 is a diagram illustrating another example of a transmission information superimposing method according to another embodiment of the present disclosure.

FIG. 30 is a diagram illustrating another example of the transmission information superimposing method according to another embodiment of the present disclosure. Here, the first resource is divided into a plurality of resources (the resource A-1, the resource A-2, and the resource A-3 in FIG. 30). The second resource is divided into one resource (the resource B in FIG. 30).

In this case, the transmission device transmits the transmission information to the reception device according to which resource is multiplexed among the plurality of resources. For example, the transmission device determines resources to be multiplexed based on a correspondence between a combination of resources and transmission information (information bits) shown in Table 4. Table 4 is a table showing a set of resources and a second allocation example of information bits.

TABLE 4

Set of Resources and Second Allocation Example of Information Bits

| Second resource | First resource | | | |
| --- | --- | --- | --- | --- |
| | Resource A-1 | Resource A-2 | Resource A-3 | All of resources A-1 to A-3 |
| Resource B | 00 | 01 | 10 | 11 |

In the example of Table 4, when transmitting "00" as the transmission information (information bits), the transmission device multiplexes the resource A-1 and the resource B to perform transmission. When transmitting "10" as the transmission information, the transmission device multiplexes the resource A-3 and the resource B to perform transmission.

In this case, as illustrated in FIG. 30, the transmission device transmits the signals S1 and S2 by using the second to ninth subcarriers #2 to #9 as the first resources and the seventh to tenth subcarriers #7 to #10 as the second resources.

As described above, when multiplexing the divided resources, the transmission device does not necessarily multiplex all the resources. For example, the transmission device may multiplex a part of the second resource (resource B) and any one of resources A-1 to A-3 obtained by dividing the first resource (resource A-3 in FIG. 31). The transmission device may multiplex at least a part of the divided resources according to the correspondence between the combination of the resources to be multiplexed and the transmission bit string.

Note that, here, an example is described in which the transmission device divides the first resource and/or the second resource into any of one to three, but the number of divisions of the first resource and/or the second resource is not limited thereto. The first resource and/or the second resource can be divided into at least one or more.

Meanwhile, the reception device needs to detect which resources are multiplexed to perform transmission. In this case, for example, the reception device can estimate the multiplexed resources by setting a set of resources that may be multiplexed in advance and calculating the reception power amount of each resource.

Alternatively, for example, the transmission device sets a set of resources that may be multiplexed in advance, and applies detection codes such as different spreading patterns, scrambling patterns, and interleaving patterns necessary for detection to each set of resources. The reception device applies, for example, an inverse pattern of a detection code that may be applied to the reception signal. The reception device may perform the reception processing assuming that the sets of resources in which the correlation is detected are multiplexed.

In this manner, the transmission device multiplexes the first resource to which the first modulation scheme is applied and the second resource to which the second modulation scheme is applied and transmits a signal, so that the number of allocatable bits increases as compared with the case of transmitting a signal by the second modulation scheme.

The transmission device can use the increased bits to transmit the system bits or the parity bits generated by the error correction code.

If the transmission device uses the increased bits for transmitting the system bits, the transmission device can improve a transmission data size. Meanwhile, when the transmission device uses the increased bits for transmitting parity bits, the transmission device can improve the error correction capability of the transmission signal.

(Example of Signaling)

Signaling required in a case where the first resource and the second resource described above are multiplexed and a signal is transmitted (hereinafter, also referred to as signaling according to the present embodiment) can be notified semi-statically or dynamically. Examples of the semi-static notification include master information block (MIB), system information block (SIB), and RRC signaling. Examples of the dynamic notification include DCI and MAC CE.

Examples of signaling to be notified include the following information.

information related to implementation of communication means using first modulation scheme information related to resource to which communication means using first modulation scheme is applied (first resource)

information related to information bits in communication means using first modulation scheme and allocation of active resource index (see, for example, FIG. 23)

information related to multiplexing of resources to which the first modulation scheme is applied (see, for example, Table 3 or 4)

FIG. 31 is a diagram illustrating an example of the signaling according to another embodiment of the present disclosure. FIG. 31 illustrates a case where the signaling according to the present embodiment is notified by using RRC signaling.

Signaling surrounded by a dotted line S3 in FIG. 31 is the signaling according to the present embodiment. For example, "activeResourceModulationEnable" is signaling indicating information related to implementation of the communication means using the first modulation scheme. For example, when "activeResourceModulationEnable" is "Enable", it is indicated that the first resource and the second resource are multiplexed. When "activeResourceModulationEnable" is "Disable", it is indicated that the first resource and the second resource are not multiplexed.

For example, "activeResourceModulationResourceIndex" is signaling indicating information related to multiplexing of resources to which the first modulation scheme is applied. In the communication system 1, it is assumed that resources that are likely to be multiplexed are determined in advance as, for example, a table (for example, Table 3 or 4 described above). The side transmitting the signaling (for example, the base station) notifies the information related to the table by using "activeResourceModulationResourceIndex".

(Flow of Communication Processing)

Figure 32:
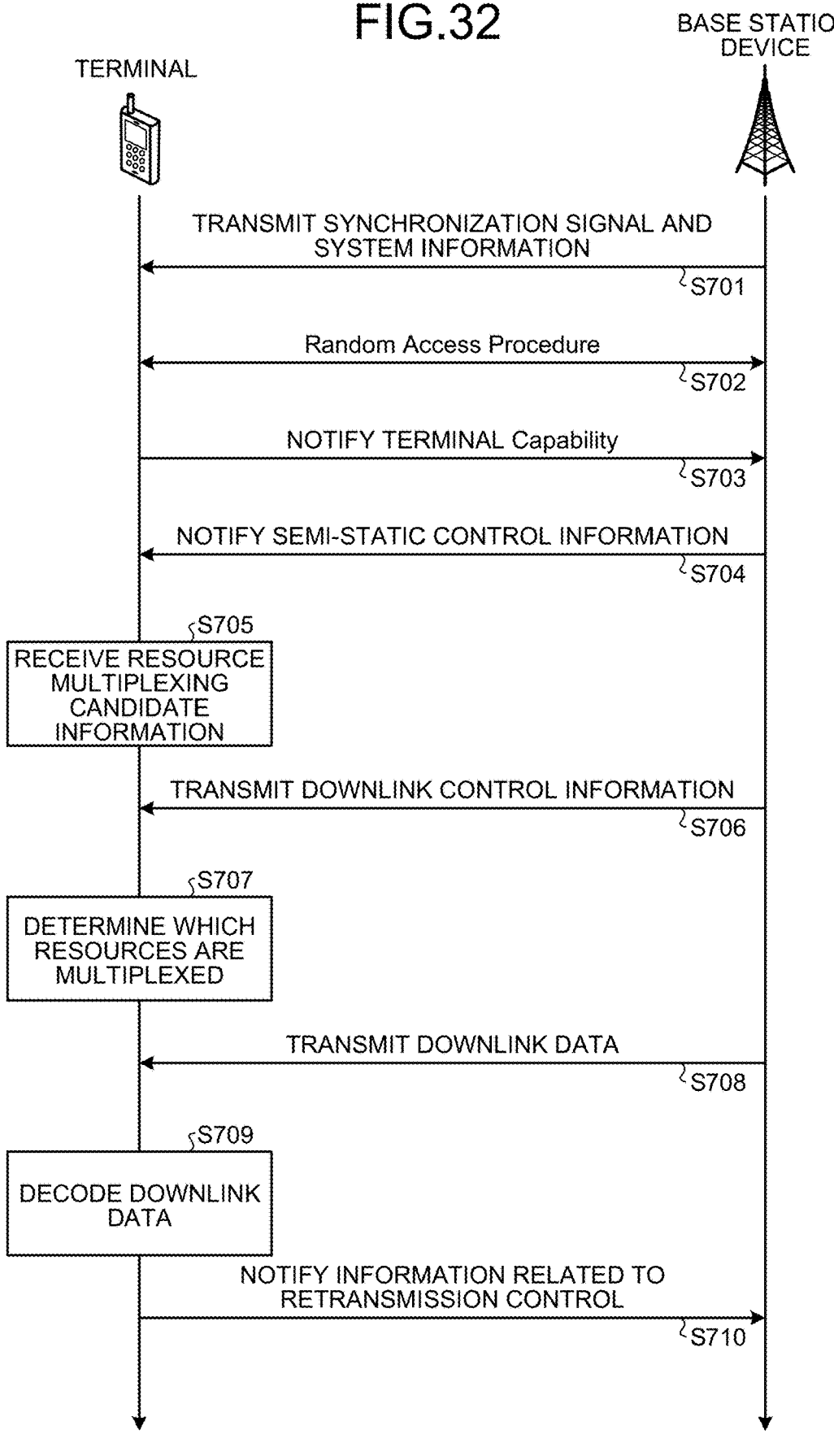
FIG. 32 is a sequence diagram illustrating an example of a flow of communication processing according to another embodiment of the present disclosure.

FIG. 32 is a sequence diagram illustrating an example of a flow of communication processing according to another embodiment of the present disclosure. Note that the sequence diagram illustrated in FIG. 32 is an example. In the communication system 1, processing other than the communication processing illustrated in FIG. 32 can be performed. Here, it is assumed that the base station device 20 transmits the signal according to the present embodiment (a signal obtained by multiplexing the first resources and the second resources) to the terminal device 40.

As illustrated in FIG. 32, the base station device 20 transmits a synchronization signal and system information to the terminal device 40 (step S701). Here, it is assumed that the system information includes explicit notification related to the signal according to the present embodiment.

The terminal device 40 receives the synchronization signal transmitted from the base station device 20 and performs downlink synchronization. Thereafter, the terminal device 40 receives the system information transmitted from the base station device 20 and receives information necessary for cell connection.

Next, the terminal device 40 performs a random access procedure (step S702) and performs connection with the base station device 20. As a result, the terminal device 40 performs uplink synchronization and completes the connection to the base station device 20.

The terminal device 40 notifies the base station device 20 of capability information (terminal capability information) of the own device (step S703). The terminal capability information can include, for example, capability information related to the communication means according to the present embodiment, such as whether the signal according to the present embodiment can be received.

The base station device 20 notifies semi-static control information (step S704). The base station device 20 transmits, for example, RRC signaling as the semi-static control information. The RRC signaling can include, for example, information related to the signaling according to the present embodiment. For example, the terminal device 40 receives the control information related to the signal according to the present embodiment as the semi-static control information. For example, the terminal device 40 receives resource multiplexing candidate information related to resource multiplexing (for example, information related to Table 3 or 4) (step S705).

The base station device 20 notifies the downlink control information (step S706). The base station device 20 transmits, for example, DCI as the downlink control information. The DCI can include, for example, the information related to signaling according to the present embodiment. For example, the terminal device 40 determines which resources are multiplexed based on the downlink control information (step S707).

The base station device 20 transmits the downlink data (step S708). The base station device 20 transmits the downlink data using, for example, PDSCH (PDSCH transmission). Here, the base station device 20 transmits a signal obtained by multiplexing the first resources and the second resources as the downlink data based on the semi-static control information and the downlink control information (dynamic control information) described above.

The terminal device 40 performs the interference cancellation processing described above and decodes the downlink data (step S709).

The terminal device 40 notifies the base station device 20 of information related to retransmission control according to the decoding result of the downlink data (step 710). The terminal device 40 transmits ACK/NACK information or HARD-ACK as the information related to retransmission control.

(Simulation)

Simulation is performed to compare error rate characteristics between a case where the first resource and the second resource are multiplexed and a case where the first resource and the second resource are not multiplexed. Here, simulation is performed assuming that the first resource and the second resource are multiplexed (also described as a first condition). As a comparison target, simulation is performed while a spread signal is applied without bit allocation to a spreading sequence (also described as a second condition). As a comparison target, simulation is performed while the second modulation scheme (PSK or QAM modulation) is applied (also described as a third condition). As a comparison target, simulation is performed assuming that interference due to resource multiplexing can be ideally canceled when the first resource and the second resource are multiplexed (also described as a fourth condition).

Conditions for the simulation described above (second simulation conditions) are shown in Table 5. Table 5 is a table illustrating the second simulation condition. Here, it is assumed that successive interference cancellation processing is performed as the interference cancellation processing. In addition, it is assumed that the number of repetitions of the successive interference cancellation processing (the number of times of SIC) is four.

TABLE 5

| Second Simulation Conditions | |
| --- | --- |
| Transport block length | 1024 |
| Channel model | 6 path Rayleigh fading Decay factor L/4 |
| Number of subcarriers N | 128 |
| Number of users K | 8 |

TABLE 5-continued

| Second Simulation Conditions | |
| --- | --- |
| Number of subcarriers per user | 16 |
| Number of spread subcarriers per user | 8 |
| Block size | 4 |
| Number of active subcarriers | 2 (Select one from two codes per subcarrier) |
| Modulation scheme (spreading) | BPSK |
| Modulation scheme (de-spreading) | BPSK |
| Coding rate | 2/3 |
| Number of times of SIC | Four times |

Figure 33:
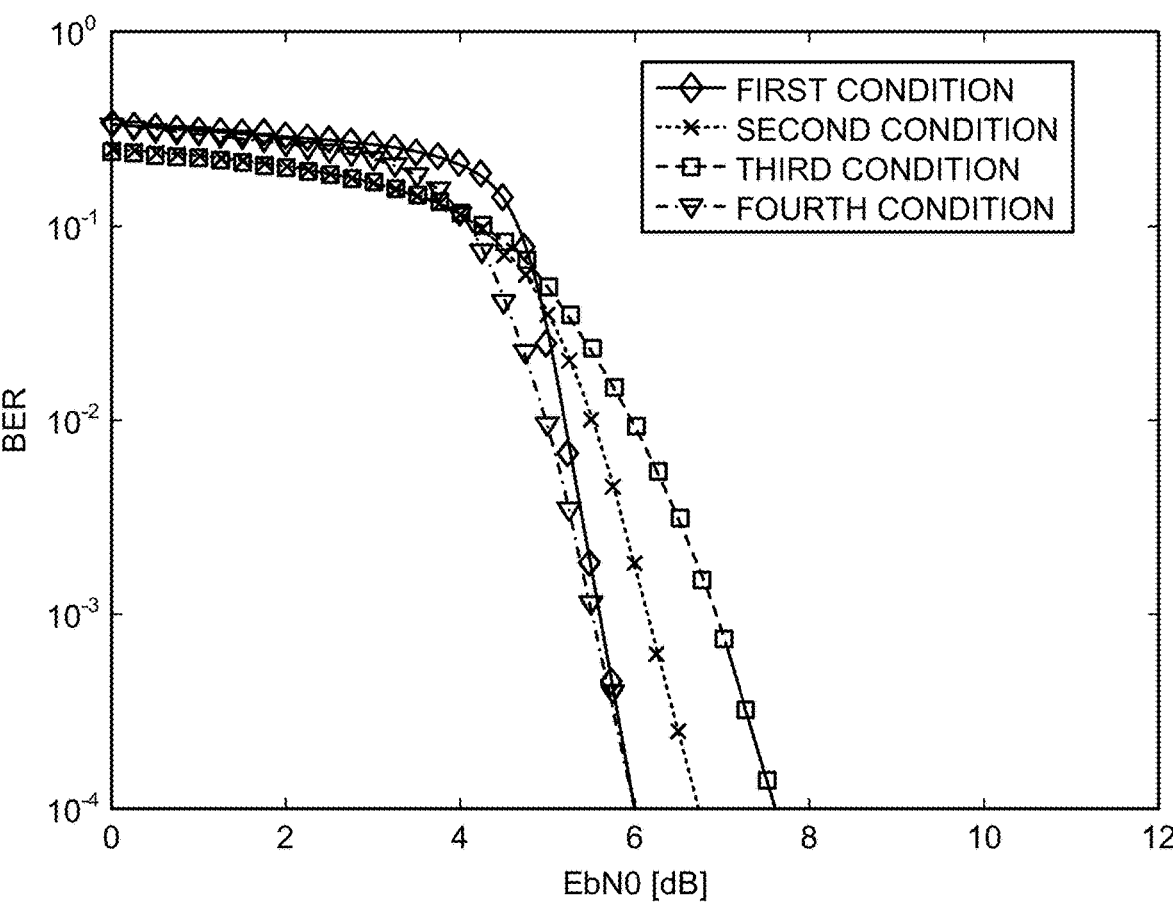
FIG. 33 is a diagram illustrating an example of a simulation result according to another embodiment of the present disclosure.

FIG. 33 is a diagram illustrating an example of the simulation result according to another embodiment of the present disclosure. In FIG. 33, the horizontal axis represents the ratio $(E_b/N_0)$ of the signal power and the noise density per one bit, and the vertical axis represents the bit error rate (BER).

A solid line in FIG. 33 indicates a simulation result under the first condition described above. A dotted line indicates a simulation result under the second condition described above. A chain line indicates a simulation result under the third condition described above. An alternate long and short dash line indicates a simulation result under the fourth condition described above.

As illustrated in FIG. 33, for example, when comparison is performed with the required $E_b/N_0$ that achieves BER=$10^{-4}$, in a case where the first condition is applied, the required $E_b/N_0$ is reduced by approximately 1 dB as compared with a case where other conditions are applied.

7. Conclusion

The embodiments described above are examples, and various modifications and applications are possible.

For example, in the embodiments described above, the subcarrier index modulation in which the subcarrier to be used is selected, that is, the IM is performed by using on/off of the subcarrier is described as an example, but the resource element to be used in the IM is not limited to the subcarrier. For example, the IM described in the present embodiment can also be applied to other index modulations described below as an example, regardless of the subcarrier index modulation.

index modulation using frequency index (such as subcarrier, resource block, or band width part)
　　index modulation using time index (such as symbol, slot, or frame)
　　index modulation using antenna port
　　index modulation using precoding index
　　index modulation using layer index
　　index modulation using beam index
　　index modulation using spreading sequence index In addition, the IM proposed in the present embodiment may be performed on the above-described Index Modulation alone, and the IM proposed in the present embodiment may be performed on the above-described combination of Index Modulation.

In addition, the selected resource of the embodiments described above may be determined by switching on/off of the transmission antenna or the reception antenna.

Furthermore, in the embodiments described above, communication using the first modulation scheme and the second modulation scheme proposed in the present embodiment is performed between the base station device 20 and the terminal device 40 or between the terminal devices 40. However, application of communication using the first modulation scheme and the second modulation scheme proposed in the present embodiment is not limited to communication between these devices. For example, communication using the first modulation scheme and the second modulation scheme proposed in the present embodiment can be applied to communication between the base station devices 20, communication between the relay devices 30, communication between the base station device 20 and the relay device 30, and communication between the relay device 30 and the terminal device 40.

For example, the control device that controls the base station device 20 and the terminal device 40 according to the present embodiment may be implemented by a dedicated computer system or may be implemented by a general-purpose computer system.

For example, a communication program for performing the operation described above is stored and distributed in a computer-readable recording medium such as an optical disk, a semiconductor memory, a magnetic tape, or a flexible disk. Then, the control device is configured, for example, by installing the corresponding program in a computer and executing the processes described above. At this time, the control device may be a device (for example, a personal computer) outside the base station device 20 and the terminal device 40. Furthermore, the control device may be a device (for example, the control units 24 and 45) inside the base station device 20 and the terminal device 40.

In addition, the communication program may be stored in a disk device included in a server device on a network such as the Internet and be downloaded to a computer. In addition, the functions described above may be implemented in cooperation with an operating system (OS) and application software. In this case, a part other than the OS may be stored in a medium and distributed, or a part other than the OS may be stored in a server device and be downloaded to the computer.

Among the processes described in the above embodiments, all or a part of the processes described as being performed automatically can be performed manually, or all or a part of the processes described as being performed manually can be performed automatically by a known method. In addition, the processing procedure, specific names, and information including various data and parameters disclosed in the document and the drawings can be arbitrarily changed unless otherwise specified. For example, the various types of information illustrated in each figure are not limited to the illustrated information.

In addition, each component of each device illustrated in the drawings is functionally conceptual and is not necessarily physically configured as illustrated in the drawings. That is, a specific form of distribution and integration of each device is not limited to the illustrated form, and all or a part thereof can be configured to be functionally or physically distributed and integrated in an arbitrary unit according to various loads, usage statuses, and the like. Note that this configuration by distribution and integration may be performed dynamically.

In addition, the embodiments described above can be appropriately combined in a region in which the processing contents do not contradict each other. Furthermore, the order of each step illustrated in the sequence diagram according to the embodiment described above can be changed as appropriate.

Furthermore, for example, the present embodiment can be implemented as any configuration constituting a device or a system, for example, a processor as a system large scale integration (LSI) or the like, a module using a plurality of processors or the like, a unit using a plurality of modules or the like, a set obtained by further adding other functions to a unit, or the like (that is, a configuration of a part of the device).

Note that, in the present embodiment, the system means a set of a plurality of components (such as devices or modules (parts)), and it does not matter whether all the components are in the same housing. Therefore, a plurality of devices that are stored in separate housings and connected via a network and one device in which a plurality of modules are stored in one housing are both systems.

Furthermore, for example, the present embodiment can adopt a configuration of cloud computing in which one function is shared and processed by a plurality of devices in cooperation via a network.

8. Hardware Configuration

Figure 34:
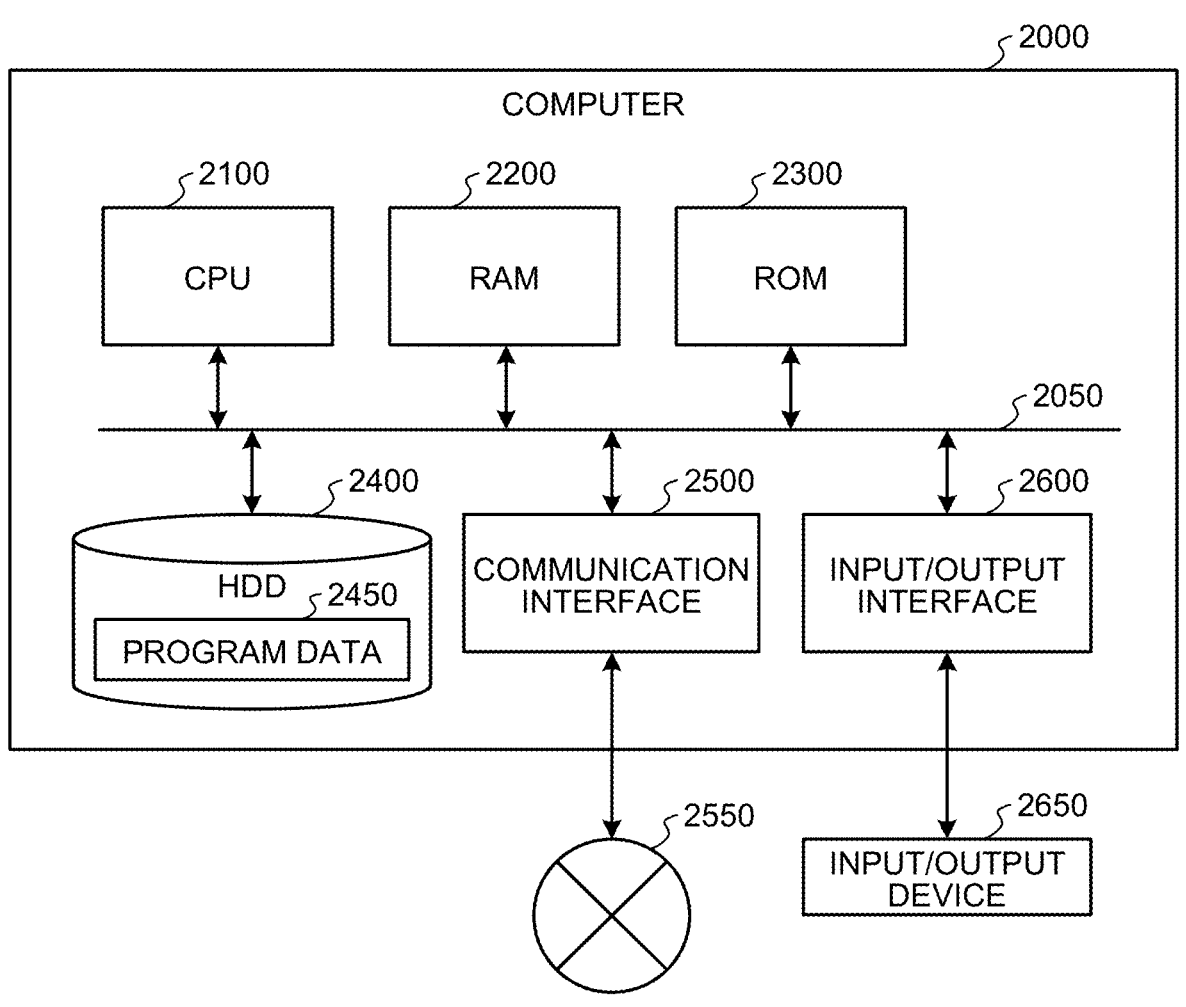
FIG. 34 is a hardware configuration diagram illustrating an example of a computer that implements functions of a base station device and a terminal device.

The communication device such as the base station device 20 and the terminal device 40 according to the embodiment described above is implemented, for example, by a computer 2000 having a configuration as illustrated in FIG. 34. FIG. 34 is a hardware configuration diagram illustrating an example of the computer that implements functions of the base station device 20 and the terminal device 40. Hereinafter, the base station device 20 according to the embodiment is described as an example. The computer 2000 includes a CPU 2100, a RAM 2200, a read only memory (ROM) 2300, a hard disk drive (HDD) 2400, a communication interface 2500, and an input/output interface 2600. Each unit of the computer 2000 is connected by a bus 2050.

The CPU 2100 operates based on a program stored in the ROM 2300 or the HDD 2400 and controls each unit. For example, the CPU 2100 loads the program stored in the ROM 2300 or the HDD 2400 into the RAM 2200 and executes processing corresponding to various programs.

The ROM 2300 stores a boot program such as a basic input output system (BIOS) executed by the CPU 2100 at the time of activating the computer 2000, a program depending on hardware of the computer 2000, and the like.

The HDD 2400 is a computer-readable recording medium that records a program executed by the CPU 2100, data used by the program, and the like in a non-transitory manner. Specifically, the HDD 2400 is a recording medium that records an information processing program according to the present disclosure which is an example of the program data 2450.

The communication interface 2500 is an interface for the computer 2000 to connect to an external network 2550 (for example, the Internet). For example, the CPU 2100 receives data from another device or transmits data generated by the CPU 2100 to another device via the communication interface 2500.

The input/output interface 2600 is an interface for connecting an input/output device 2650 and the computer 2000. For example, the CPU 2100 receives data from an input device such as a keyboard and a mouse via the input/output interface 2600. In addition, the CPU 2100 transmits data to an output device such as a display, a speaker, or a printer via the input/output interface 2600. Furthermore, the input/output interface 2600 may function as a media interface that reads a program or the like recorded in a predetermined recording medium (media). The medium is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, when the computer 2000 functions as the base station device 20 according to the embodiment, the CPU 2100 of the computer 2000 implements the functions of the control unit 24 and the like by executing a program loaded onto the RAM 2200. In addition, the HDD 2400 stores a program according to the present disclosure and data in the storage unit 22. Note that the CPU 2100 reads the program data 2450 from the HDD 2400 and executes the program data, but as another example, these programs may be acquired from another device via the external network 2550.

Note that the functions of the terminal device 40 can also be implemented by the computer 2000 described with reference to FIG. 21. For example, the CPU 2100 of the computer corresponding to the terminal device 40 implements the functions of the control unit 24 and the like by executing a program loaded onto the RAM 2200. In addition, the HDD 2400 stores a program according to the present disclosure and data in the storage unit 42. Note that the CPU 2100 reads the program data 2450 from the HDD 2400 and executes the program data, but as another example, these programs may be acquired from another device via the external network 2550.

9. Conclusion

Although the embodiments of the present disclosure have been described above, the technical scope of the present disclosure is not limited to the embodiments described above as it is, and various modifications can be made without departing from the gist of the present disclosure. In addition, components of different embodiments and modifications may be appropriately combined.

Furthermore, the effects of each embodiment described in the present specification are merely examples and are not limited, and other effects may be provided.

Note that the present technology can also have the following configurations.

(1)

A communication method, comprising:

performing wireless communication using a predetermined resource; and allocating a signal modulated by a first modulation scheme to a first resource included in the predetermined resource and allocating a signal modulated by a second modulation scheme different from the first modulation scheme to a second resource included in the predetermined resource, wherein the first modulation scheme is a modulation scheme for modulating a signal by a combination of active resources and inactive resources.

(2)

The communication method according to (1), wherein the first resource is arranged on a resource on which interference with other communication can occur among the predetermined resources.

(3)

The communication method according to (1) or (2), wherein the first resource is adjacent to the resource used for other communication.

(4)

The communication method according to (3), wherein the first resource is adjacent to a resource used for communication by another communication device.

(5)

The communication method according to any one of (1) to (4), wherein a size of the first resource is determined by a base station device.

(6)

The communication method according to any one of (1) to (5), wherein a priority of allocating the inactive resource is higher as the first resource is closer to the resource used for other communication.

(7)

The communication method according to any one of (1) to (6), further comprising allocating the signal modulated by the first modulation scheme and the signal modulated by the second modulation scheme to the predetermined resource based on at least one of information on whether to perform communication using the first modulation scheme and the second modulation scheme, information related to the first resource, and information related to a correspondence between the combination of the active resource and the inactive resource and an information bit.

(8)

The communication method according to any one of (1) to (7), wherein a method for determining a transmission signal size of a first transmission signal transmitted by the first resource is different from a method for determining a transmission signal size of a second transmission signal transmitted by the second resource.

(9)

The communication method according to any one of (1) to (8), further comprising allocating the signal modulated by the first modulation scheme to the first resource and allocating the signal modulated by the second modulation scheme to the second resource in communication on a predetermined communication physical channel.

(10)

The communication method according to (9), wherein the predetermined communication physical channel is any one of control information physical channels of a PDCCH, a PUCCH, and a PSCCH.

(11)

The communication method according to (9), wherein the predetermined communication physical channel is any one of control information physical channels of a PDSCH, a PUSCH, and a PSSCH.

(12)

The communication method according to any one of (1) to (11), wherein at least a part of the first resource and the second resource is multiplexed.

(13)

The communication method according to any one of (1) to (12), wherein a part of the first resource is multiplexed into at least a part of the second resource.

(14)

The communication method according to any one of (1) to (12), wherein at least a part of the second resource is multiplexed into at least a part of the first resource.

(15)

The communication method according to any one of (1) to (14), wherein a ratio at which the first resource and the second resource are multiplexed is defined in advance.

55

(16)

The communication method according to any one of (1) to (14), wherein a ratio at which the first resource and the second resource are multiplexed is defined dynamically or semi-statically.

(17)

The communication method according to any one of (1) to (16), wherein the first modulation scheme is a modulation scheme for modulating a transmission signal by spreading the transmission signal to the first resource, and at least a part of the first resource and the second resource is multiplexed by spreading the transmission signal to the first resource.

(18)

The communication method according to (17), wherein the transmission signal before spreading is allocated to a third resource orthogonal to the second resource.

(19)

The communication method according to any one of (12) to (18), further comprising transmitting information according to a combination of a first multiplexed resource multiplexed with the second resource in the first resource and a second multiplexed resource multiplexed with the first resource in the second resource.

(20)

The communication method according to (19), further comprising notifying combination information related to the information according to the combination of the first multiplexed resource and the second multiplexed resource.

(21)

A communication device, comprising:

a wireless communication unit that performs wireless communication using a predetermined resource; and a control unit that allocates a signal modulated by a first modulation scheme to a first resource included in the predetermined resource and allocates a signal modulated by a second modulation scheme different from the first modulation scheme to a second resource included in the predetermined resource, wherein the first modulation scheme is a modulation scheme for modulating a signal by a combination of active resources and inactive resources.

(22)

A program allowing a computer to execute:

performing wireless communication using a predetermined resource; and allocating a signal modulated by a first modulation scheme to a first resource included in the predetermined resource and allocating a signal modulated by a second modulation scheme different from the first modulation scheme to a second resource included in the predetermined resource, wherein the first modulation scheme is a modulation scheme for modulating a signal by a combination of active resources and inactive resources.

REFERENCE SIGNS LIST

1 COMMUNICATION SYSTEM
10 MANAGEMENT DEVICE
20 BASE STATION DEVICE
30 RELAY DEVICE
40 TERMINAL DEVICE
11 COMMUNICATION UNIT
21, 31, 41 COMMUNICATION UNIT
12, 22, 32, 42 STORAGE UNIT
13, 24, 34, 45 CONTROL UNIT

56

23, 33, 43 NETWORK COMMUNICATION UNIT
44 INPUT/OUTPUT UNIT

The invention claimed is:

1. A communication method, comprising:

performing wireless communication using a predetermined resource; and allocating a signal modulated by a first modulation scheme to a first resource included in the predetermined resource and allocating a signal modulated by a second modulation scheme different from the first modulation scheme to a second resource included in the predetermined resource, wherein the first modulation scheme is a modulation scheme for modulating a signal by a combination of active resources and inactive resources, and wherein the first resource is arranged on a resource on which interference with other communication can occur among the predetermined resources.

2. The communication method according to claim 1, wherein the first resource is adjacent to the resource used for other communication.

3. The communication method according to claim 2, wherein the first resource is adjacent to a resource used for communication by another communication device.

4. The communication method according to claim 1, wherein a size of the first resource is determined by a base station device.

5. The communication method according to claim 1, wherein a priority of allocating the inactive resource is higher as the first resource is closer to the resource used for other communication.

6. The communication method according to claim 1, further comprising allocating the signal modulated by the first modulation scheme and the signal modulated by the second modulation scheme to the predetermined resource based on at least one of information on whether to perform communication using the first modulation scheme and the second modulation scheme, information related to the first resource, and information related to a correspondence between the combination of the active resource and the inactive resource and an information bit.

7. The communication method according to claim 1, wherein a method for determining a transmission signal size of a first transmission signal transmitted by the first resource is different from a method for determining a transmission signal size of a second transmission signal transmitted by the second resource.

8. The communication method according to claim 1, further comprising allocating the signal modulated by the first modulation scheme to the first resource and allocating the signal modulated by the second modulation scheme to the second resource in communication on a predetermined communication physical channel.

9. The communication method according to claim 8, wherein the predetermined communication physical channel is any one of control information physical channels of a Physical Downlink Control Channel (PDCCH), a Physical Uplink Control Channel (PUCCH), or a Physical Shared Control Channel (PSCCH).

10. The communication method according to claim 8, wherein the predetermined communication physical channel is any one of control information physical channels of a Physical Downlink Control Channel (PDCCH), a Physical Uplink Control Channel (PUCCH), or a Physical Shared Control Channel (PSCCH).

11. The communication method according to claim 1, wherein at least a part of the first resource and the second resource is multiplexed.

12. The communication method according to claim 1, wherein a part of the first resource is multiplexed into at least a part of the second resource.

13. The communication method according to claim 1, wherein at least a part of the second resource is multiplexed into at least a part of the first resource.

14. The communication method according to claim 1, wherein a ratio at which the first resource and the second resource are multiplexed is defined in advance.

15. The communication method according to claim 1, wherein a ratio at which the first resource and the second resource are multiplexed is defined dynamically or semistatically.

16. The communication method according to claim 1, wherein the first modulation scheme is a modulation scheme for modulating a transmission signal by spreading the transmission signal to the first resource, and at least a part of the first resource and the second resource is multiplexed by spreading the transmission signal to the first resource.

17. The communication method according to claim 16, wherein the transmission signal before spreading is allocated to a third resource orthogonal to the second resource.

18. The communication method according to claim 11, further comprising transmitting information according to a combination of a first multiplexed resource multiplexed with the second resource in the first resource and a second multiplexed resource multiplexed with the first resource in the second resource.

19. The communication method according to claim 18, further comprising notifying combination information related to the information according to the combination of the first multiplexed resource and the second multiplexed resource.

20. A communication device, comprising:

a wireless transceiver that performs wireless communication using a predetermined resource; and a control circuitry that allocates a signal modulated by a first modulation scheme to a first resource included in the predetermined resource and allocates a signal modulated by a second modulation scheme different from the first modulation scheme to a second resource included in the predetermined resource, wherein the first modulation scheme is a modulation scheme for modulating a signal by a combination of active resources and inactive resources, and wherein the first resource is arranged on a resource on which interference with other communication can occur among the predetermined resources.

21. A non-transitory computer medium containing instructions for causing a computer to perform a method, the method comprising:

performing wireless communication using a predetermined resource; and allocating a signal modulated by a first modulation scheme to a first resource included in the predetermined resource and allocating a signal modulated by a second modulation scheme different from the first modulation scheme to a second resource included in the predetermined resource, wherein the first modulation scheme is a modulation scheme for modulating a signal by a combination of active resources and inactive resources, and wherein the first resource is arranged on a resource on which interference with other communication can occur among the predetermined resources.

* * * * *